United States Patent
Gotoh et al.

(10) Patent No.: US 10,670,421 B2
(45) Date of Patent: Jun. 2, 2020

(54) APPARATUS, SYSTEM, AND METHOD OF INFORMATION SHARING, AND RECORDING MEDIUM

(71) Applicants: Yuuto Gotoh, Kanagawa (JP); Shigenobu Hirano, Kanagawa (JP); Ikue Kawashima, Kanagawa (JP); Yasuo Katano, Kanagawa (JP); Takashi Maki, Kanagawa (JP); Kenji Kameyama, Kanagawa (JP); Shiroh Ikegami, Tokyo (JP); Qing Liang, Tokyo (JP); Kiyohiko Shinomiya, Tokyo (JP); Norikazu Igarashi, Kanagawa (JP); Satomi Tanaka, Kanagawa (JP)

(72) Inventors: Yuuto Gotoh, Kanagawa (JP); Shigenobu Hirano, Kanagawa (JP); Ikue Kawashima, Kanagawa (JP); Yasuo Katano, Kanagawa (JP); Takashi Maki, Kanagawa (JP); Kenji Kameyama, Kanagawa (JP); Shiroh Ikegami, Tokyo (JP); Qing Liang, Tokyo (JP); Kiyohiko Shinomiya, Tokyo (JP); Norikazu Igarashi, Kanagawa (JP); Satomi Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/586,810

(22) Filed: May 4, 2017

(65) Prior Publication Data
US 2017/0328733 A1   Nov. 16, 2017

(30) Foreign Application Priority Data

May 11, 2016 (JP) .................. 2016-095622
Mar. 1, 2017 (JP) .................. 2017-038814

(51) Int. Cl.
*G01C 21/36* (2006.01)
*G02B 27/01* (2006.01)

(52) U.S. Cl.
CPC ......... *G01C 21/367* (2013.01); *G01C 21/365* (2013.01); *G02B 27/0172* (2013.01); *G02B 2027/0178* (2013.01)

(58) Field of Classification Search
USPC ....................................... 701/442
See application file for complete search history.

(56) References Cited

U.S. PATENT DOCUMENTS 9,317,113 B1 * 4/2016 Karakotsios ............ G06F 3/013
2016/0191637 A1 * 6/2016 Memon .................. H04L 67/20
701/522

(Continued)

FOREIGN PATENT DOCUMENTS

JP    2001-188761    7/2001
JP    2003-320063    11/2003

(Continued)

*Primary Examiner* — Maceeh Anwari
(74) *Attorney, Agent, or Firm* — Oblon, McClelland, Maier & Neustadt, L.L.P.

(57) ABSTRACT

A management server communicable with a plurality of terminal devices, including a first terminal device, includes: a receiver to receive, from the first terminal device, shared information to be shared between the plurality of terminal devices, the shared information including first location information indicating a current location of the first terminal device, direction information indicating a direction that the first terminal device faces, and distance information indicating a distance from the first terminal device to a target destination; circuitry to generate target destination information including second location information indicating a location of the target destination based on the shared information received from the first terminal device; and a trans- (Continued)

mitter to transmit the target destination information to the plurality of terminal devices for display at the plurality of terminal devices.

18 Claims, 39 Drawing Sheets

(56) References Cited

U.S. PATENT DOCUMENTS

2016/0198499 A1* 7/2016 Lee ................. H04W 4/026
                                                     455/450
2019/0261300 A1* 8/2019 Alles ................. G01S 5/0036

FOREIGN PATENT DOCUMENTS

| JP | 2010-128709 | 6/2010 |
| JP | 2011-145407 | 7/2011 |
| JP | 2011-215676 | 10/2011 |
| JP | 2014-164374 | 9/2014 |
| JP | 2016-156721 | 9/2016 |

* cited by examiner

USER A

| DESTINATION | 🏁 |
|---|---|
| DANGEROUS OBJECT | ☠ |
| COLLAPSED HOUSE | 🏚 |
| SURVIVOR IN NEED OF HELP | 🔧 |

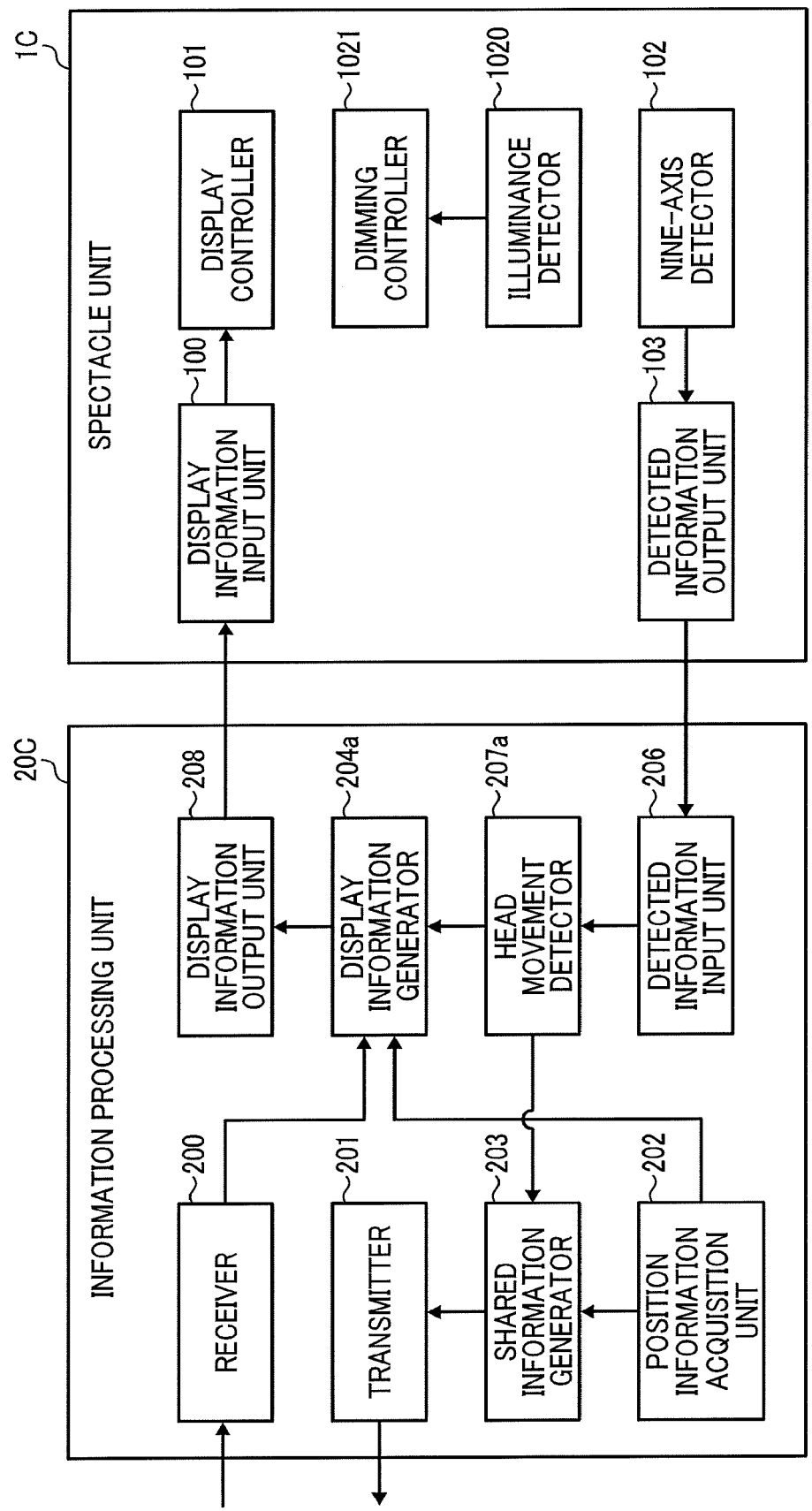

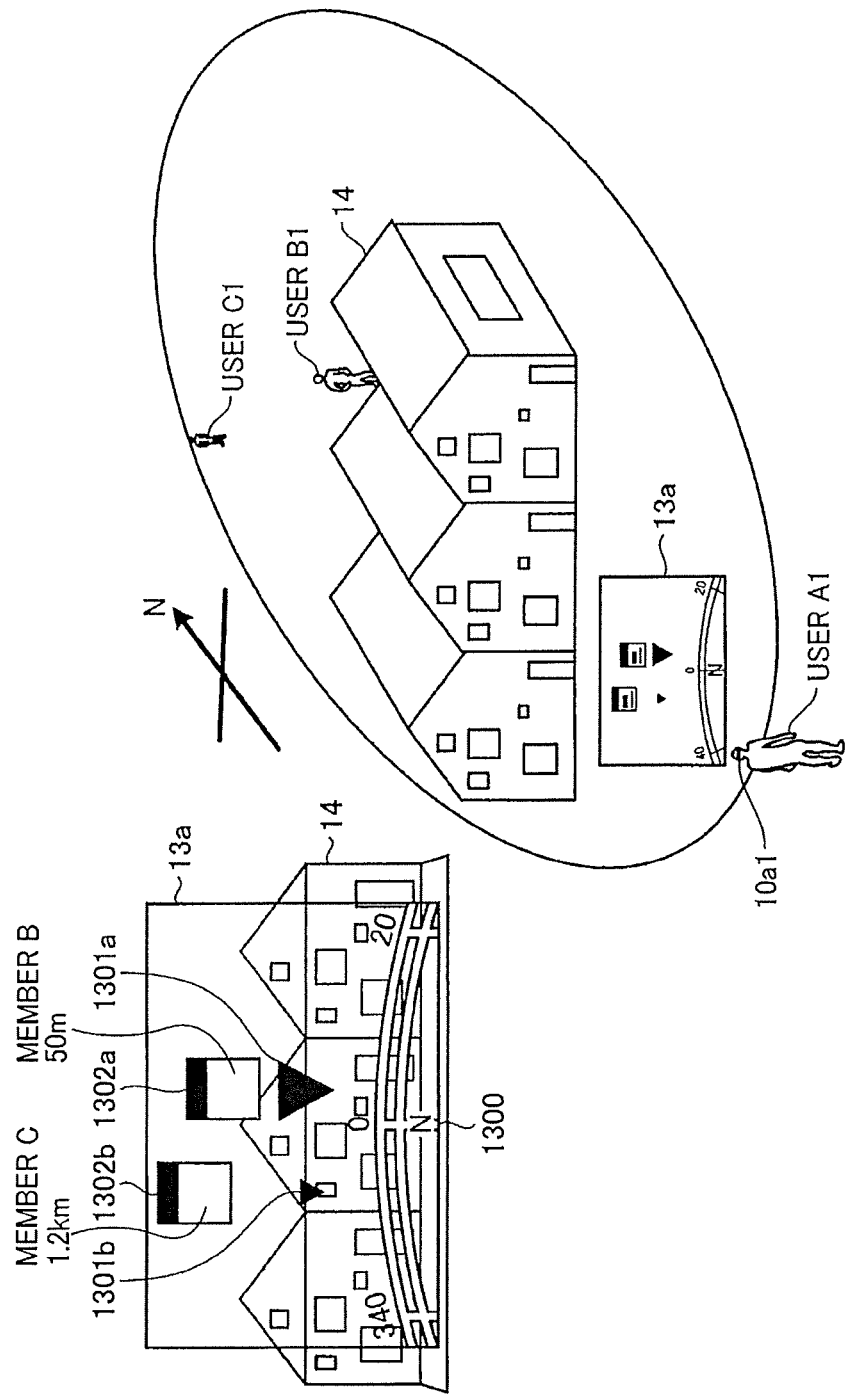

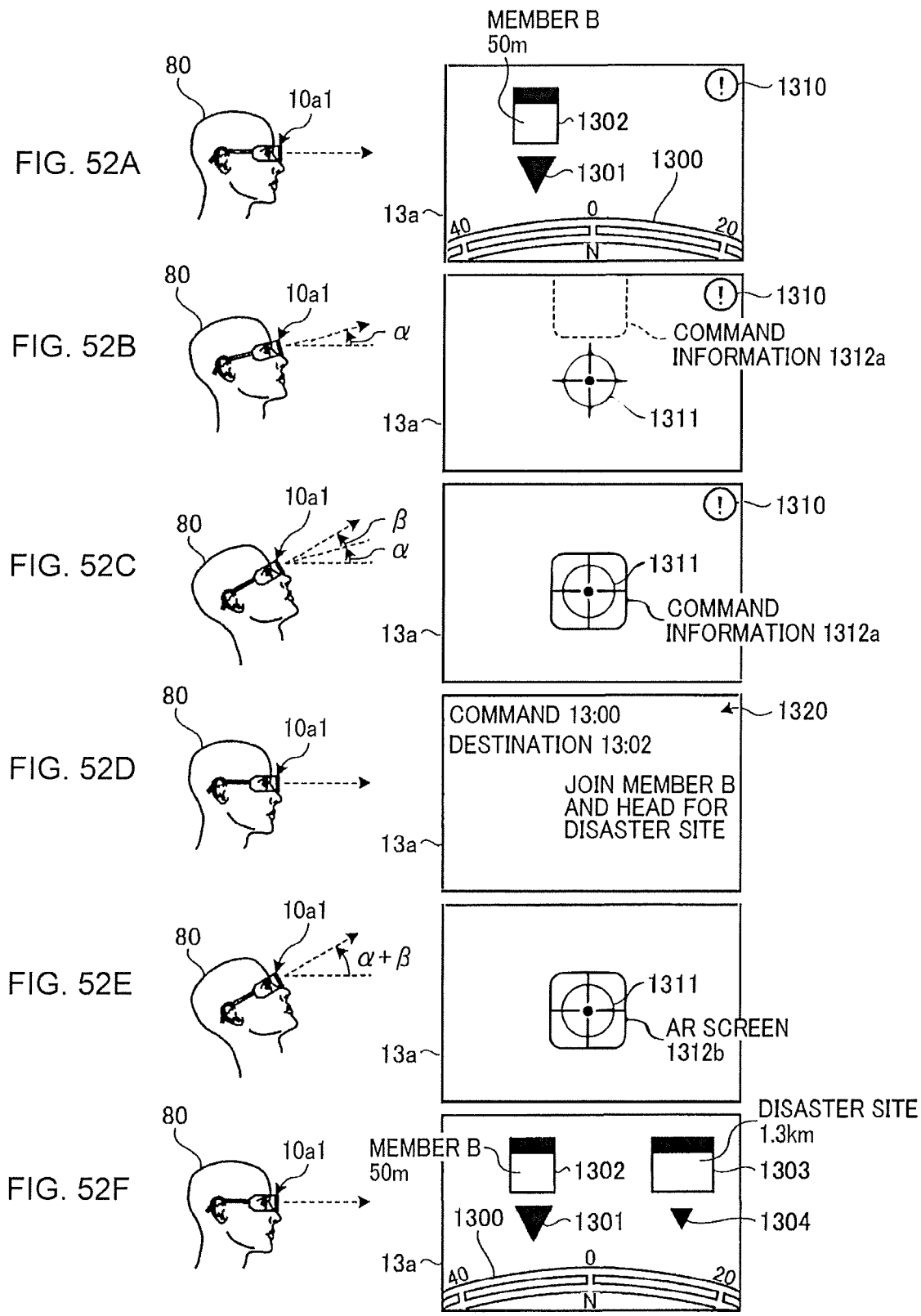

APPARATUS, SYSTEM, AND METHOD OF INFORMATION SHARING, AND RECORDING MEDIUM

CROSS-REFERENCE TO RELATED APPLICATIONS

This patent application is based on and claims priority pursuant to 35 U.S.C. § 119(a) to Japanese Patent Application Nos. 2016-095622, filed on May 11, 2016, and 2017-038814, filed on Mar. 1, 2017 in the Japan Patent Office, the entire disclosure of which is hereby incorporated by reference herein.

BACKGROUND

Technical Field

The present invention relates to an apparatus, system, and method of information sharing, and a non-transitory recording medium.

Description of the Related Art

The recent mobile terminal, such as a smart phone (multifunctional portable terminal), acquires position information that indicates an own current position, using a global navigation satellite system (GNSS) or the like, and superimposes the acquired position information on map information acquired from a network such as the Internet. The mobile terminal is able to specify coordinates of specific latitude and longitude and to transmit information such as an image, a text, and a link to a web site, together with information of the specific latitude and longitude, to the network to share the information with another mobile terminal.

SUMMARY

Example embodiments of the present invention include a management server communicable with a plurality of terminal devices, the plurality of terminal devices including a first terminal device. The management server includes: a receiver to receive, from the first terminal device, shared information to be shared between the plurality of terminal devices, the shared information including first location information indicating a current location of the first terminal device, direction information indicating a direction that the first terminal device faces, and distance information indicating a distance from the first terminal device to a target destination; circuitry to generate target destination information including second location information indicating a location of the target destination based on the shared information received from the first terminal device; and a transmitter to transmit the target destination information to the plurality of terminal devices for display at the plurality of terminal devices.

Example embodiments of the present invention include an information sharing system including the above-described management server and at least one of the plurality of terminal devices.

Example embodiments of the present invention include a terminal device, which includes: circuitry to obtain location information indicating a current location of the terminal device, direction information indicating a direction that the terminal device currently faces, and distance information indicating a distance to a target destination from the terminal device; a receiver to receive the second location information from the management server; and a display to display the second location information.

Example embodiments of the present invention include a terminal device, which is capable of performing the functions as the management server.

Example embodiments of the present invention include a light-transmissive display to display an image to at least one eye and its peripheral area of a user, when the terminal device is mounted on a head of the user; and circuitry to: obtain first location information, the first location information indicating a current location of the terminal device; obtain target destination information including second location information, the second location information indicating a location of a target destination; and control the display to display, based on the first location information and the second location information, a marker image of the target destination at a location corresponding to a direction of the target destination viewed from the location indicated by the first location information.

Example embodiments of the present invention include an information sharing system including a management server, and the above-described terminal device.

Example embodiments of the present invention include a method performed by any one of the terminal devices, a method performed by the management server, and a non-transitory recording medium storing a set of instructions for causing a processor to perform any one of the methods of controlling display.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 40 is a functional block diagram illustrating functions of the terminal device according to the fourth embodiment;

FIG. 42A and FIG. 42B are diagrams more specifically illustrating an example of a screen of the terminal device according to the fourth embodiment;

FIG. 52A to FIG. 52F are diagrams illustrating examples of a method for displaying command information in the terminal device according to the fourth embodiment.

Figure 1:
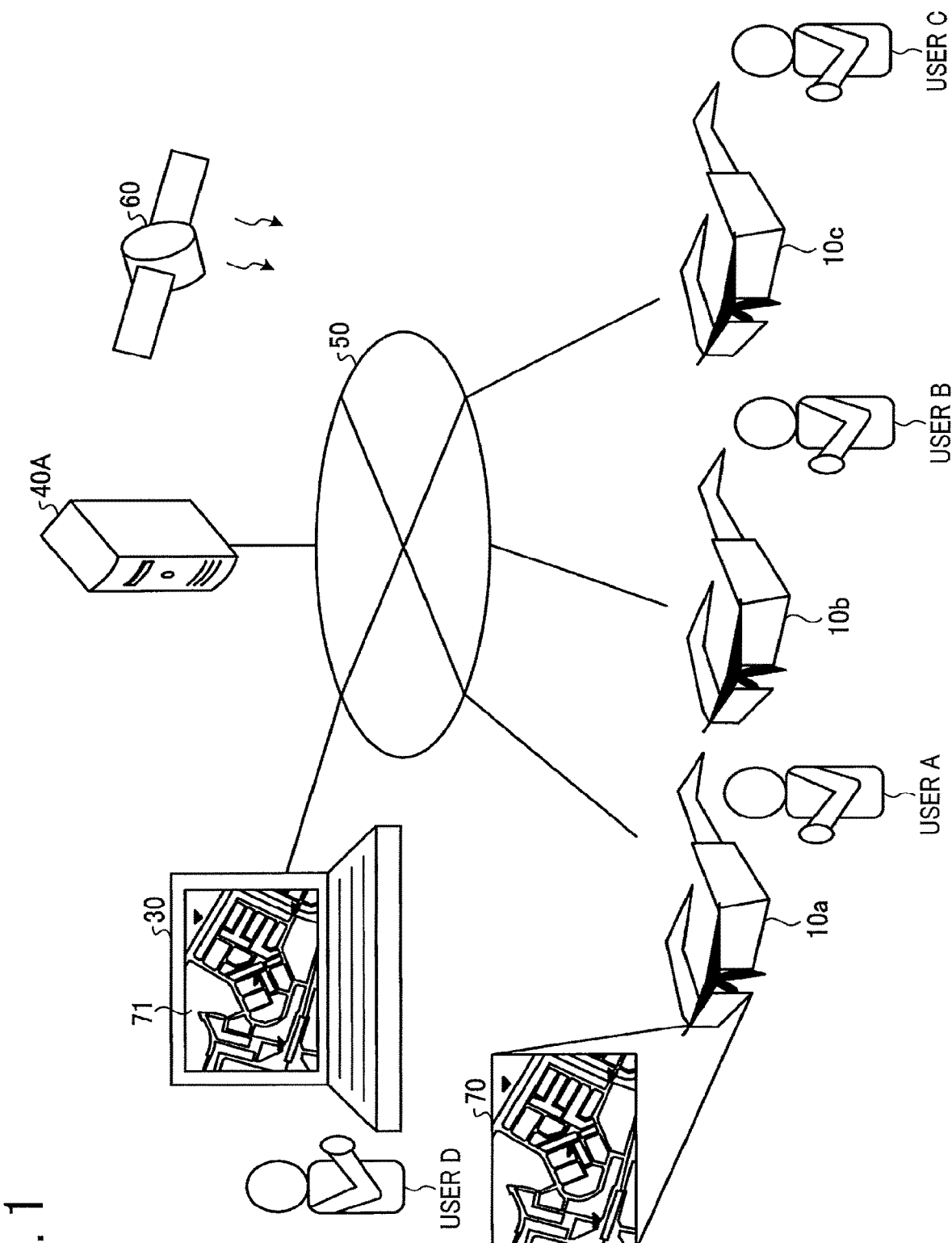
FIG. 1 is a diagram illustrating a configuration of an example of an information sharing system according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of an information sharing system, an information sharing method, a terminal device, and an information processing program recorded on a recording medium will be described with reference to the appended drawings.

First Embodiment

FIG. 1 illustrates a configuration of an example of an information sharing system according to a first embodiment. The information sharing system illustrated in FIG. 1 includes a plurality of terminal devices 10a, 10b, 10c, and 30 respectively used by users A, B, C, and D, and a management server 40A. The terminal devices 10a, 10b, 10c, and 30, and the management server 40A are communicatively connected to one another by a network 50. The network 50 is, for example, the Internet. The network 50 is not limited to the Internet, and may be a local area network (LAN).

In the example of FIG. 1, the terminal device 10a, the terminal device 10b, and the terminal device 10c are small, light, and easily portable mobile terminals, and include a spectacle-type device mounted on a head of a person in a spectacle manner. The spectacle-type device uses a lens unit of spectacles as a display to display an image. The spectacle-type device is also called head mount-type display. Further, the terminal device 10a, the terminal device 10b, and the terminal device 10c are connected to the network 50 by wireless communication. In the example of FIG. 1, the terminal device 30 is a non-mobile terminal placed on a desk or the like, and is implemented by a general-purpose computer. The terminal device 30 is connected to the network 50 by wired communication, for example. The communication of the terminal device 30 is not limited to the wired communication, and may be connected to the network 50 by wireless communication.

The management server 40A is a server device including a configuration equivalent to a general-purpose computer. The terminal devices 10a, 10b, 10c, and 30 perform communication with one another through the management server 40A.

At least one of the terminal device 10a, the terminal device 10b, and the terminal device 10c as the spectacle-type devices responds to a global navigation satellite system (GNSS). For example, the terminal device 10a receives a signal transmitted from the satellite 60 through the GNSS to acquire position information that indicates the position of the own device on the basis of the received signal. The terminal device 10a transmits the acquired position information together with identification information that identifies the terminal device 10a to the management server 40A. The management server 40A can transmit the position information and the identification information transmitted from the terminal device 10a to other terminal devices 10b, 10c, and 30, for example.

The terminal device 10a, the terminal device 10b, and the terminal device 10c display, on respective displays, a screen 70 including a map image and the position information that indicates the position of the terminal device 10a. Similarly, the terminal device 30 displays a screen 71 including the map image and the position information that indicates the position of the terminal device 10a.

FIG. 1 illustrates an example in which the information sharing system includes the four terminal devices including the terminal devices 10a, 10b, 10c, and 30. However, an embodiment is not limited to this example. The information sharing system may just include two or more terminal devices, at least one of which is the spectacle-type device according to the first embodiment.

Figure 2:
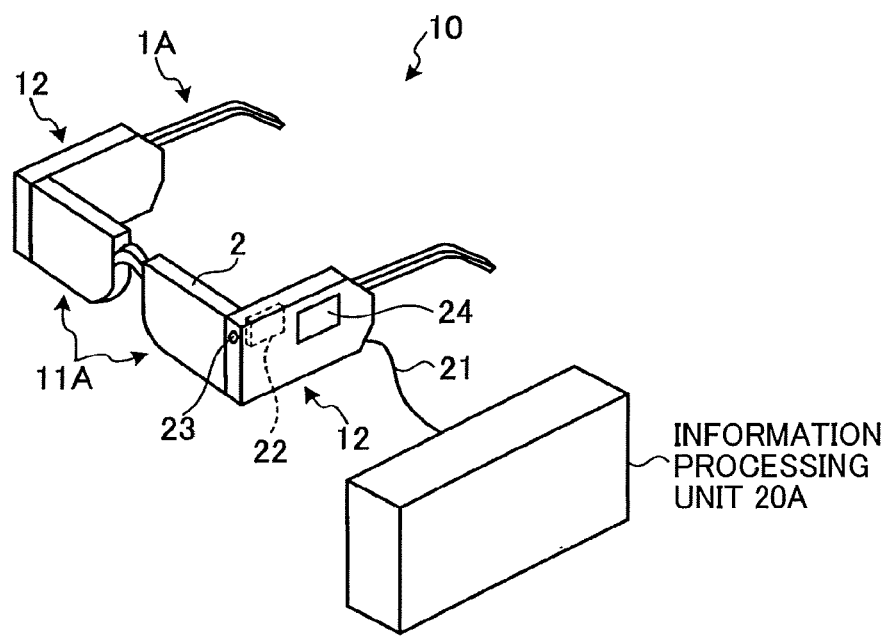
FIG. 2 is a perspective view illustrating an appearance of an example of a terminal device according to the first embodiment.

An example of configurations of the terminal device 10a, the terminal device 10b, and the terminal device 10c as the spectacle-type devices applicable to the first embodiment will be described in FIG. 2 to FIG. 4. FIG. 2 is a perspective view illustrating an appearance of an example of the terminal device 10 corresponding to the terminal device 10a, the terminal device 10b, and the terminal device 10c according to the first embodiment. Hereinafter, when there is no need to distinguish the terminal device 10a, the terminal device 10b, and the terminal device 10c, in particular, these terminal devices 10a, 10b, and 10c are collectively referred to as terminal device 10.

In FIG. 2, the terminal device 10 includes a spectacle unit 1A as the spectacle-type device including sets of a front 11A and a temple 12 respectively provided on the right and left in an approximately symmetrical manner, and an information processing unit 20A coupled to the spectacle unit 1A through a cable 21. The spectacle unit 1A is a head mount display device mounted on a head of a user and which outputs a picture to eyeballs and the periphery of the eyeballs of the user.

In the spectacle unit 1A, the front 11A can be configured by a transmissive light-guiding plate 2, for example. The temple 12 includes a display system, a nine-axis sensor 22, a camera 23, and a configuration (hardware) for controlling the display system, the nine-axis sensor 22, and the camera 23. Further, an operation unit 24 that receives a user operation to the terminal device 10 is provided on a side surface of the temple 12. The operation unit 24 may be a switch operated when pressed or may be a touch pad operated when touched with a finger or the like.

The information processing unit 20A includes a power supply that supplies power to the spectacle unit 1A, and an information processor that performs processing of information transmitted to/received from the spectacle unit 1A through the cable 21. FIG. 2 illustrates the terminal device 10 having the configuration in which the spectacle unit 1A and the information processing unit 20A are separated. However, an embodiment is not limited to this example. That is, the information processing unit 20A can be made small and built in the temple 12 of the spectacle unit 1A.

Figure 3:
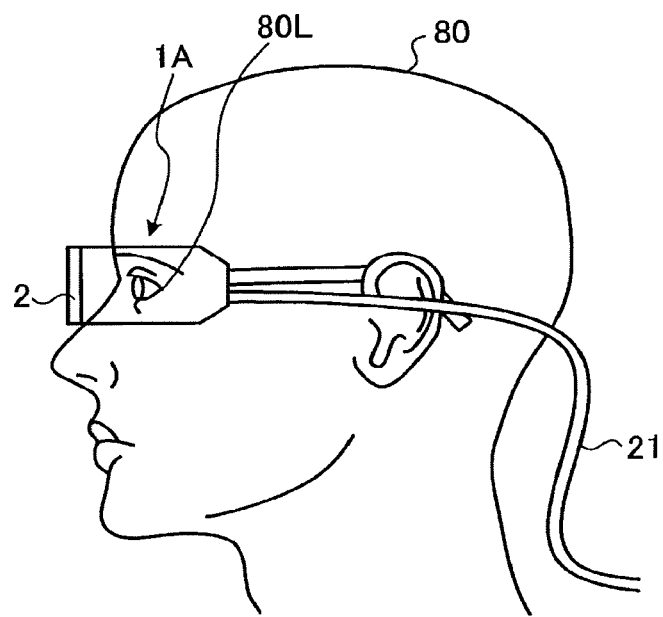
FIG. 3 is a schematic diagram schematically illustrating, from a left side of a head of a person, a state in which a spectacle unit in the terminal device according to the first embodiment is mounted on the head.

FIG. 3 schematically illustrates a state in which the spectacle unit 1A in the terminal device 10, illustrated in FIG. 2, is mounted on a head 80 of a person, viewed from a left side of the head 80. As illustrated, the spectacle unit 1A is mounted on the head 80 such that both eyes (only a left eye 80L is illustrated in FIG. 3) can see outside through the light-guiding plate 2. In other words, light from outside enters the eyeballs through the light-guiding plate 2.

In the spectacle unit 1A, the camera 23 is provided in the spectacle unit 1A to image the same direction as a gaze looking at the front when the spectacle unit 1A is correctly mounted on the head 80.

Here, the spectacle unit 1A is mounted on the head 80 with the temples put on both ears of the user, similarly to ordinary spectacles. However, an embodiment is not limited to this example. The spectacle unit 1A may have the fronts 11A that are attached to a visor of a cap or a helmet, or may have the fronts 11A that extend from a headphone-like band. Further, types of the spectacle unit 1A include a single-eye type and a both-eye type, and either one of the types is applicable.

Figure 4:
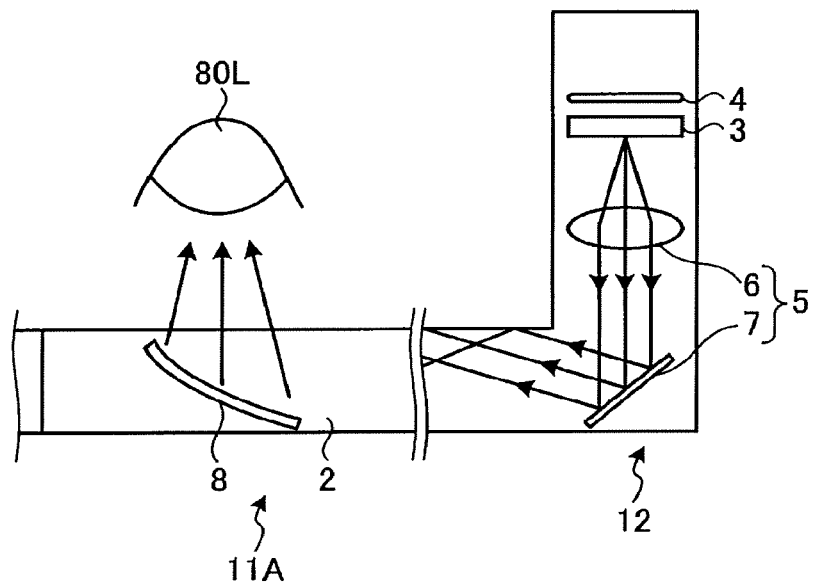
FIG. 4 is a diagram illustrating an example of a configuration of a display device built in the spectacle unit of the terminal device applicable to the first embodiment.

FIG. 4 illustrates an example of a configuration of the display system built in the front 11A and the temple 12 of the spectacle unit 1A of the terminal device 10, applicable to the first embodiment. FIG. 4 illustrates a configuration of the front 11A and the temple 12 on the left eye side of the spectacle unit 1A. A configuration of the front 11A and the temple 12 on the right eye side is realizable because the configuration is symmetrical to FIG. 4, and thus description here is omitted.

In FIG. 4, the display system included in the front 11A and the temple 12 includes a display element 3, a light source 4, and an optical unit 5. The optical unit 5 includes a lens unit 6 including one or more lenses, and a mirror 7 that totally reflects light entering through the lens unit 6. Further, the light-guiding plate 2 includes a half mirror 8 formed as a concave mirror.

The display element 3 includes an optical modulator that modulates light from the light source 4 for each pixel according to an image. The display element 3 may further include color filters of red (R), green (G), and blue (B). Picture light that is the light from the light source 4 and having been modulated according to the image is made to parallel light by the lens unit 6 and is reflected at the mirror 7 in a direction of the light-guiding plate 2. The picture light reflected at the mirror 7 is further reflected at a reflection surface provided inside the light-guiding plate 2, passes inside the light-guiding plate 2, and enters the half mirror 8. The half mirror 8 reflects the entering picture light toward the left eye 80L. The picture light reflected at the half mirror 8 and light from outside having been transmitted through the half mirror 8 are synthesized to enter the left eye 80L.

In this way, the picture light obtained such that the light from the light source 4 is modulated by the display element 3 according to the image is projected on the half mirror 8. Hereinafter, description will be given using the half mirror 8 as a display in the spectacle unit 1A unless otherwise particularly stated.

Figure 5:
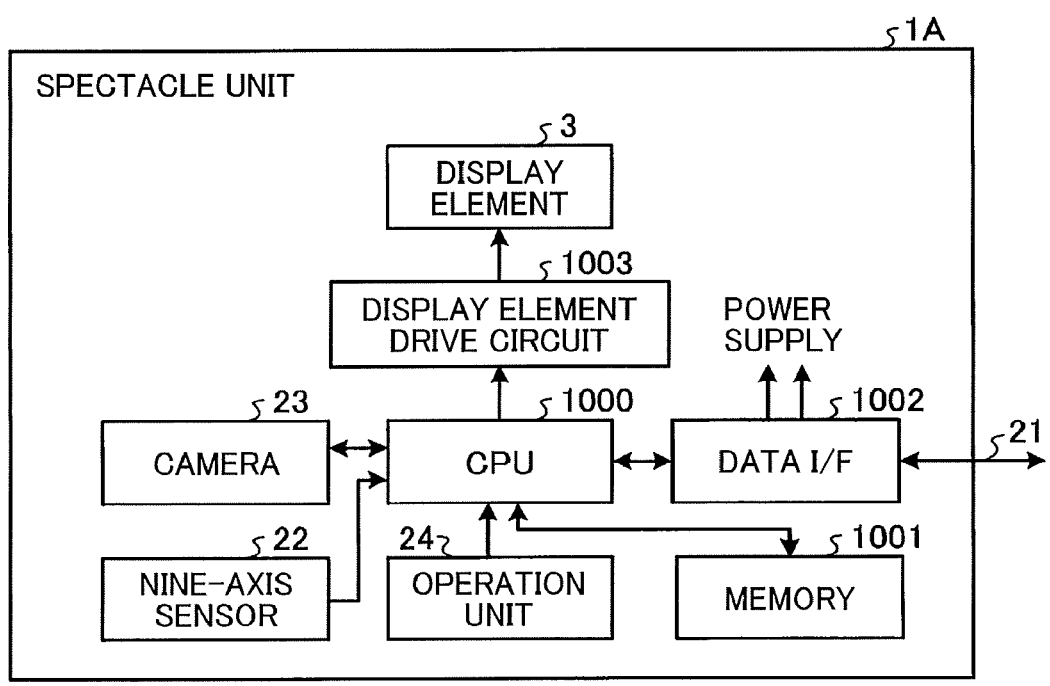
FIG. 5 is a block diagram illustrating an example of a hardware configuration of the spectacle unit applicable to the first embodiment.

FIG. 5 illustrates an example of a hardware configuration of the spectacle unit 1A applicable to the first embodiment. The spectacle unit 1A includes the display element 3, the nine-axis sensor 22, the camera 23, and the operation unit 24, described above, and a central processing unit (CPU) 1000, a memory 1001, a data interface (I/F) 1002, and a display element drive circuit 1003.

The memory 1001 includes, for example, a read only memory (ROM) area and a random access memory (RAM) area. The CPU 1000 controls the entire operation of the spectacle unit 1A, using the RAM area as a work memory, according to a program stored in the ROM area of the memory 1001 in advance.

The data I/F 1002 is coupled to the cable 21, and transmits and receives data to and from the information processing unit 20A through the cable 21. Further, when the data I/F 1002 is supplied with power from the information processing unit 20A through the cable 21, the data I/F 1002 supplies the power to the elements of the spectacle unit 1A.

The display element drive circuit 1003 generates a display drive signal for driving the display element 3 according to a display control signal generated by the CPU 1000 according to the image. The display element drive circuit 1003 supplies the generated display drive signal to the display element 3. The display element 3 is driven by the display drive signal supplied from the display element drive circuit 1003, and modulates the light from the light source 4 for each pixel according to the image.

In FIG. 5, the nine-axis sensor 22 includes a gyro sensor (angular velocity sensor), an acceleration sensor, and a magnetic field sensor that perform detection in three x, y, and z axes. A direction facing the front 11A of the spectacle unit 1A can be detected with high accuracy on the basis of a detection output of the magnetic field sensor of the nine-axis sensor 22 incorporated in the spectacle unit 1A. Further, an angle of the spectacle unit 1A with respect to horizontal direction can be detected with high accuracy on the basis of detection outputs of the gyro sensor and the acceleration sensor of the nine-axis sensor 22.

Therefore, a direction (posture) including the direction of the spectacle unit 1A can be detected with high accuracy on the basis of a detection output of the nine-axis sensor 22. In other words, a direction of a gaze of the user through the front 11A of the spectacle unit 1A can be measured.

The camera 23 can capture a moving image, and outputs a captured image at a predetermined frame rate such as 60 frames per second (fps), for example. The embodiment is not limited to the moving image, and the camera 23 may capture a still image.

Figure 6:
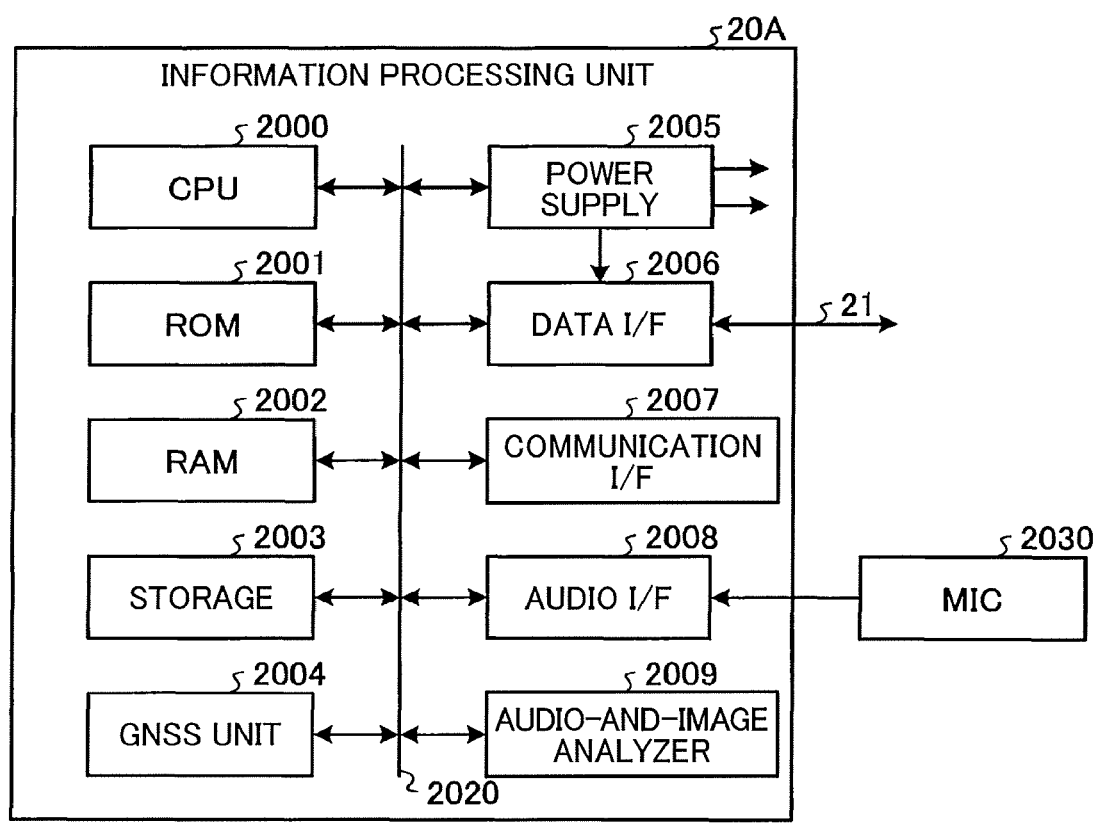
FIG. 6 is a block diagram illustrating an example of a hardware configuration of an information processing unit according to the first embodiment.

FIG. 6 illustrates an example of a hardware configuration of the information processing unit 20A according to the first embodiment. In FIG. 6, the information processing unit 20A includes a CPU 2000, a ROM 2001, a RAM 2002, a storage device 2003, a GNSS unit 2004, a power supply 2005, a data I/F 2006, a communication I/F 2007, an audio I/F 2008, and an audio-and-image analyzer 2009. The aforementioned elements are communicatively connected to one another by a bus 2020.

The storage device 2003 may be implemented by a non-volatile semiconductor memory such as a flash memory, for example. The embodiment is not limited to the non-volatile semiconductor memory, and a hard disk drive may be applied to the storage device 2003. The CPU 2000 controls the entire operation of the information processing unit 20A, using the RAM 2002 as a work memory, according to a program stored in the ROM 2001 or the storage device 2003.

The GNSS unit 2004 responds to the GNSS, and receives a radio wave from the satellite 60 in the GNSS to acquire position information that indicates a current position on the basis of information included in the received radio wave. The GNSS unit 2004 acquires the position information as latitude and longitude information. The GNSS unit 2004 can acquire time information that indicates a current time, together with the position information.

The power supply 2005 supplies power to the elements of the information processing unit 20A by a battery. Further, the power supply 2005 supplies the power to the data I/F 2006, the power being to be supplied to the spectacle unit 1A through the cable 21.

The data I/F 2006 is connected to the data I/F 1002 of the spectacle unit 1A through the cable 21, and transmits and receives data to and from the spectacle unit 1A. Systems of the data I/F 1002 and the data I/F 2006 may conform to a general-purpose standard such as universal serial bus (USB), or may be a unique system.

The communication I/F 2007 performs communication with the network 50 by wireless communication. The audio I/F 2008 inputs and outputs an audio signal. For example, the audio I/F 2008 includes an analog to digital converter (ADC), and converts an audio signal in an analog system, which is supplied from a microphone (MIC) 2030, into an audio signal in a digital system. Further, the audio I/F 2008 includes a digital to analog converter (DAC), and converts a supplied audio signal in the digital system into an audio signal in the analog system and outputs the converted audio signal.

The audio-and-image analyzer 2009 analyzes an audio signal and an image. For example, the audio-and-image analyzer 2009 analyzes the supplied audio signal to detect a specific word included in the audio signal. Further, for example, the audio-and-image analyzer 2009 analyzes the supplied image to detect a specific object included in the image, and to detect specific movement of the detected object.

Figure 7:
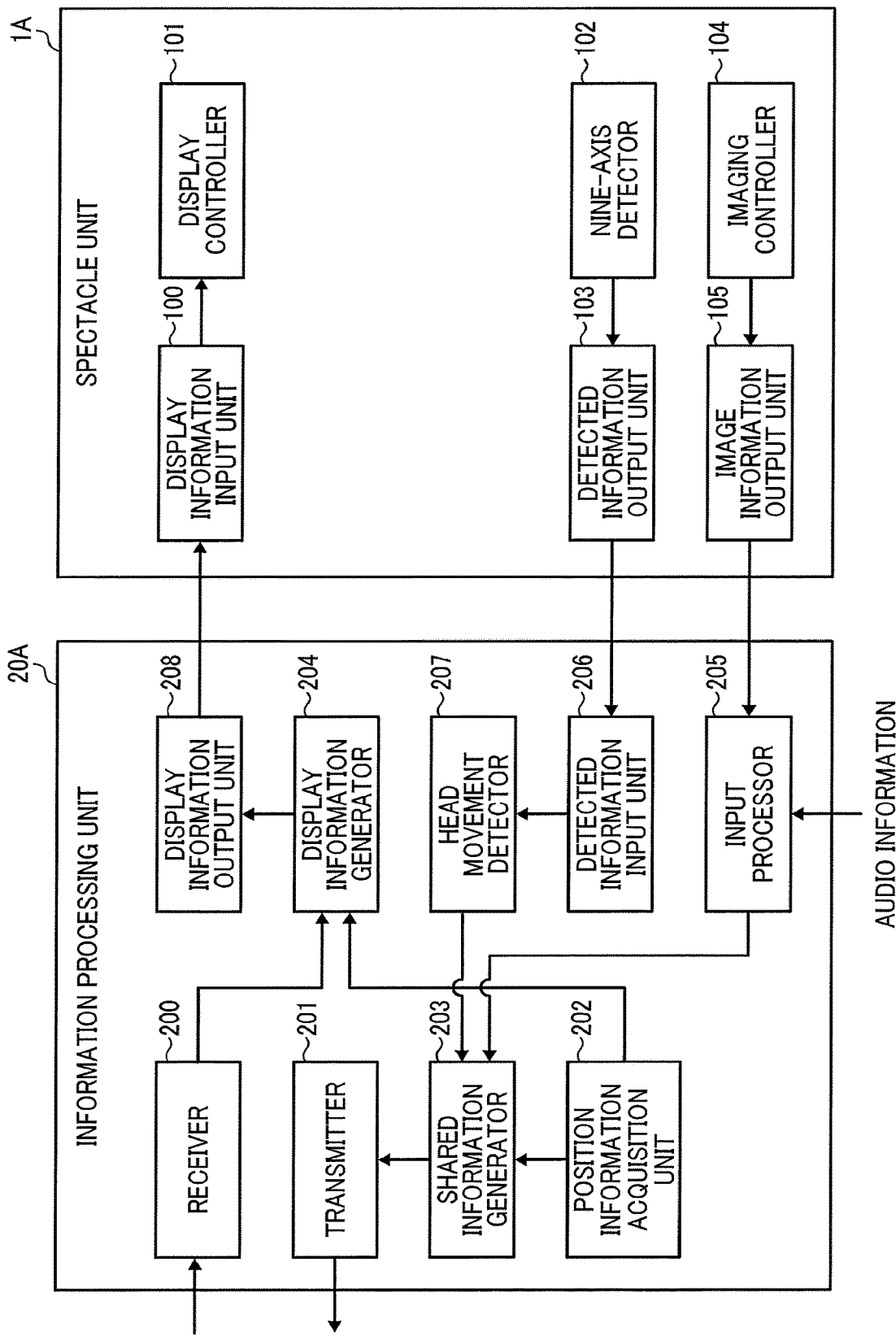
FIG. 7 is a functional block diagram illustrating functions of the terminal device according to the first embodiment.

FIG. 7 is a functional block diagram illustrating functions of the terminal device 10 according to the first embodiment. In FIG. 7, the spectacle unit 1A includes a display information input unit 100, a display controller 101, a nine-axis detector 102, a detected information output unit 103, an imaging controller 104, and an image information output unit 105.

The display information input unit 100, the display controller 101, the nine-axis detector 102, the detected information output unit 103, the imaging controller 104, and the image information output unit 105 are achieved by a program operated in the CPU 1000. The embodiment is not limited to this configuration, and a part or all of the display information input unit 100, the display controller 101, the nine-axis detector 102, the detected information output unit 103, the imaging controller 104, and the image information output unit 105 may be configured from hardware circuits operated in cooperation with one another.

Display information to be displayed in the display element 3 is input to the display information input unit 100, the display information being supplied from the information processing unit 20A to the spectacle unit 1A through the cable 21. The display controller 101 generates a display control signal for controlling the display by the display element 3 on the basis of the display information input to the display information input unit 100. The nine-axis detector 102 converts sensor outputs of the gyro sensor, the acceleration sensor, and the magnetic field sensor of the nine-axis sensor 22 into digital data. The detected information output unit 103 transmits, from the data I/F 1002, the sensor outputs of the nine-axis sensor 22, which have been converted by the nine-axis detector 102 into the digital data.

The imaging controller 104 controls an imaging operation of the camera 23 according to an instruction of the CPU 1000 to acquire a captured image output from the camera 23, for example. The imaging controller 104 can acquire the captured images output from the camera 23 at predetermined time intervals as a moving image. The embodiment is not limited to this configuration, and the imaging controller 104 may acquire the captured image as a still image at timing according to an operation to the operation unit 24 of the spectacle unit 1A, for example. The image information output unit 105 transmits, from the data I/F 1002, the captured image acquired from the imaging controller 104.

In FIG. 7, the information processing unit 20A includes a receiver 200, a transmitter 201, a position information acquisition unit 202, a shared information generator 203, a display information generator 204, an input processor 205, a detected information input unit 206, a head movement detector 207, and a display information output unit 208.

The receiver 200, the transmitter 201, the position information acquisition unit 202, the shared information generator 203, the display information generator 204, the input processor 205, the detected information input unit 206, the head movement detector 207, and the display information output unit 208 are achieved by a program operated on the CPU 2000. The embodiment is not limited to this configuration, and a part or all of the receiver 200, the transmitter 201, the position information acquisition unit 202, the shared information generator 203, the display information generator 204, the input processor 205, the detected information input unit 206, the head movement detector 207, and the display information output unit 208 may be configured from hardware circuits operated in cooperation with one another.

The receiver 200 receives information transmitted from the management server 40A through the network 50, for example. The receiver 200 passes the received information to the display information generator 204. The transmitter 201 transmits shared information (described below) generated by the shared information generator 203 to the management server 40A through the network 50, for example. The shared information is information shared among the terminal devices 10a, 10b, 10c, and 30, for example.

The position information acquisition unit 202 controls the GNSS unit 2004 to acquire a current position, using the GNSS. The position information acquisition unit 202 may acquire time information that indicates a current time together with the position information by the GNSS. The position information acquisition unit 202 passes the acquired position information that indicates the current position to the shared information generator 203 and the display information generator 204.

The input processor 205 analyzes the captured image output from the image information output unit 105, and passes an analysis result to the shared information generator 203. For example, when the input processor 205 detects a specific gesture or the like from the captured image through the analysis of the captured image, the input processor 205 outputs information associated with the gesture in advance as the analysis result.

Further, an audio signal in the digital system can be input to the input processor 205 as audio information. The input processor 205 analyzes the input audio information, and passes an analysis result to the shared information generator 203. For example, when the input processor 205 detects a specific word or the like from the audio information through the analysis of the audio information, the input processor 205 outputs information associated with the word in advance as the analysis result.

In the first embodiment, distance information that indicates a distance to an observation target of the user of the terminal device 10 is input by a gesture or an audio. The input processor 205 outputs the distance information input by gesture or audio information as the analysis result of the gesture or audio information.

The detected information input unit 206 functions as an input interface of the sensor outputs of the nine-axis sensor 22, which have been output from the detected information output unit 103, and passes the sensor outputs input from the nine-axis sensor 22 to the head movement detector 207. The head movement detector 207 successively analyzes the sensor outputs of the nine-axis sensor 22, which have been passed from the detected information input unit 206, to detect movement of the spectacle unit 1A mounted on the head 80.

For example, the head movement detector 207 analyzes the output of the magnetic field sensor, of the sensor outputs passed from the detected information input unit 206, to calculate a direction the front 11A of the spectacle unit 1A faces. The head movement detector 207 can further calculate an inclination of the front 11A with respect to a vertical direction on the basis of the output of the acceleration sensor, of the sensor outputs, in parallel with the calculation of the direction on the basis of the output of the magnetic field sensor.

The head movement detector 207 can acquire posture information that indicates a posture of the spectacle unit 1A as three-dimensional information by the calculation of the direction the front 11A faces and the inclination of the front 11A. Accordingly, the direction of the gaze of the user through the front 11A of the spectacle unit 1A can be measured with high accuracy. The head movement detector 207 passes the acquired posture information that indicates the posture of the spectacle unit 1A to the shared information generator 203.

The position information passed from the position information acquisition unit 202, the posture information passed from the head movement detector 207, and the analysis result of the captured image or the audio information passed from the input processor 205 are input to the shared information generator 203. The shared information generator 203 generates shared information on the basis of the position information, the posture information, and the analysis result. The shared information generator 203 passes the generated shared information to the transmitter 201.

In this way, an acquisition unit that acquires the shared information is configured from the position information acquisition unit 202, the shared information generator 203, the input processor 205, the detected information input unit 206, and the head movement detector 207 in the information processing unit 20A.

The display information generator 204 generates the display information to be displayed in the display element 3 on the basis of the position information and the time information passed from the position information acquisition unit 202 and the information passed from the receiver 200. For example, the display information generator 204 includes at least a video memory having a capacity corresponding to the number of pixels of the display element 3, and writes pixel information to the video memory according to the generated display information. The display information generated in the display information generator 204 is transmitted to the spectacle unit 1A through the display information output unit 208 and is input to the display information input unit 100.

An information processing program for achieving the functions of the information processing unit 20A according to the first embodiment is recorded in a computer readable recording medium such as a compact disk (CD), a flexible disk (FD), or a digital versatile disk (DVD) in an installable or executable format file, and is provided. The embodiment is not limited to the above example, and the information processing program may be stored on a computer connected to a network such as the Internet and downloaded through the network. Alternatively, the information processing program may be provided or distributed through the network such as the Internet.

The information processing program has a module configuration including the above-described elements (the receiver 200, the transmitter 201, the position information acquisition unit 202, the shared information generator 203, the display information generator 204, the input processor 205, the detected information input unit 206, the head movement detector 207, and the display information output unit 208). As actual hardware, when the CPU 2000 reads the information processing program from a storage medium such as the storage device 2003 and executes the information processing program, the above-described elements are loaded on a main storage device such as the RAM 2002, and the receiver 200, the transmitter 201, the position information acquisition unit 202, the shared information generator 203, the display information generator 204, the input processor 205, the detected information input unit 206, the head movement detector 207, and the display information output unit 208 are generated on the main storage device.

Figure 8:
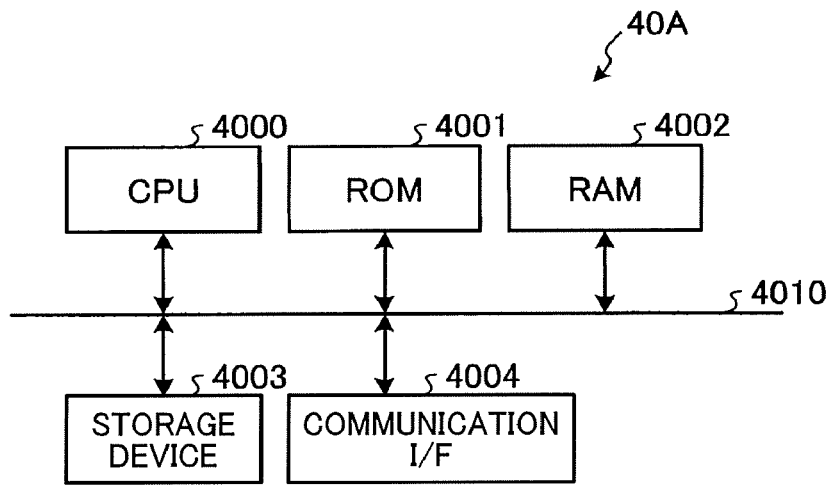
FIG. 8 is a block diagram illustrating an example of a hardware configuration of a management server applicable to the first embodiment.

FIG. 8 illustrates an example of a hardware configuration of the management server 40A applicable to the first embodiment. The management server 40A may include a configuration similar to that of a general-purpose server device. For example, as illustrated in FIG. 8, the management server 40A includes a CPU 4000, a ROM 4001, a RAM 4002, a storage device 4003, and a communication I/F 4004. These elements are communicatively connected to one another by a bus 4010.

The storage device 4003 is a storage medium that stores information in a non-volatile manner, and a hard disk drive is applicable. The embodiment is not limited to the hard disk drive, and a non-volatile semiconductor memory such as a flash memory may be applied to the storage device 4003, for example. The CPU 4000 controls the entire operation of the management server 40A, using the RAM 4002 as a work memory, according to a program stored in the ROM 4001 or the storage device 4003 in advance. The communication I/F 4004 performs communication through the network 50.

Figure 9:
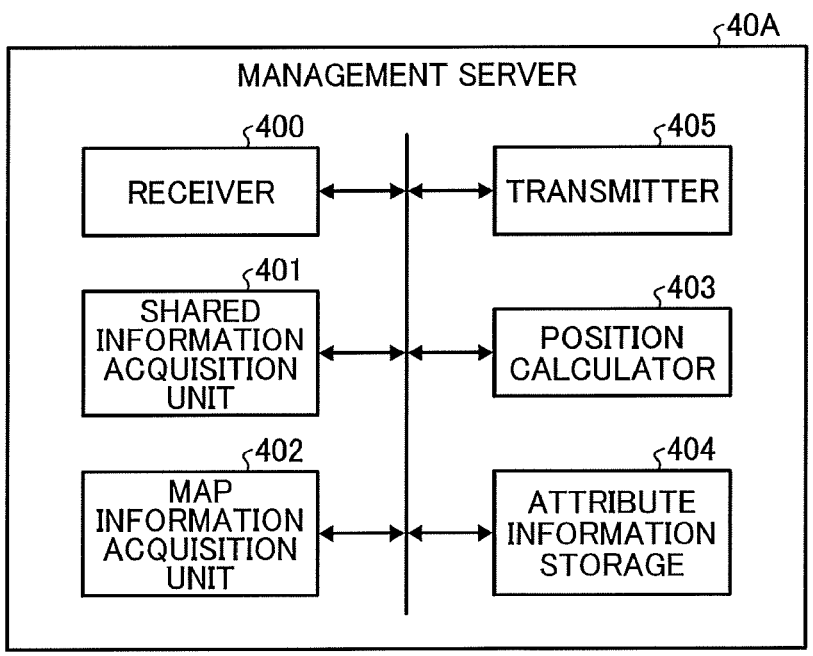
FIG. 9 is a functional block diagram illustrating functions of the management server according to the first embodiment.

FIG. 9 is a functional block diagram illustrating functions of the management server 40A according to the first embodiment. In FIG. 9, the management server 40A includes a receiver 400, a shared information acquisition unit 401, a map information acquisition unit 402, a position calculator 403, an attribute information storage 404, and a transmitter 405. The receiver 400, the shared information acquisition unit 401, the map information acquisition unit 402, the position calculator 403, and the transmitter 405 are achieved by a program operated on the CPU 4000. The attribute information storage 404 is formed in a predetermined area on the storage device 4003, for example.

The embodiment is not limited to the example, and a part or all of the receiver 400, the shared information acquisition unit 401, the map information acquisition unit 402, the position calculator 403, and the transmitter 405 may be configured from hardware circuits operated in cooperation with one another.

The receiver 400 receives information transmitted through the network 50. The transmitter 405 transmits information through the network 50. When the information received by the receiver 400 includes the shared information described above, the shared information acquisition unit 401 acquires the shared information.

The map information acquisition unit 402 acquires map information through the network 50, for example. The map information acquisition unit 402 can acquire the map information, using a map information providing service provided through the network 50. The embodiment is not limited to the example, and the management server 40A may have the map information stored in the storage device 4003 or the like in advance, and the map information acquisition unit 402 may acquire the map information stored by the management server 40A.

The position calculator 403 calculates position information that indicates a position of a target on the basis of the shared information acquired by the shared information acquisition unit 401. The attribute information storage 404 stores an attribute information table in which attribute information that indicates an attribute of the target and a marker image representing the attribute are associated with each other.

In such a configuration, a user A has the terminal device 10*a* mounted on the head 80 and faces the direction of the observation target. Accordingly, the user A can visually recognize the target through the fronts 11A of the spectacle unit 1A in the terminal device 10*a*. The terminal device 10*a* successively executes acquisition of the position information by the position information acquisition unit 202 and acquisition of the posture information by the head movement detector 207, and transmits the shared information including the acquired position information and posture information, and the identification information that identifies the terminal device 10*a*, to the management server 40A through the network 50.

The management server 40A receives the shared information transmitted from the terminal device 10*a*. The management server 40A acquires, by the map information acquisition unit 402, the map information including the position indicated by the position information on the basis of the position information included in the received shared information. The management server 40A transmits, by the transmitter 405, the map information, the position information, and the posture information to the terminal device 10*b*, the terminal device 10*c*, and the terminal device 30 through the network 50.

The terminal device 10*b*, the terminal device 10*c*, and the terminal device 30 receive the map information, the position information, and the posture information transmitted from the management server 40A. The terminal device 10*b*, the terminal device 10*c*, and the terminal device 30 superimpose a predetermined image that represents the terminal device 10*a* on a position corresponding to the position information, on a map image based on the map information, according to the received position information. Further, the terminal device 10*b*, the terminal device 10*c*, and the terminal device 30 can display the direction the front 11A of the terminal device 10*a* faces (that is, the direction visually recognized by the user A) according to direction information included in the received posture information.

In this way, the terminal device 10*b*, the terminal device 10*c*, and the terminal device 30 can share the position of the terminal device 10*a* and the direction visually recognized by the user A.

The terminal device 10*a* can process the position information acquired by the position information acquisition unit 202 and the posture information acquired by the head movement detector 207 inside the terminal device 10*a*. Therefore, the terminal device 10*a* can execute display that shows the position of the own device and the direction the own device faces (the direction the front 11A of the spectacle unit 1A faces) with the information acquired in the terminal device 10*a* without using the information transmitted from the management server 40A.

The terminal device 10*a* can further cause the input processor 205 to analyze the gesture and the audio input by the user A, and can acquire the distance information that indicates the distance to the target. The terminal device 10*a* transmits the acquired distance information together with the position information, the posture information, and the identification information to the management server 40A. The management server 40A calculates, by the position calculator 403, the position of the target on the basis of the position indicated by the position information transmitted from the terminal device 10*a*, the direction (posture) in the position, the direction being indicated by the posture information, and the distance information. The position of the target is calculated as coordinate information using latitude and longitude, for example.

The management server 40A transmits, by the transmitter 405, the position information calculated by the position calculator 403 as target information that indicates the target, together with the map information, and the position information and the posture information regarding the terminal device 10*a*, to the terminal device 10*b*, the terminal device 10*c*, and the terminal device 30 through the network 50. Further, the management server 40A can acquire the marker image from the attribute information storage 404 and can transmit the marker image together with the aforementioned information to the terminal device 10*b*, the terminal device 10*c*, and the terminal device 30. In this way, the position calculator 403 functions as a generator that generates the target information.

The terminal device 10*b*, the terminal device 10*c*, and the terminal device 30 superimpose the predetermined image that represents the terminal device 10*a* on the position corresponding to the position information, on the map image based on the map information, on the basis of the map information, the position information, and the posture information transmitted from the management server 40A, similarly to the above description. Further, the terminal device 10*b*, the terminal device 10*c*, and the terminal device 30 superimpose the predetermined marker image that represents the target on a position corresponding to the target information, on the map image based on the map information, on the basis of the target information transmitted from the management server 40A. In a case where the marker image has been transmitted from the management server 40A, the terminal device 10*b*, the terminal device 10*c*, and the terminal device 30 can use the marker image. Accordingly, the terminal device 10*b*, the terminal device 10*c*, and the terminal device 30 can share the position of the target.

Figure 10:
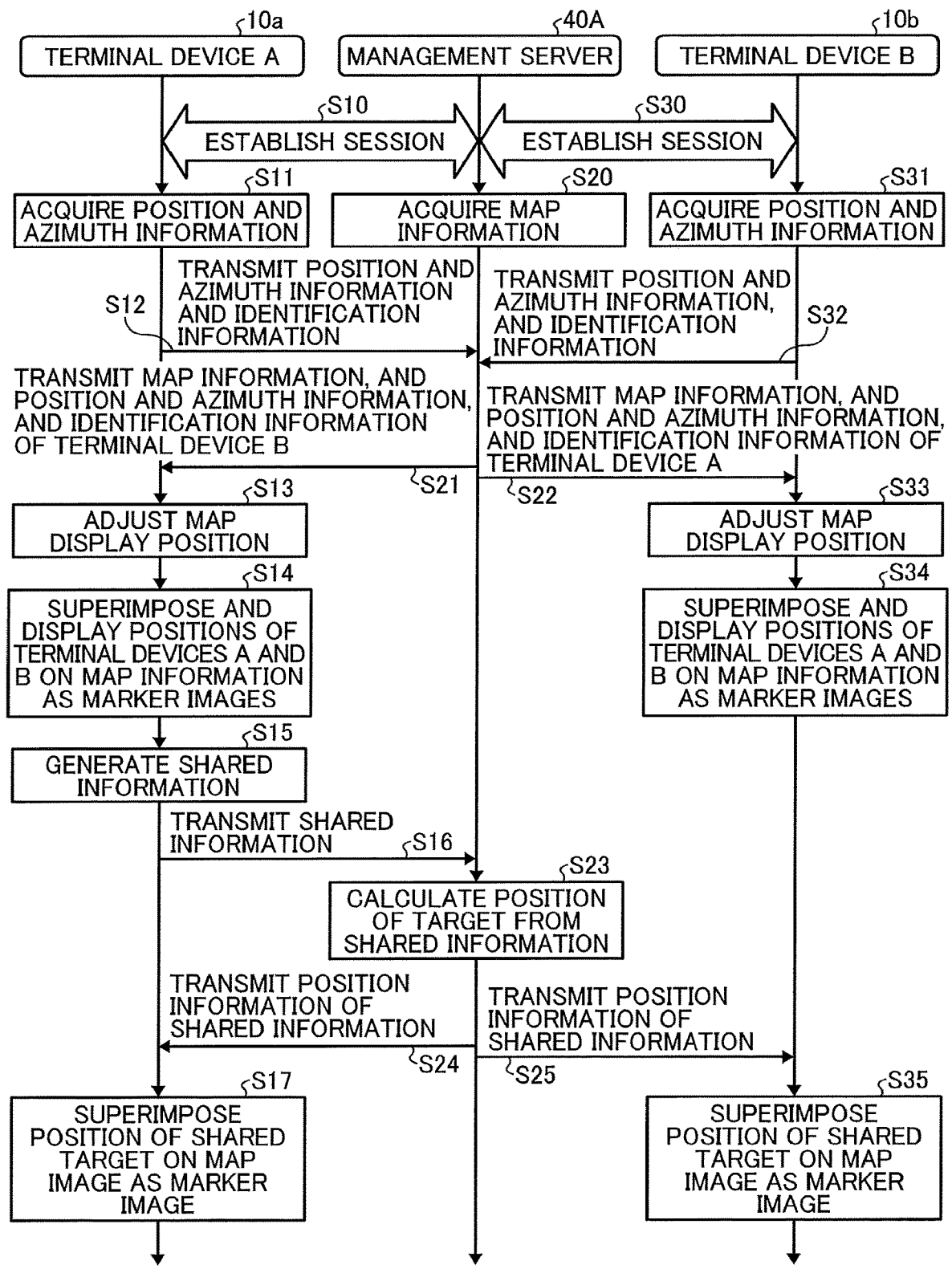
FIG. 10 is a sequence diagram illustrating an example of processing in the information sharing system according to the first embodiment.

FIG. 10 is a sequence diagram illustrating an example of processing in the information sharing system according to the first embodiment. In FIG. 10, a portion common to the portion in FIG. 1 is denoted with the same reference sign, and detailed description is omitted. Further, FIG. 10 illustrates the terminal device 10*a* as "terminal device A" and the terminal device 10*b* as "terminal device B", respectively.

Further, assume that the terminal device 10*a* transmits the shared information including the target information, and the terminal device 10*b* receives the shared information generated by the management server 40A on the basis of the shared information. In this case, other terminal devices 10*c* and 30 connected to the information sharing system can execute processing similar to the terminal device 10*b* concurrently. Hereinafter, description will be given using the terminal device 10*b* that represents the terminal device 10*b*, the terminal device 10*c*, and the terminal device 30.

First, in step S10 and step S30, the terminal device 10*a* and the terminal device 10*b* respectively establish sessions with the management server 40A. Accordingly, the terminal device 10*a* and the terminal device 10*b* become able to communicate with the management server 40A through the network 50.

When the terminal device 10*a* becomes able to communicate with the management server 40A, the terminal device 10*a* acquires, by the position information acquisition unit 202 included in the terminal device 10*a*, the position information that indicates the own position of the terminal device 10*a*, and the direction information that indicates the direction the spectacle unit 1A (front 11A) of the terminal device 10*a* faces (step S11). The terminal device 10*a* may further acquire the time information that indicates the current time. The terminal device 10*b* similarly acquires the position information and the direction information (step S31).

Hereinafter, the position information and the direction information are collectively referred to as position and direction information, and the description will be given, where the position and direction information acquired by the terminal device 10*a* is position and direction information A, and the position and direction information acquired by the terminal device 10*b* is position and direction information B, unless otherwise particularly stated.

The example of FIG. 10 illustrates that acquisition processing of the position and direction information of step S11 and step S31 is executed after establishment of the sessions of step S10 and step S30. However, the embodiment is not limited to this example. That is, the terminal device 10*a* and the terminal device 10*b* can acquire the position and direction information regardless of existence or non-existence of establishment of the sessions with the management server 40A.

Further, the above description has been given such that the terminal device 10*a* acquires the position information, using the GNSS. However, the embodiment is not limited to this example. For example, the terminal device 10*a* can acquire the position information on the basis of a beacon signal by a wireless LAN, which is transmitted indoors.

Meanwhile, the management server 40A acquires the map information by the map information acquisition unit 402 (step S20). For example, in the management server 40A, the map information of a predetermined range is stored in the storage device 4003 or the like in advance, and the map information acquisition unit 402 acquires the stored map information. In a case where the map information is acquired through the network 50 by the map information providing service, the management server 40A acquires the map information of a predetermined range from the map information providing service, for example. The range of the acquired map information is set in advance after prediction of existing positions of the terminal device 10*a* and the terminal device 10*b*.

The terminal device 10*a* transmits the acquired position and direction information A and the identification information that identifies the terminal device 10*a* to the management server 40A when acquiring the position and direction information A in step S11 (step S12). Similarly, the terminal device 10*b* transmits the acquired position and direction information B and the identification information that identifies the terminal device 10*b* to the management server 40A when acquiring the position and direction information B in step S31 (step S32).

The management server 40A transmits the map information and the position and direction information A to the terminal device 10*b* when receiving the position and direction information A transmitted from the terminal device 10*a* in step S12 (step S22). Further, the management server 40A transmits the map information and the position and direction information B to the terminal device 10*a* when receiving the position and direction information B transmitted from the terminal device 10*b* in step S32 (step S21).

The terminal device 10*a* adjusts, by the display information generator 204, a range to be displayed on the map image on the basis of the map information, on the basis of the position and direction information B and the own position and direction information A acquired by the terminal device 10*a* when receiving the map information and the position and direction information B from the management server 40A (step S13). For example, the display information generator 204 adjusts the range such that the position indicated by the position information included in the position and direction information A is brought to the center, and the position indicated by the position information included in the position and direction information B is included.

The terminal device 10*a* generates, by the display information generator 204, the map image in the range adjusted in step S13, on the basis of the map information, and superimposes the predetermined marker images that respectively represent the terminal device 10*a* and the terminal device 10*b*, on the positions on the generated map image, the positions being indicated by the position information included in the position and direction information A and the position and direction information B. The display information generator 204 stores the marker images in advance. The terminal device 10*a* displays the map image on which the marker images are superimposed, on the display of the spectacle unit 1A included in the terminal device 10*a* (step S14).

The terminal device 10*b* similarly adjusts a range to be displayed on the map image on the basis of the map information such that the position indicated by the position information included in the position and direction information B is brought to the center, and the position indicated by the position information included in the position and direction information A is included, on the basis of the position and direction information A and the own position and direction information B acquired by the terminal device 10*b* when receiving the map information and the position and direction information A from the management server 40A (step S33).

The terminal device 10*b* generates the map image in the range adjusted in step S33 and superimposes the marker images that respectively represent the terminal device 10*a* and the terminal device 10*b*, on the positions on the generated map image, the positions being indicated by the position information included in the position and direction information B and the position and direction information A. The terminal device 10*b* displays the map image on which the marker images are displayed, on the display of the spectacle unit 1A included in the terminal device 10*b* (step S34).

A screen displayed on the display of the spectacle unit 1A included in the terminal device 10*a* according to the first embodiment will be described in FIG. 11A and FIG. 11B. Assume that the user A mounts the spectacle unit 1A of the terminal device 10*a* on the head, and visually recognizes a target 500, as exemplarily illustrated in FIG. 11A.

Figure 11A:
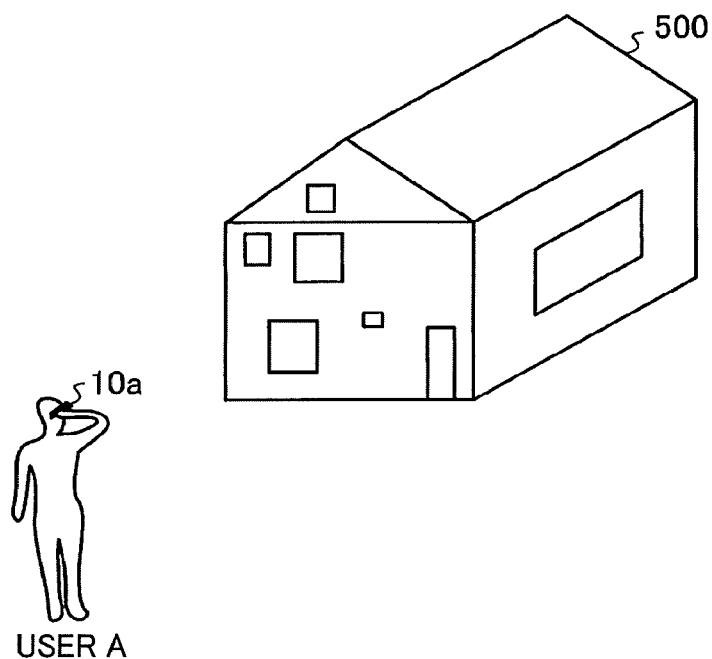
FIG. 11A and FIG. 11B are diagrams for describing a screen to be displayed on a display of the spectacle unit included in the terminal device according to the first embodiment.
Figure 11B:
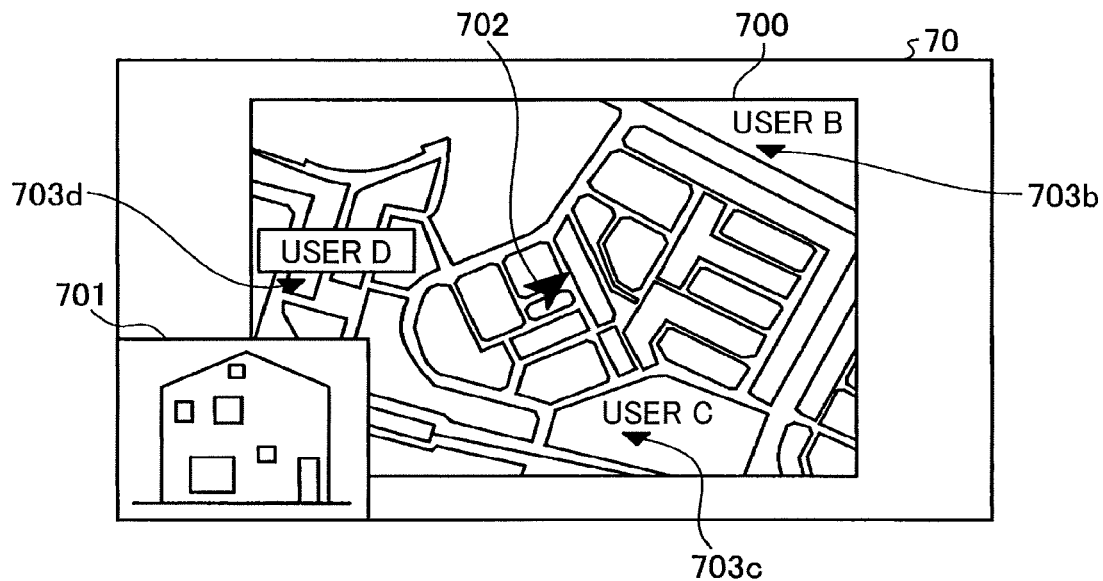

FIG. 11B illustrates an example of a screen displayed on the display of the spectacle unit 1A included in the terminal device 10a in the case of FIG. 11A. In FIG. 11B, a screen 70 displayed on the display includes a map image 700. On the map image 700, an own device marker 702 as the marker image that represents the own device (terminal device 10a) is superimposed and displayed on a position corresponding to the position information acquired by the position information acquisition unit 202. At this time, the own device marker 702 is displayed to point to the direction the spectacle unit 1A faces according to the direction information detected in the head movement detector 207.

Further, on the map image 700, a marker image 703b that represents the terminal device 10b and the identification information that identifies the terminal device 10b are superimposed and displayed on a position corresponding to the position information included in the position and direction information B. In this example, a user name (user B) who uses the terminal device 10b is used as the identification information of the terminal device 10b. As for the terminal device 10c, a marker image 703c that represents the terminal device 10c and the identification information (user C) that identifies the terminal device 10c are similarly superimposed and displayed on the position corresponding to the position information included in the position and direction information of the terminal device 10c.

As for the terminal device 30 as a non-mobile terminal, a marker image 703d can be superimposed and displayed on the position on the map image 700, the position corresponding to the position of the terminal device 30, similarly to the terminal device 10b and the terminal device 10c as mobile terminals, if the terminal device 30 can acquire the own position information.

Further, the user A can have the captured image displayed on the screen 70, the captured image having been imaged with the camera 23 of the terminal device 10a. In the example of FIG. 11B, an image 701 by the captured image is partially superimposed on the map image 700 and displayed on the screen 70. Further, in step S12, the captured image is transmitted together with the position and direction information A and the identification information to the management server 40A, so that the image 701 can be displayed on the respective screens 70 of the terminal device 10b and the terminal device 10c. Further, similarly, the image 701 can be displayed on the screen 71 of the terminal device 30.

The processing of step S11 to step S14 in the terminal device 10a, the processing in step S31 to step S34 in the terminal device 10b, and the processing in step S21 and step S22 in the management server 40A described above are repeatedly executed at predetermined time intervals, for example.

Referring back to FIG. 10, the terminal device 10a is provided with an instruction to start information sharing to share the target information with the terminal device 10b from the user A, for example, the terminal device 10a generates the shared information by the shared information generator 203 (step S15). The terminal device 10a transmits the generated shared information to the management server 40A (step S16).

More specifically, the shared information generator 203 acquires the direction information detected in the head movement detector 207 and the position information acquired in the position information acquisition unit 202. Further, the shared information generator 203 acquires the distance information that indicates the distance from the user A to the target by a method described below. The shared information generator 203 generates the shared information including the acquired direction information, position information, and distance information (step S15) to acquire the shared information. The terminal device 10a transmits the shared information acquired by the shared information generator 203 to the management server 40A (step S16).

In step S23, the management server 40A receives the shared information transmitted from the terminal device 10a, and obtains the position of the target 500 on the basis of the received shared information. More specifically, the management server 40A calculates the latitude and the longitude as the position information of the target 500, using the position information and the direction information of the user A, and the distance information that indicates the distance from the user A to the target 500, which are included in the shared information.

As the method of obtaining the latitude and the longitude of the target, on the basis of the position information and the direction information at a reference position, and the distance information from the reference position to the target in the direction indicated by the direction information, calculation methods using the Vincenty's formulae and the Hubeny's formula are known.

The management server 40A transmits the target information including the position information that indicates the position of the target 500 as the shared information obtained in step S23 to the terminal device 10a and the terminal device 10b (step S24 and step S25).

The terminal device 10a receives the target information transmitted from the management server 40A. The terminal device 10a further superimposes a marker image that represents the target 500 on a position on the map image, the position corresponding to the position information that indicates the position of the target 500 included in the received target information, on the map image on which the marker images that represent the terminal device 10a and the terminal device 10b are superimposed in step S14 (step S17). The terminal device 10a displays the map image on which the marker image that represents the target 500 is further superimposed, on the display of the spectacle unit 1A included in the terminal device 10a.

Similarly, the terminal device 10b receives the target information transmitted from the management server 40A. The terminal device 10b further superimposes a marker image that represents the target 500 on a position on the map image, the position corresponding to the position information that indicates the position of the target 500 included in the received target information, on the map image on which the marker images that represent the terminal device 10b and the terminal device 10a are superimposed in step S34 (step S35). The terminal device 10b displays the map image on which the marker image that represents the target 500 is further superimposed, on the display of the spectacle unit 1A included in the terminal device 10b.

Figure 12:
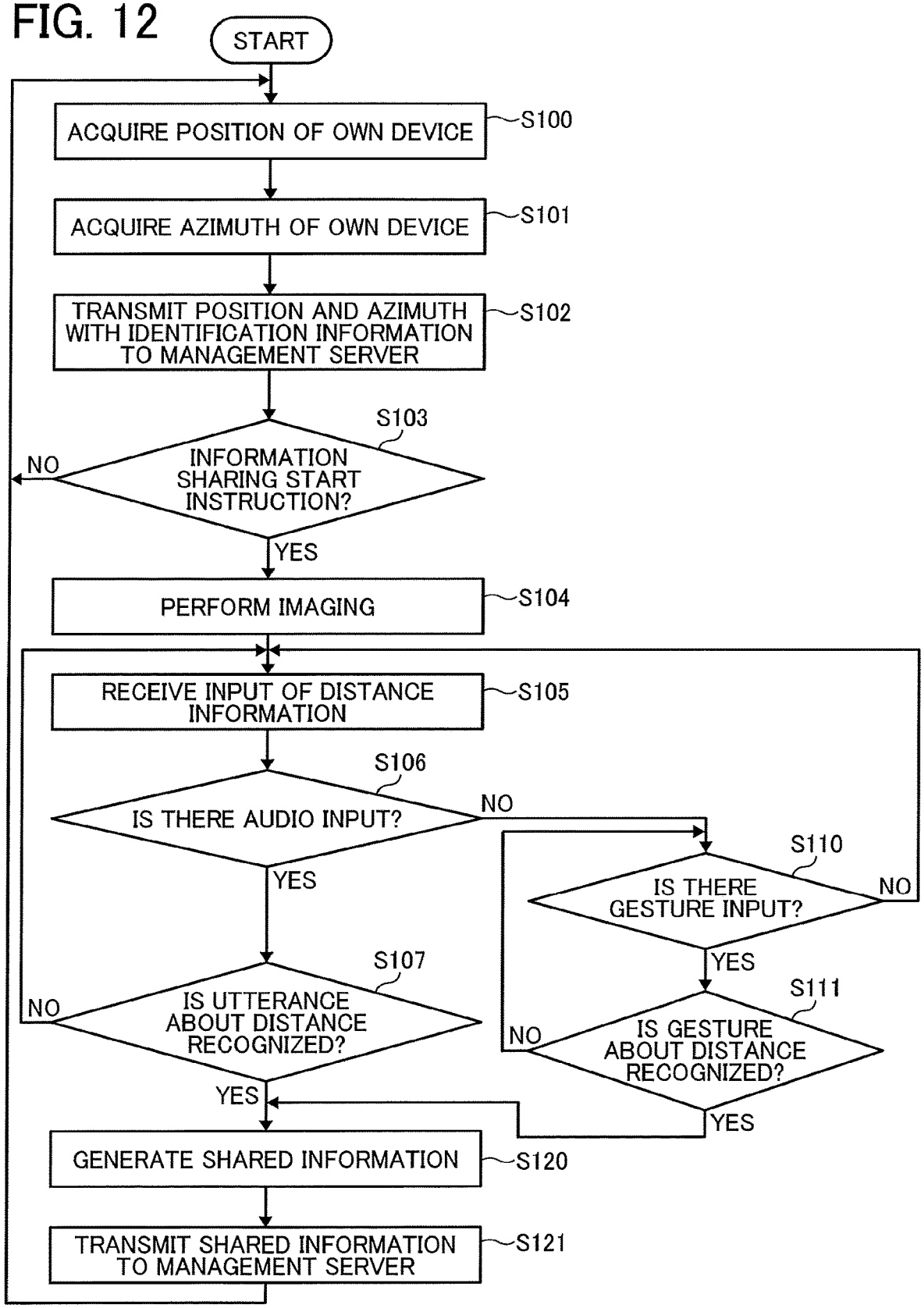
FIG. 12 is a flowchart of an example illustrating operation of generating shared information according to the first embodiment.

FIG. 12 is a flowchart of an example illustrating a method of generating the shared information according to the first embodiment. The processing of step S11 to step S16 of the terminal device 10a in the sequence diagram of FIG. 10 described above will be described in detail with reference to the flowchart of FIG. 12. Here, description will be given, assuming that the information sharing is performed for the target 500 visually recognized by the user A through the fronts 11A of the terminal device 10a mounted on the head 80.

In step S100 in FIG. 12, the terminal device 10a acquires, by the position information acquisition unit 202, the position information that indicates the own position of the terminal device 10a. In next step S101, the terminal device 10a acquires, by the head movement detector 207, the direction information that indicates the direction the spectacle unit 1A (front 11A) of the terminal device 10a faces. In next step S102, the terminal device 10a transmits the position information acquired in step S100 and the direction information acquired in step S101 together with the identification information that identifies the terminal device 10a to the management server 40A.

In next step S103, the terminal device 10a determines whether the information sharing start instruction has been provided by the user A. For example, the terminal device 10a determines that the information sharing start instruction has been provided when detecting a predetermined operation to the operation unit 24 provided in the spectacle unit 1A. When the terminal device 10a determines that the information sharing start instruction has not been provided ("No" in step S103), the terminal device 10a returns the processing to step S100.

Meanwhile, when the terminal device 10a determines that the information sharing start instruction has been provided ("Yes" in step S103), the terminal device 10a moves the processing onto step S104. In step S104, the terminal device 10a images the target 500 with the camera 23. At this time, the user A who mounts the terminal device 10a turns to look at the direction of the target 500 that the user A wants to share information, and visually recognizes the target 500 through the fronts 11A of the spectacle unit 1A in a state of gazing at the front. In this state, the terminal device 10a performs imaging in step S104.

Here, the camera 23 is provided in the spectacle unit 1A to image the same direction as the gaze looking at the front when the spectacle unit 1A of the terminal device 10a is correctly mounted on the head 80, as described above. Therefore, the captured image obtained through the imaging with the camera 23 can be regarded to correspond to the scene in a gaze direction of when the user A faces the front.

The spectacle unit 1A transfers the captured image obtained by the camera 23 to the information processing unit 20A through the cable 21. The information processing unit 20A stores the captured image transferred from the spectacle unit 1A to the storage device 2003, for example.

In next step S105, the terminal device 10a starts to receive an input of the distance information that indicates the distance from the user A to the target 500. Here, the terminal device 10a receives the input of the distance information in response to an audio or a predetermined gesture of the user A who mounts the spectacle unit 1A of the terminal device 10a.

An example of the input of the distance information with the audio will be schematically described. In the terminal device 10a, the audio I/F 2008 of the information processing unit 20A is connected to the microphone 2030. The user A measures the distance to the target 500 by visual recognition, for example, and utters a keyword that indicates the measured distance in a sound collectable manner by the microphone 2030. The keyword can be configured from a combination of a numerical value and a unit, for example. For example, the user A utters "five meters" toward the microphone 2030 when the distance to the target 500 is 5 m (meters).

In the terminal device 10a, the input processor 205 converts the audio signal in the analog system output from the microphone 2030 and input from the audio I/F 2008 into the audio signal in the digital system, and analyzes the audio signal, using a known audio analysis technology. The input processor 205 recognizes the keyword that indicates the distance, that is, the audio in the combination of a numerical value and a unit, from the audio signal through the analysis, and converts the recognized audio into text information. The input processor 205 further converts the text information into the distance information, and passes the distance information to the shared information generator 203.

Figure 13A:
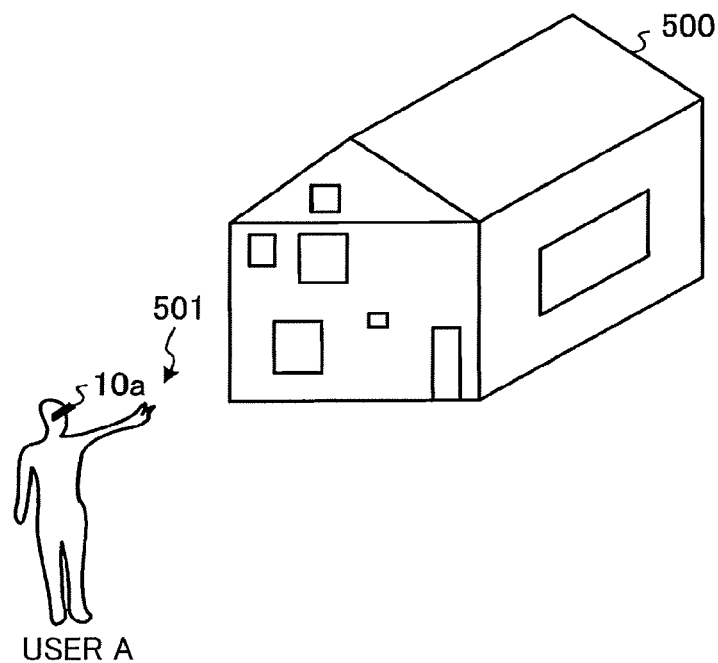
FIG. 13A and FIG. 13B are diagrams for schematically describing an example of an input of distance information by a gesture applicable to the first embodiment.
Figure 13B:
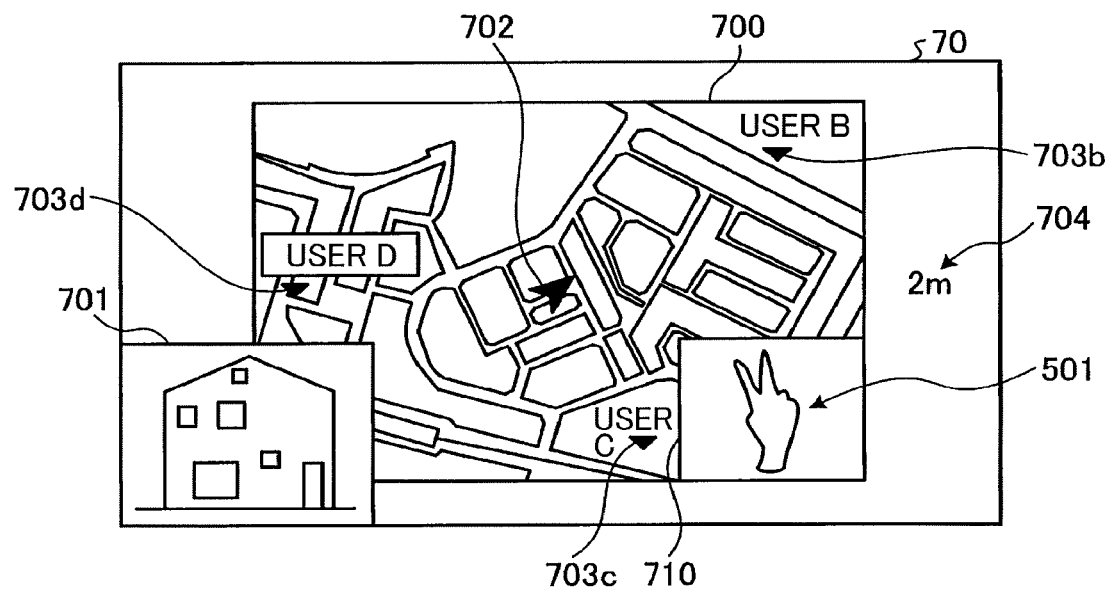

An example of an input of the distance information with the gesture applicable to the first embodiment will be schematically described in FIG. 13A and FIG. 13B. In FIG. 13A and FIG. 13B, a portion common to the portion in FIG. 11A and FIG. 11B described above is denoted with the same reference sign, and detailed description is omitted. As illustrated in FIG. 13A, the user A mounts the spectacle unit 1A of the terminal device 10a on the head 80, for example, and measures the distance to the target 500 by eye measurement. The user A executes the gesture that expresses the measured distance in an imaginable manner with the camera 23 provided in the spectacle unit 1A. Note that the camera 23 images a moving image at a predetermined frame rate.

FIG. 13B illustrates an example in which a confirmation image 710 for confirming the gesture with a hand 501 of the user A, the gesture having been imaged with the camera 23, is superimposed and displayed on the map image 700. For example, the distance can be expressed by the number of fingers up, in the gesture with fingers up of the hand 501 of the user A. In the example of FIG. 13B, an image of the hand 501 with two fingers up is included in the image 710, and the image indicates that the distance to the target 500 is approximately 2 m.

Further, in the example of FIG. 13B, a message display 704 that indicates the distance input by the gesture is displayed on a right end side of the screen. The user A can confirm the value of the input distance by referring to the message display 704.

In the terminal device 10a, the captured image output from the image information output unit 105 is input to the input processor 205, and the input processor 205 analyzes the input captured image to recognize, from the captured image, the gesture that expresses the distance. More specifically, the input processor 205 analyzes the captured image, using a known image analysis technology such as pattern matching on the basis of the shape of a finger, for example. When the input processor 205 detects the fingers up in the hand 501 from the captured image through the analysis, the input processor 205 determines that the gesture that expresses the distance has been recognized. The input processor 205 detects the number of fingers up from the captured image, converts the detected number to the distance information, and passes the distance information to the shared information generator 203.

The gesture for input of the distance may be performed with one hand or both hands. Further, the distance can be input by multiple times of gestures. In this case, a value having a larger number of digits can be input. Further, the distance may be expressed using a predetermined movement of the hand 501.

Referring back to the description of the flowchart of FIG. 12, in the terminal device 10a, the input processor 205 determines existence or non-existence of an audio input in step S106. The input processor 205 determines that there has been the audio input when the audio signal in a predetermined level or more has been input from the audio I/F 2008, for example. When the input processor 205 determines that there has been the audio input ("Yes" in step S106), the input processor 205 moves the processing onto step S107.

In step S107, the input processor 205 analyzes the input audio signal, and determines whether having recognized utterance including the keyword that indicates the distance from the audio signal on the basis of the analysis result.

When the input processor 205 determines that the input processor 205 has not recognized utterance including the keyword that indicates the distance ("No" in step S107), the input processor 205 returns the processing to step S105. Meanwhile, when the input processor 205 determines that the input processor 205 has recognized utterance including the keyword that indicates the distance ("Yes" in step S107), the input processor 205 generates the distance information on the basis of the audio, passes the generated distance information to the shared information generator 203, and moves the processing onto step S120.

When the input processor 205 determines that there is no audio input in step S106, the input processor 205 moves the processing onto step S110. The input processor 205 determines existence or non-existence of a gesture input by the user A on the basis of the captured image in step S110. For example, the input processor 205 analyzes the input captured image, and determines that there has been the gesture input when the captured image includes a predetermined image (for example, an image of the hand 501).

When the input processor 205 determines that there is no gesture input ("No" in step S110), the input processor 205 returns the processing to step S105. Meanwhile, when the input processor 205 determines that there has been the gesture input ("Yes" in step S110), the input processor 205 moves the processing onto step S111. In step S111, the input processor 205 analyzes the captured image, and determines whether having recognized the gesture that expresses the distance from the captured image on the basis of the analysis result.

When the input processor 205 determines that the input processor 205 has not recognized the gesture that expresses the distance ("No" in step S111), the input processor 205 returns the processing to step S110. Meanwhile, when the input processor 205 determines that the input processor 205 has recognized the gesture that expresses the distance ("Yes" in step S111), the input processor 205 generates the distance information on the basis of the gesture, passes the generated distance information to the shared information generator 203, and moves the processing onto step S120.

In step S120, the shared information generator 203 generates the shared information including the distance information passed from the input processor 205 in step S107 or step S111 and the position and direction information A acquired in step S11 of FIG. 10. The shared information generator 203 can include the captured image of the target 500 to the shared information. In next step S121, the shared information generator 203 transmits, by the transmitter 201, the generated shared information to the management server 40A. When the shared information is transmitted to the management server 40A, the processing is returned to step S100.

In the above description, the input of the distance information by the audio or the gesture has been described. However, the embodiment is not limited to this example. For example, the distance information may be input by the operation of the operation unit 24 provided in the spectacle unit 1A.

Figures 14, 15:
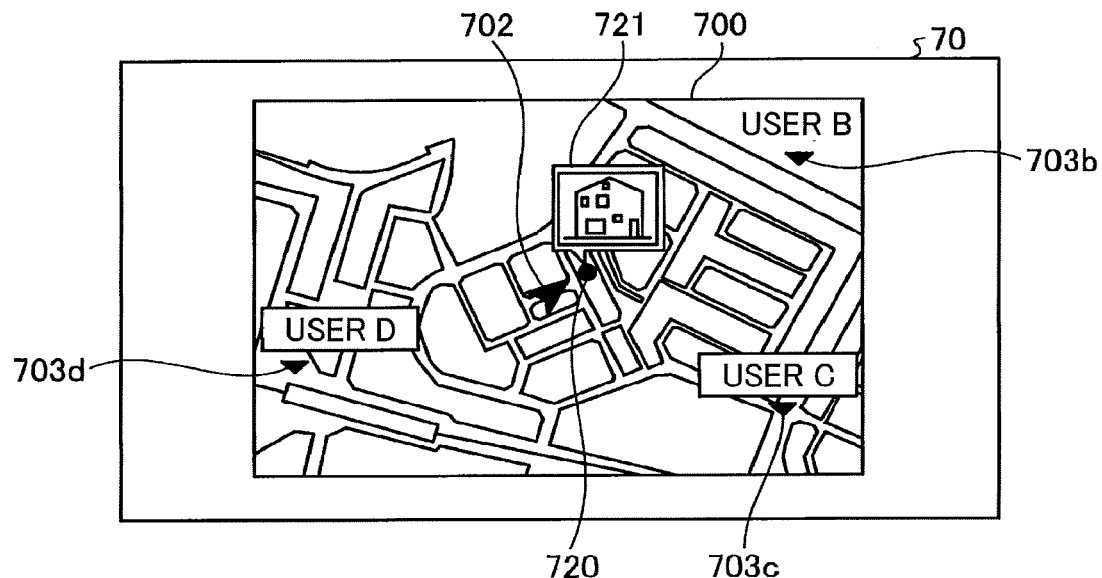
FIG. 14 is a diagram illustrating an example of a screen on which a map image to which a marker image that represents a target is added is displayed according to the first embodiment.
FIG. 15 is a diagram illustrating an example of an attribute information table that stores an attribute and information that indicates the attribute in association with each other according to a modification of the first embodiment.

FIG. 14 illustrates an example of the screen 70 on which the map image 700 to which the marker image that represents the target 500 is added is displayed according to the first embodiment. In FIG. 14, a portion common to the portion in FIG. 11B is denoted with the same reference sign and detailed description is omitted. Further, FIG. 14 illustrates an example of the screen 70 displayed on the display of the spectacle unit 1A of the terminal device 10a.

In FIG. 14, the own device marker 702 that represents the user A who uses the terminal device 10a is displayed in the center of the map image 700 displayed on the screen 70, similarly to the example of FIG. 11B. The own device marker 702 indicates the position of the user A, and also indicates the direction the user A faces (the direction the front 11A of the spectacle unit 1A faces). Further, the marker images 703b, 703c, and 703d that represent other users B, C, and D are respectively displayed, and the positions of the users B, C, and D are displayed on the map image 700.

Further, the target marker 720 as the marker image that represents the target 500 is displayed on the position of the map image 700, the position corresponding to the position of the target 500, on the basis of the shared information transmitted from the user A to the management server 40A. Further, in the example of FIG. 14, an image 721 of the target 500, which has been imaged in the terminal device 10a of the user A, is displayed in association with the target marker 720 that represents the target 500.

The information of the target 500 and the like illustrated in FIG. 14 is shared among the terminal devices used by the users other than the user A and connected to the information sharing system. For example, on the display of the spectacle unit 1A of the terminal device 10b used by the user B, the marker image that represents the direction the user B faces is used as the marker image 703b that represents the user B, and the marker image that represents the position of the user A is simply used as the own device marker 702 that represents the user A, on the map image 700 similar to FIG. 14. Even in this case, the target marker 720 that represents the target 500 is displayed on the position on the map image 700, the position corresponding to the position of the target 500, and the image 721 of the target 500 is displayed in association with the target marker 720, according to the shared information.

As described above, in the information sharing system according to the first embodiment, the terminal devices 10a, 10b, 10c, and 30 connected to the information sharing system can share the positions of the terminal devices 10a, 10b, 10c, and 30, and the position and the image of the target 500. Further, the information sharing system according to the first embodiment can acquire the position of the target 500 on the basis of the information acquired in one terminal device 10a of the plurality of terminal devices 10a, 10b, and 10c.

(Modification of First Embodiment)

Next, a modification of the first embodiment will be described. In the modification of the first embodiment, a position of a target 500 and information that indicates an attribute of the target 500 are displayed on a map image 700.

FIG. 15 illustrates an example of an attribute information table that stores the attribute and the information that indicates the attribute in association with each other, according to the modification of the first embodiment. In the example of FIG. 15, the attribute information table stores attribute names "destination", "dangerous object", "collapsed house", and "survivor in need of help" that indicate the attribute information. The attribute information table stores marker images corresponding to the attribute information as information that indicates the attributes in association with the attribute names. A management server 40A stores the attribute information table in an attribute information storage 404 in advance.

The attribute names (attribute information) and the marker images are not limited to the example of FIG. 15. For example, types of buildings (house, store, temple, and the like) or states of roads (depression, crack, flood, and the like)

can be applied as the attribute information. Further, as the marker images, images corresponding to the attribute information can be appropriately used.

For example, a user A who uses a terminal device 10a inputs the attribute name according to the state of the target 500 to the terminal device 10a. The attribute name may be input by an operation to an operation unit 24, or may be input by an audio or a gesture. At this time, the terminal device 10a favorably stores the attribute names "destination", "dangerous object", "collapsed house", and "survivor in need of help" stored in the attribute information table in advance. In this case, the user A who uses the terminal device 10a can select the attribute information of the target 500 from among the attribute names stored in advance, so that an input error and a reference error of the attribute name in the attribute information table can be prevented.

The terminal device 10a includes the input attribute name to shared information, and transmits the shared information to the management server 40A (step S15 and step S16 of FIG. 10). The management server 40A calculates, upon receiving the shared information, position information that indicates the position of the target 500 on the basis of position and direction information A and distance information included in the shared information (step S23 of FIG. 10). Further, the management server 40A refers to the attribute information table on the basis of the attribute name included in the shared information to acquire the marker image associated with the attribute name.

The management server 40A transmits the calculated position information and the marker image acquired from the attribute information table to terminal devices 10a, 10b, 10c, and 30 as target information (step S24 and step S25 of FIG. 10). The terminal devices 10a, 10b, 10c, and 30 superimposes, upon receiving the target information from the management server 40A, the marker image included in the target information on a position on the map image 700, the position being indicated by the position information included in the received target information. Users A, B, C, and D who use the terminal devices 10a, 10b, 10c, and 30 can intuitively grasp the attribute of the target 500 on the basis of the marker image.

Second Embodiment

Next, a second embodiment will be described. In the second embodiment, one terminal device, of terminal devices connected to an information sharing system, serves at least a part of the functions of the management server 40A according to the first embodiment.

Description will be given using FIG. 1 as an example. A terminal device, of terminal devices 10a, 10b, 10c, and 30, serves at least a function to calculate a position of a target 500, of functions of a management server 40A, in the second embodiment. Hereinafter, the terminal device serving a part of the functions of the management server 40A is called commander terminal, and a user who uses the commander terminal is called commander. As the commander terminal, any of the terminal devices 10a, 10b, 10c, and 30 may be employed but the terminal device 30 that is a non-mobile terminal is favorably applied to the commander terminal in consideration of a load of processing and the like.

Figure 16:
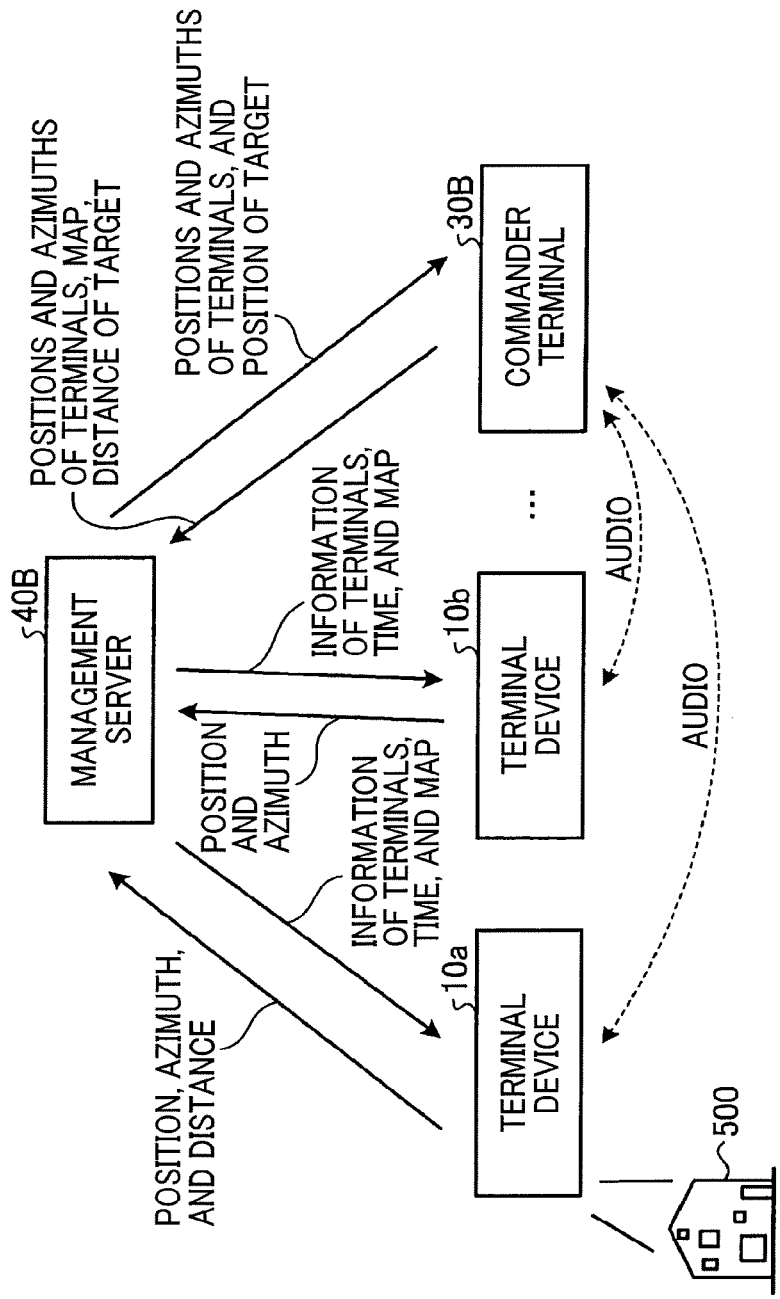
FIG. 16 is a diagram for schematically describing a configuration of an information sharing system according to a second embodiment.

A configuration of an information sharing system according to the second embodiment will be schematically described in FIG. 16. In FIG. 16, the information sharing system includes the terminal device 10a, the terminal device 10b, and the like respectively used by the user A, the user B, and the like, the commander terminal 30B used by the commander, and a management server 40B. The terminal device 10a, the terminal device 10b, and the like are connected to the management server 40B through a network by wireless communication. The commander terminal 30B may be connected to the management server 40B through the network by either wired communication or wireless communication, but the commander terminal 30B is favorably connected to the management server 40B through the network by wired communication in consideration of stability of communication.

Further, the terminal device 10a, the terminal device 10b, and the like and the commander terminal 30B can perform communication using an audio. This communication using an audio may be performed through the management server 40B through the network or may be performed through another channel without through the management server 40B. Further, the communication using an audio may be performed using a public telephone line.

Further, the terminal device 10a, the terminal device 10b, and the like can transmit distance information that indicates a distance to a target 500 to the commander terminal 30B through the management server 40B. In the example of FIG. 16, the terminal device 10a transmits the distance information that indicates the distance to the target 500.

Figure 17:
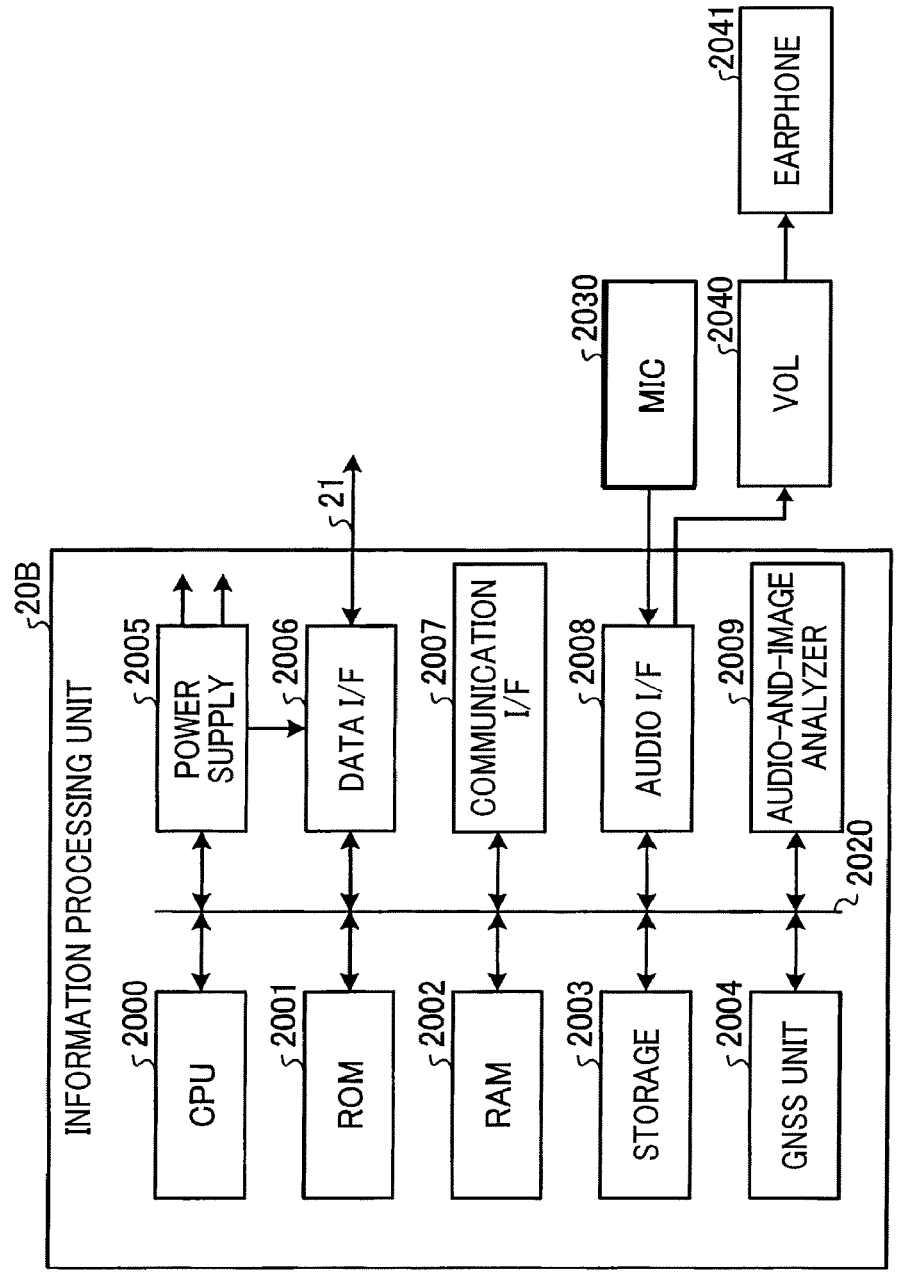
FIG. 17 is a block diagram illustrating a configuration of an example of an information processing unit included in a terminal device applicable to the second embodiment.

FIG. 17 illustrates a configuration of an example of an information processing unit 20B included in the terminal device 10a, the terminal device 10b, and the like applicable to the second embodiment. In FIG. 17, a portion common to the portion in FIG. 6 is denoted with the same reference sign, and detailed description is omitted.

In FIG. 17, the information processing unit 20B includes an audio I/F 2008 to which an earphone 2041 is connected through a volume control device (VOL) 2040. The audio I/F 2008 converts an audio signal in a digital system supplied from a CPU 2000 into an audio signal in an analog system, and outputs the converted audio signal, for example. The audio signal output from the audio I/F 2008 is input to the earphone 2041 through the volume control device 2040. The volume control device 2040 controls a level of the audio signal input to the earphone 2041 according to a user operation. The volume control device 2040 may be built in the information processing unit 20B.

Accordingly, the user can listen to a sound by the audio signal transmitted through the network and received by a communication I/F 2007 with the earphone 2041. Further, the user can have the microphone (MIC) 2030 collect an uttered audio and can transmit the audio through the communication I/F 2007 through the network.

To spectacle units 1A included in the terminal device 10a, the terminal device 10b, and the like according to the second embodiment, the same configuration as the configuration described in FIG. 5 is applicable. Therefore, description here is omitted. Further, to functions of the spectacle unit 1A and the information processing unit 20B, the functions described in FIG. 7 can be similarly applied, except for the function of the communication by an audio described above. Therefore, description here is omitted.

Figure 18:
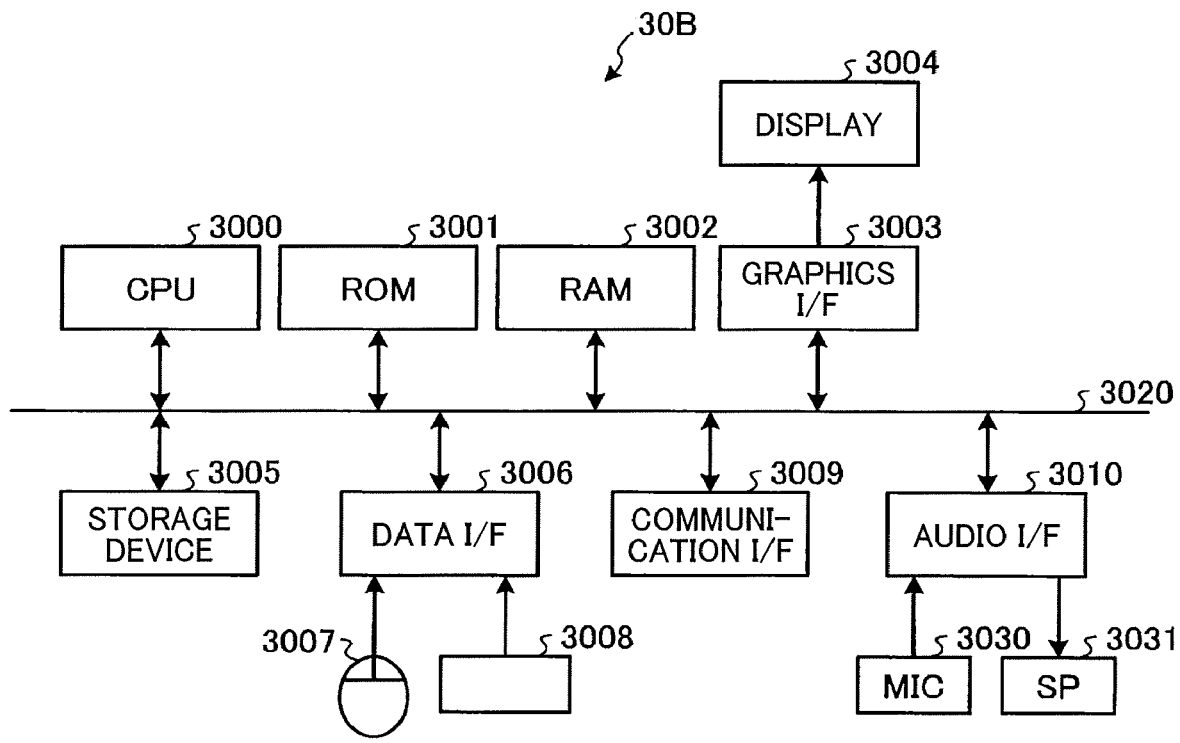
FIG. 18 is a block diagram illustrating an example of a hardware configuration of a commander terminal according to the second embodiment.

FIG. 18 illustrates an example of a hardware configuration of the commander terminal 30B according to the second embodiment. In FIG. 18, the commander terminal 30B includes a CPU 3000, a ROM 3001, a RAM 3002, a graphics I/F 3003, a storage device 3005, a data I/F 3006, a communication I/F 3009, and an audio I/F 3010, and these elements are communicatively connected to one another by a bus 3020. In this way, the commander terminal 30B according to the second embodiment can be realized using a typical computer.

The storage device 3005 is a non-volatile storage medium such as a hard disk drive or a flash memory, and stores a program and data. The CPU 3000 controls the entire operation of the commander terminal 30B, using the RAM 3002 as a work memory, according to a program stored in the storage device 3005 or the ROM 3001.

The graphics I/F 3003 is connected to a display 3004, and generates a display signal displayable on the display 3004 on the basis of display control information generated by the CPU 3000 according to a program. The data I/F 3006 is an interface for external data supplied from outside the commander terminal 30B. Further, the data I/F 3006 can be connected to a pointing device 3007 such as a mouse, and a keyboard 3008. As the data I/F 3006, a universal serial bus (USB) can be applied. The communication I/F 3009 is connected to the network, and performs communication through the network.

The audio I/F 3010 inputs and outputs audio signals. For example, the audio I/F 3010 includes an ADC, and converts the audio signal in the analog system supplied from the microphone (MIC) 3030 or the like into the audio signal in the digital system. Further, the audio I/F 3010 includes a DAC, and converts the supplied audio signal in the digital system into the audio signal in the analog system, and outputs the converted audio signal. The audio signal output from the audio I/F 3010 is supplied to a speaker (SP) 3031, for example.

Figure 19:
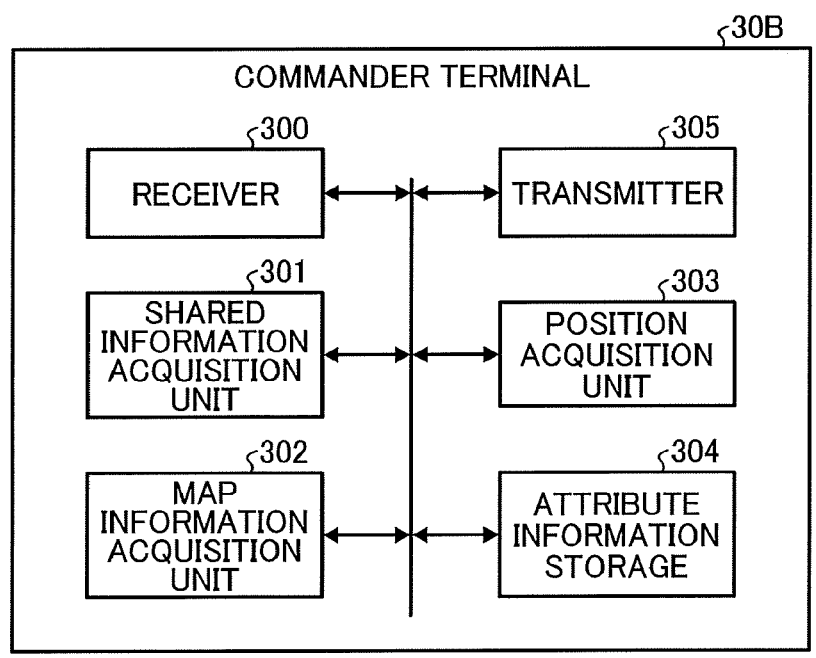
FIG. 19 is a functional block diagram illustrating functions of the commander terminal according to the second embodiment.

FIG. 19 is a functional block diagram for describing functions of the commander terminal 30B according to the second embodiment. The commander terminal 30B according to the second embodiment includes approximately the same functions as the management server 40A according to the first embodiment. That is, the commander terminal 30B includes a receiver 300, a shared information acquisition unit 301, a map information acquisition unit 302, a position acquisition unit 303, an attribute information storage 304, and a transmitter 305.

The receiver 300, the shared information acquisition unit 301, the map information acquisition unit 302, the position acquisition unit 303, and the transmitter 305 are realized by a program operated on the CPU 3000. The attribute information storage 304 is formed in a predetermined area on the storage device 3005, for example. The embodiment is not limited to the example, and a part or all of the receiver 300, the shared information acquisition unit 301, the map information acquisition unit 302, the position acquisition unit 303, and the transmitter 305 may be configured from hardware circuits operated in cooperation with one another.

The receiver 300, the shared information acquisition unit 301, the map information acquisition unit 302, the attribute information storage 304, and the transmitter 305 respectively include approximately equivalent functions of the receiver 400, the shared information acquisition unit 401, the map information acquisition unit 402, the attribute information storage 404, and the transmitter 405 in the management server 40A illustrated in FIG. 9.

That is, the receiver 300 receives information transmitted through the network. The shared information acquisition unit 301 acquires shared information described above in a case where the information received by the receiver 300 includes the shared information. The map information acquisition unit 302 acquires map information through the network or map information stored in the commander terminal 30B in advance.

The attribute information storage 304 stores an attribute information table in which attribute information that indicates an attribute of a target and a marker image that represents the attribute are associated with each other. The transmitter 305 transmits target information including position information calculated by the position acquisition unit 303 to the terminal device 10a and the terminal device 10b through the network.

The position acquisition unit 303 acquires the position information that indicates the position of the target 500. The position acquisition unit 303 calculates, when the distance information that indicates the distance to the target 500 is transmitted from the terminal device 10a, the position of the target 500 on the basis of the distance information, and the shared information acquired by the shared information acquisition unit 301 to acquire the position information that indicates the position.

Further, the position acquisition unit 303 may calculate the position of the target 500 on the basis of the distance information acquired through audio communication made between the terminal device 10a and the commander terminal 30B.

For example, the user A of the terminal device 10a estimates the distance to the target 500 by visual recognition through fronts 11A of a spectacle unit 1A, and utters information that indicates the estimated distance in a sound collectable manner by the microphone 2030. The terminal device 10a transmits an audio signal by the audio including the information that indicates the distance collected by the microphone 2030 to the commander terminal 30B.

The user (commander) who operates the commander terminal 30B listens to the audio based on the audio signal acquired through the audio communication with the speaker 3031. The commander operates the keyboard 3008, for example, on the basis of the information that indicates the distance included in the audio, to input the distance information to the commander terminal 30B. The position acquisition unit 303 calculates the position of the target 500, using the distance information input in this way and the shared information transmitted from the terminal device 10a, to acquire the position information that indicates the position of the target 500.

An information processing program for realizing the functions of the commander terminal 30B according to the second embodiment is recorded in a computer readable recording medium such as a compact disk (CD), a flexible disk (FD), or a digital versatile disk (DVD) in an installable or executable format file, and is provided. The embodiment is not limited to the above example, and the information processing program may be stored on a computer connected to the network such as the Internet and downloaded through the network. Alternatively, the information processing program may be provided or distributed through the network such as the Internet.

The information processing program has a module configuration including the above-described elements (the receiver 300, the shared information acquisition unit 301, the map information acquisition unit 302, the position acquisition unit 303, and the transmitter 305). As actual hardware, when the CPU 3000 reads the information processing program from a storage medium such as the storage device 3005 and executes the information processing program, the above-described elements are loaded on a main storage device such as the RAM 3002, and the receiver 300, the shared information acquisition unit 301, the map information acquisition unit 302, the position acquisition unit 303, and the transmitter 305 are generated on the main storage device.

Figure 20:
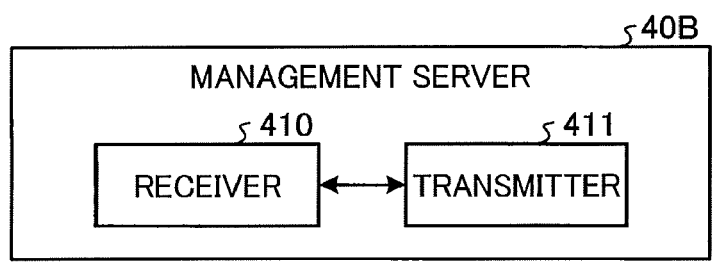
FIG. 20 is a functional block diagram illustrating functions of a management server applicable to the second embodiment.

FIG. 20 is a functional block diagram of an example for describing functions of the management server 40B applicable to the second embodiment. To the hardware configuration of the management server 40B, a configuration similar to the configuration of the management server 40A according to the first embodiment, which has been described in FIG. 8, is applicable. Therefore, description here is omitted.

In FIG. 20, the management server 40B includes a receiver 410 and a transmitter 411. The receiver 410 receives information transmitted from the terminal device 10a, the terminal device 10b, and the like and the commander terminal 30B to the management server 40B through the network, for example. The transmitter 411 transmits information to the terminal device 10a, the terminal device 10b, and the like and the commander terminal 30B through the network, for example.

In such a configuration, the terminal device 10a, the terminal device 10b, and the like transmit position information that indicates an own position and direction information that indicates a direction the own device (the front 11A of the spectacle unit 1A) faces, together with identification information that identifies the own device, to the management server 40B. The management server 40B receives the position information, the direction information, and the identification information transmitted from the terminal device 10a, the terminal device 10b, and the like. The management server 40B transmits the received position information and direction information in association with the corresponding identification information to the commander terminal 30B.

The commander terminal 30B receives the position information, the direction information, and the identification information of the terminal device 10a, the terminal device 10b, and the like transmitted from the management server 40B. The commander terminal 30B acquires map information on the basis of the received position information of the terminal device 10a, the terminal device 10b, and the like. The commander terminal 30B transmits the map information, and the position information, the direction information, and the identification information of the terminal device 10a, the terminal device 10b, and the like received from the management server 40B to the terminal device 10a, the terminal device 10b, and the like through the management server 40B.

The terminal device 10a, the terminal device 10b, and the like receive the map information, and the position information, the direction information, and the identification information of the terminal device 10a, the terminal device 10b, and the like transmitted from the management server 40B. The terminal device 10a, the terminal device 10b, and the like superimpose and display the information that indicates the terminal device 10a, the terminal device 10b, and the like on a map image based on the received map information, on the basis of the position information, the direction information, and the identification information.

Figure 21:
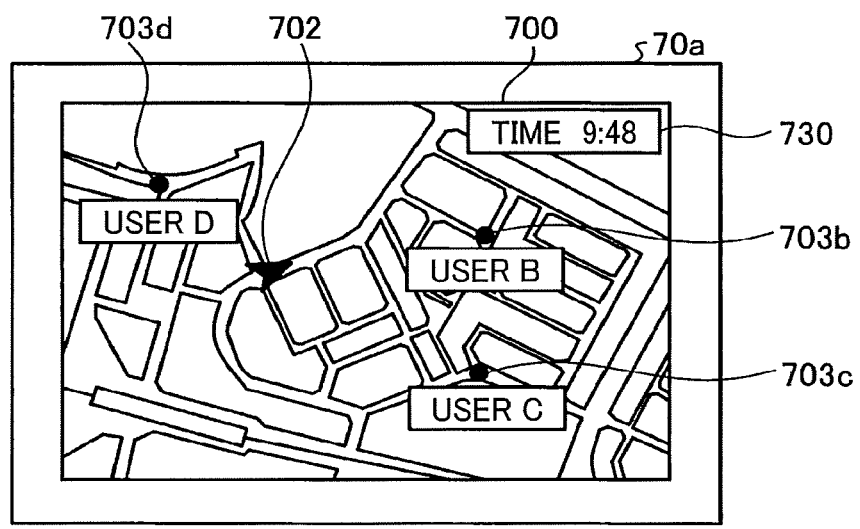
FIG. 21 is a diagram illustrating an example of a screen to be displayed on a display of a terminal device according to the second embodiment.

FIG. 21 illustrates an example of a screen 70a displayed on a display of the terminal device 10a according to the second embodiment. The screen 70a includes a map image 700. An own device marker 702 is superimposed and displayed on a position on the map image 700, the position corresponding to the position information that indicates the position of the terminal device 10a. Further, the own device marker 702 is displayed to point to the direction the spectacle unit 1A of the terminal device 10a faces, according to the direction information that indicates the direction of the terminal device 10a.

As the position information and the direction information regarding the terminal device 10a, the information transmitted from the commander terminal 30B through the management server 40B may be used, or the information acquired and detected in a position information acquisition unit 202 and a head movement detector 207 in the terminal device 10a may be used.

Further, on the map image 700, a marker image 703b that indicates the terminal device 10b and identification information (a use name "user B" for example) that identifies the terminal device 10b are superimposed and displayed on a position corresponding to the position information that indicates another terminal device (for example, the terminal device 10b). Further, as for other terminal devices, marker images (for example, a marker image 703c and a marker image 703d) that indicate the terminal devices and identification information (for example, the user C and the user D) that identifies the terminal devices are similarly superimposed and displayed on positions corresponding to the position information of the respective terminal devices.

Further, the commander terminal 30B can transmit time information that indicates a current time, which is acquired in the commander terminal 30B, together with the map information, and the position information, the direction information, and the identification information of the terminal device 10a, the terminal device 10b, and the like, to the terminal device 10a, the terminal device 10b, and the like through the management server 40B. The terminal device 10a displays a message display 730 that indicates the received time information on the screen 70a.

Figure 22:
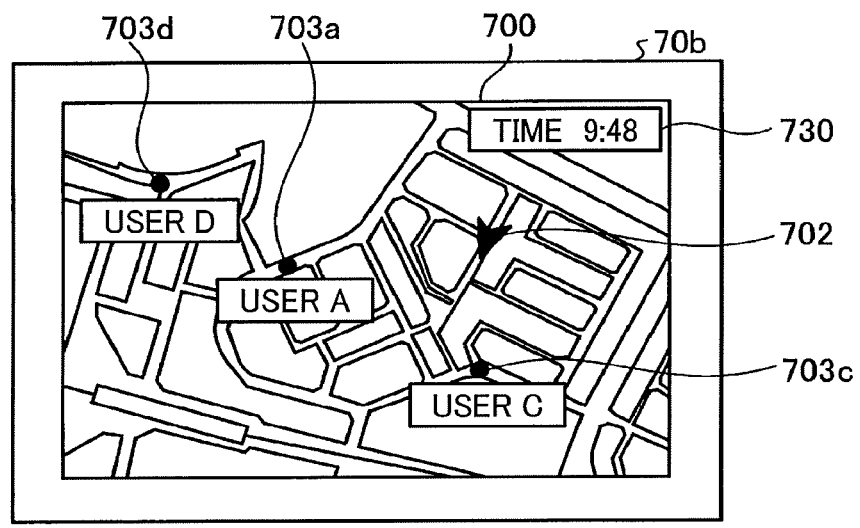
FIG. 22 is a diagram illustrating an example of the screen to be displayed on a display of a terminal device according to the second embodiment.

FIG. 22 illustrates an example of a screen 70b displayed on a display of the terminal device 10b according to the second embodiment. In this case, a map image 700 is common to the map image 700 displayed on the screen 70a of the terminal device 10a. An own device marker 702 is superimposed and displayed on a position on the map image 700, the position corresponding to the position information that indicates the position of the terminal device 10b. Further, marker images (for example, a marker image 703a, a marker image 703c, and a marker image 703d) that respectively represent other terminal devices and the identification information (for example, the user A, the user C, and the user D) that identifies the respective other terminal devices are superimposed and displayed on positions on the map images 700 of the other terminal devices other than the terminal device 10b.

Further, the message display 730 that indicates the time information by the commander terminal 30B is displayed on a screen 70b, in common with the screen 70a displayed on the display of the terminal device 10a.

Figure 23:
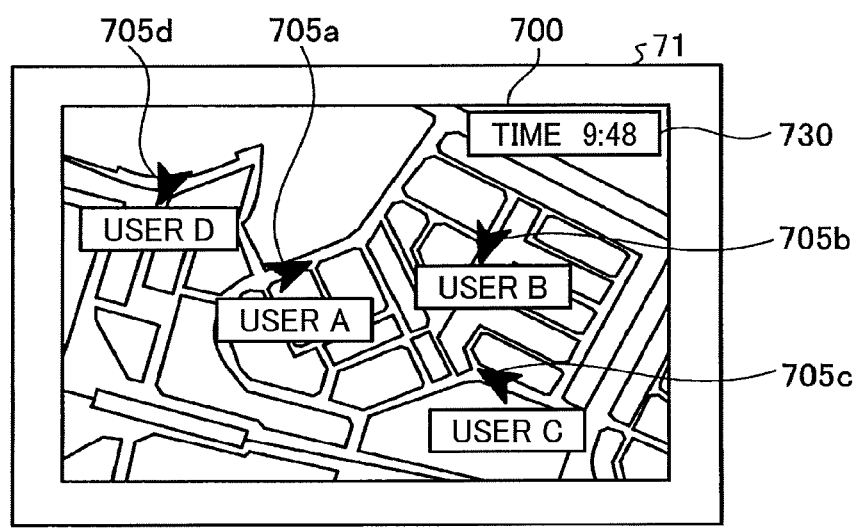
FIG. 23 is a diagram illustrating an example of a screen to be displayed on a display of the commander terminal according to the second embodiment.

FIG. 23 illustrates an example of a screen 71 displayed on a display of the commander terminal 30B according to the second embodiment. The commander terminal 30B respectively superimposes marker images 705a, 705b, 705c, and 705d that represent the terminal device 10a, the terminal device 10b, and the like on positions on the map image 700, the positions corresponding to the position information, on the basis of the position information, the direction information, and the identification information received from the terminal device 10a, the terminal device 10b, and the like. At this time, the commander terminal 30B displays the marker images 705a, 705b, 705c, and 705d to point to directions the spectacle units 1A of the terminal device 10a, the terminal device 10b, and the like face, according to the direction information of the corresponding terminal device 10a, terminal device 10b, and the like.

The commander can recognize which directions the user A, the user B, and the like of the terminal device 10a, the terminal device 10b, and the like face by viewing the screen 71. Further, the commander can recognize how the user A, the user B, and the like of the terminal device 10a, the terminal device 10b, and the like are moving by continuously viewing the screen 71. Further, the commander can estimate moving destinations of the user A, the user B, and the like.

(Application Example of Information Sharing System According to Second Embodiment)

An example to which the information sharing system according to the second embodiment is applied includes rescue operation in a large-scale disaster site. When a large-scale disaster such as earthquake, flood, or heavy snow occurs, rescue team members are called from across the country, and the unacquainted members are required to work in an unfamiliar place in cooperation with each other. There are places where the road condition is bad due to the disaster, and where a secondary disaster such as landslide may occur. Further, the rescue operation is a race against time, and a member coming to a place where another member has already done a search becomes serious waste, for example.

As described above, according to the information sharing system of the second embodiment, the common map image 700, the own device marker 702 that indicates the position of the own device, and the marker images that represent other terminal devices (for example, the marker images 703b, 703c, and the like in the case where the own device is the terminal device 10a) are displayed on the positions on the map image 700 of the corresponding terminal devices, on the displays of the terminal device 10a, the terminal device 10b, and the like. Further, the marker images 705a, 705b, and the like that indicate the directions and the positions on the map image 700, of the terminal device 10a, the terminal device 10b, and the like, are displayed on the map image 700, on the display of the commander terminal 30B used by the commander.

Therefore, by application of the information sharing system according to the second embodiment to such a scene, each member can easily grasp the place where the member is and a direction the member is headed to, and can easily grasp the place where another member exists. Accordingly, the members can take an appropriate action while avoiding waste. Further, the commander can easily grasp the positions of all the members on the screen 71 of the commander terminal 30B, and communicates with the members, using audio communication, to provide correct instructions.

Further, the terminal device 10a, the terminal device 10b, and the like used by the members are a spectacle-type device mounted on the head 80. Therefore, the members can obtain the information in a state where the members can use both hands. Therefore, even if the members hold a rescue tool in hand, or climb a steep slope using both hands and feet, the members can confirm the information.

The application example of the information sharing system according to the second embodiment is not limited to the disaster rescue or the like. For example, the information sharing system according to the second embodiment can be applied to an amusement such as a survival game. In this case, players can recognize the positions of friends, and thus the players move in a cooperative manner when taking a flag on an enemy's position. Therefore, strategic elements can be added to the game. In the survival game, the player often holds a gun with both hands. Therefore, the information display in a state where the player can use both hands because of the spectacle-type device is very effective. The application example is not limited to the survival game. Application of the information sharing system according to the second embodiment to a group game such as a snowball fight can add strategic characteristics to the game and can increase a game value.

(First Modification of Second Embodiment)

Next, a first modification of the second embodiment will be described. The first modification of the second embodiment is an example in which a desired position on a map image 700 is specified in a commander terminal 30B. For example, a commander specifies the desired position on the map image 700 on a screen 71, using a pointing device 3007 connected to the commander terminal 30B while referring to the screen 71 displayed on a display 3004 of the commander terminal 30B. Further, the commander terminal 30B can input a message corresponding to the specified position, using a keyboard 3008, for example.

Figure 24:
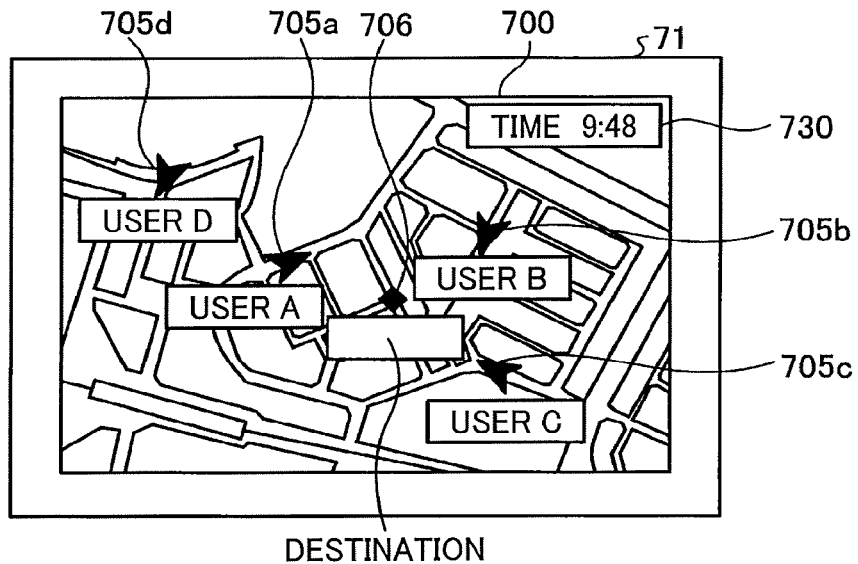
FIG. 24 is a diagram illustrating an example of a screen of when a desired position on a map image is specified in a commander terminal, according to a first modification of the second embodiment.

FIG. 24 illustrates an example of the screen 71 of a case where the desired position on the map image 700 is specified in the commander terminal 30B according to the first modification of the second embodiment. A marker image 706 is superimposed on a specified position on the map image 700 on the screen 71, and the input message ("destination" in this example) is displayed near the marker image 706.

The commander terminal 30B further acquires, by a position acquisition unit 303, specified position information (latitude and longitude) as position information corresponding to the specific position, on the basis of map information for displaying the map image 700. The commander terminal 30B transmits the acquired specified position information and the message corresponding to the specified position to terminal device 10a, the terminal device 10b, and the like through a management server 40B. Accordingly, the same position can be notified to the user A, the user B, and the like of the terminal device 10a, the terminal device 10b, and the like.

When the information sharing system according to the first modification of the second embodiment is applied to disaster rescue, as described above, a certain position can be promptly notified to a plurality of members in common. Further, the position information that indicates the specified position is displayed on a display of a spectacle unit 1A. Therefore, even if information is updated and the specified position is changed, the members can promptly respond to the update of the position information.

(Second Modification of Second Embodiment)

Next, a second modification of the second embodiment will be described. The second modification of the second embodiment is an example in which position information that indicates a position of a target 500 is shared among terminal device 10a, the terminal device 10b, and the like and a commander terminal 30B, and shared among the terminal device 10a, the terminal device 10b, and the like.

For example, a user A who uses the terminal device 10a visually recognizes the target 500 through fronts 11A in a spectacle unit 1A of the terminal device 10a, and starts sharing of information regarding the target 500. The user A measures a distance from the terminal device 10a to the target 500 by visual recognition, for example, and inputs distance information that indicates the measured distance to the terminal device 10a with an audio or a gesture. As a method for inputting the distance information with an audio or a gesture, the method described in FIG. 12 can be applied. Therefore, description here is omitted.

The terminal device 10a transmits the input distance information in association with identification information of the terminal device 10a to the commander terminal 30B through a management server 40B. Note that position information, direction information, and the identification information of the terminal device 10a are transmitted to the commander terminal 30B through the management server 40B prior to the transmission of the distance information.

The commander terminal 30B acquires, by a position acquisition unit 303, the position information that indicates the position of the target 500, on the basis of the received distance information, and the position information and the direction information of the terminal device 10a received in advance, upon receiving the distance information and the identification information transmitted from the terminal device 10a. The commander terminal 30B superimposes a marker image that represents the target 500 on a position on a map image 700, the position corresponding to the acquired position information of the target 500.

Figure 25:
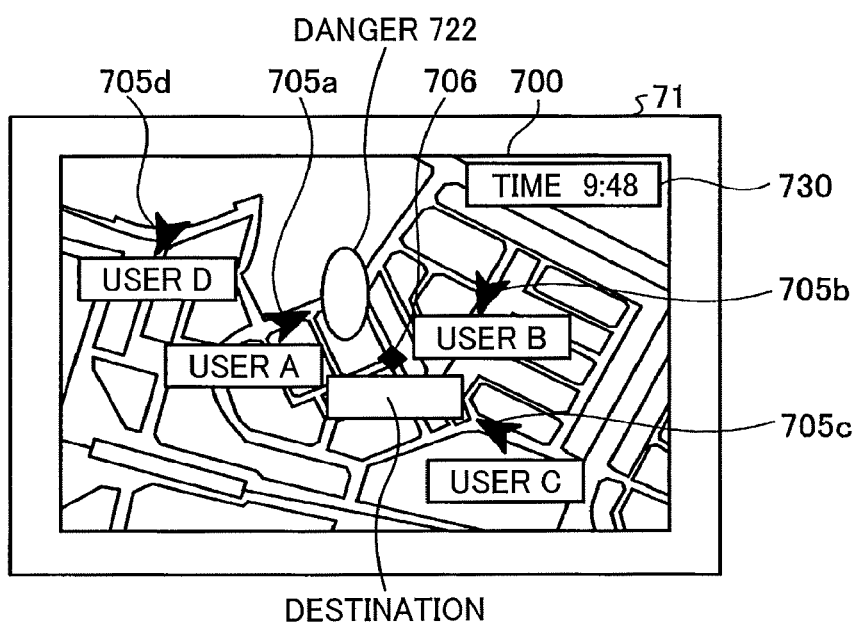
FIG. 25 is a diagram illustrating an example in which a marker image that represents a target is superimposed on a map image on a screen of a commander terminal according to a second modification of the second embodiment.

FIG. 25 illustrates an example in which a target marker 722 as the marker image that indicates the target 500 is superimposed on the map image 700 on a screen 71 of the commander terminal 30B, according to the second modification of the second embodiment. In this example, attribute information that indicates an attribute of the target 500 is transmitted from the terminal device 10a, and the commander terminal 30B acquires the target marker 722 corresponding to the attribute information from an attribute information table stored in an attribute information storage 304, and superimposes the target marker 722 on the map image 700.

The commander terminal 30B transmits the acquired position information that indicates the position of the target 500 and the target marker 722 corresponding to the attribute of the target 500 to the terminal device 10a, the terminal device 10b, and the like through the management server 40B. The terminal device 10a, the terminal device 10b, and the like superimpose the target marker 722 on a position on the map image 700, the position corresponding to the position information that indicates the position of the target 500, on the screen 70a, the screen 70b, and the like on displays of the spectacle units 1A of the own devices.

When the information sharing system according to the second modification of the second embodiment is applied to disaster rescue, as described above, a position of a dangerous place found by a member can be easily notified to a plurality of members. Further, for example, when the members perform disaster rescue on a mountain path or the like where no mark is provided, the position of the dangerous place can be easily notified. Thus, safety of the members can be secured.

In the second modification of the second embodiment, the position of the target 500 is acquired on the basis of the distance information transmitted from the terminal device 10a through the management server 40B. However, the modification is not limited to this example. For example, the terminal device 10a may transmit the distance information to the commander terminal 30B, using audio communication with an audio of the user A. A commander operates a keyboard 3008 or the like to input the distance information acquired through the audio communication to the commander terminal 30B. The embodiment is not limited to the example, and the commander may directly specify the position of the target 500, using a pointing device 3007 or the like, on the map image 700 on the screen 71 displayed on a display 3004 of the commander terminal 30B, on the basis of the distance information acquired through the audio communication.

(Third Modification of Second Embodiment)

Next, a third modification of the second embodiment will be described. The third modification of the second embodiment is an example in which pieces of distance information that indicate distances from terminal device 10a, the terminal device 10b, and the like to a desired position or a target 500 are further obtained in the first modification or the second modification of the second embodiment described above. A commander terminal 30B respectively calculates, by a position acquisition unit 303, distances in a straight line from the desired position or the target 500 to the terminal device 10a, the terminal device 10b, and the like, on the basis of position information that indicates the position of the desired position or the target 500, and pieces of position information that indicate positions of the terminal device 10a, the terminal device 10b, and the like.

The commander terminal 30B transmits the position information that indicates the position of the desired position or the target 500 to the terminal device 10a, the terminal device 10b, and the like. Further, the commander terminal 30B transmits pieces of distance information that indicate the distances in a straight line from the terminal device 10a, the terminal device 10b, and the like to the desired position or the target 500 to the terminal device 10a, the terminal device 10b, and the like corresponding to the distance information.

Figure 26:
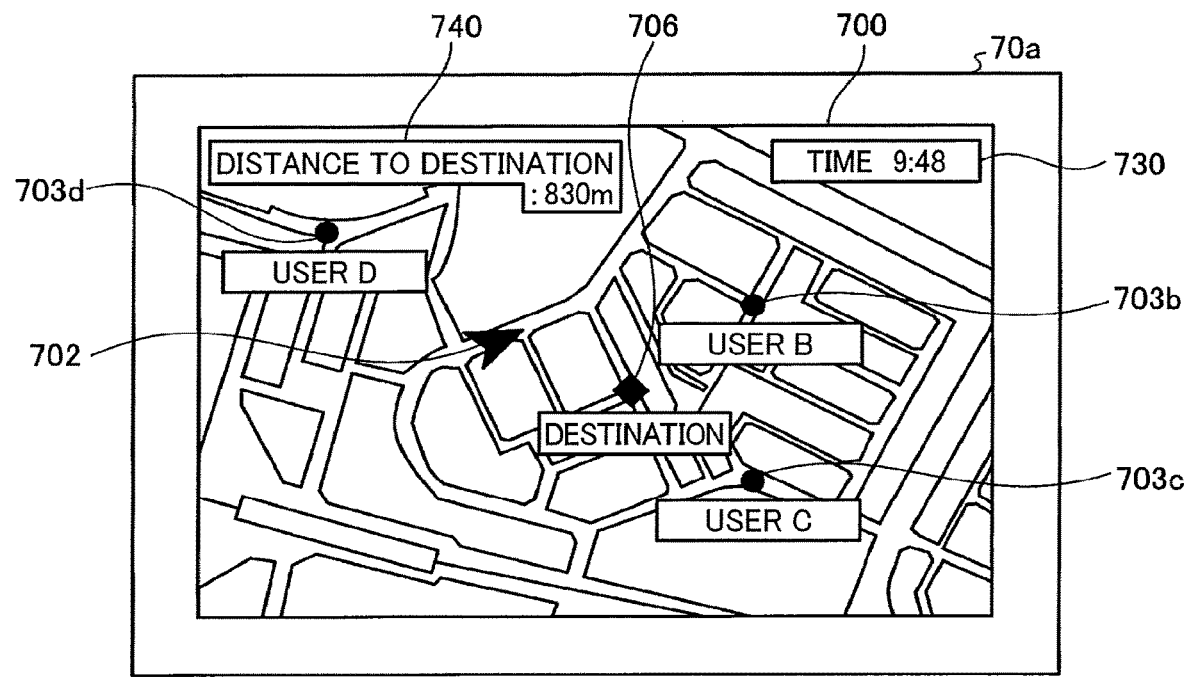
FIG. 26 is a diagram illustrating an example of a screen to be displayed on a display of a terminal device, of a case where a desired position is specified in a commander terminal, according to a third modification of the second embodiment.

The terminal device 10a, the terminal device 10b, and the like superimpose a predetermined marker image on a position on a map image 700, the position corresponding to the position information transmitted from the commander terminal 30B. Further, the terminal device 10a, the terminal device 10b, and the like display the distance information corresponding to the own devices, of the pieces of distance information transmitted from the commander terminal 30B, on screen 70a, the screen 70b, and the like. FIG. 26 illustrates an example of the screen 70a displayed on a display of the terminal device 10a of when the desired position is specified in the commander terminal 30B, according to the third modification of the second embodiment. On the screen 70a, a marker image 706 is superimposed on a position on the map image 700, the position corresponding to the desired position, and a message display 740 that indicates the distance information is displayed.

The marker image 706 is superimposed on the map image 700 according to the position of the desired position or the target 500. Therefore, rough distances from the terminal device 10a, the terminal device 10b, and the like to the desired position or the position of the target 500 and a time required to arrive at the position can be estimated.

In the third modification of the second embodiment, actual distances from the terminal device 10a, the terminal device 10b, and the like to the desired position or the position of the target 500 are displayed, and values on the display are sequentially updated with movement of the terminal device 10a, the terminal device 10b, and the like. Therefore, a remaining distance to the desired position or the position of the target 500 becomes clear. Further, a message display 730 that indicates time information that indicates a common time is displayed on the screen 70a, the screen 70b, and the like of the terminal device 10a, the terminal device 10b, and the like. Therefore, an expected time of arrival to the desired position or the position of the target 500 can be estimated with high accuracy.

Existing car navigation systems calculate a distance based on traveling on roads. In contrast, the information sharing system according to the third modification of the second embodiment displays the distances in straight line from the user A, the user B, and the like to the desired position or the position of the target 500. Therefore, in a case where the information sharing system according to the third modification of the second embodiment is applied to disaster rescue, for example, the distance in a starlight line (absolute distance) to a destination is displayed when it is difficult for members to ordinarily pass through a road, such as on a disaster site. Accordingly, the members can easily understand the distance.

(Fourth Modification of Second Embodiment)

Next, a fourth modification of the second embodiment will be described. The fourth modification of the second embodiment is an example in which a message transmitted from a commander terminal 30B is displayed in common on screen 70a, the screen 70b, and the like displayed on displays of terminal device 10a, the terminal device 10b, and the like, in the above-described second embodiment and modifications of the second embodiment.

Figure 27:
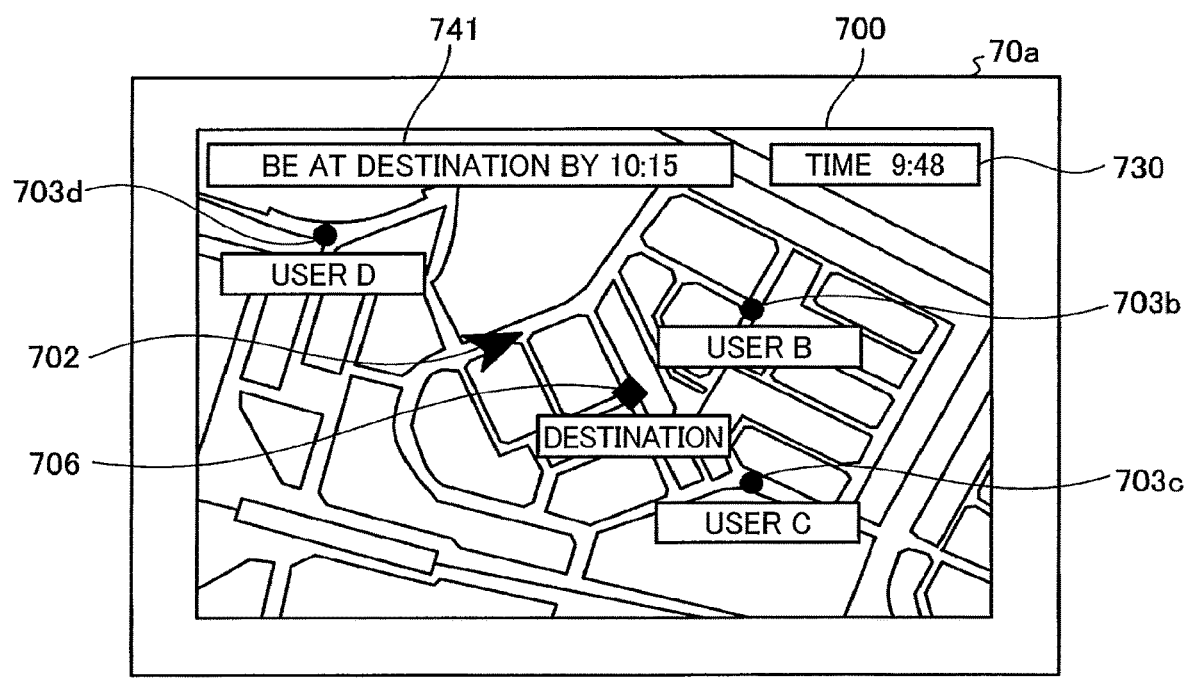
FIG. 27 is a diagram illustrating an example of a screen on which an arbitrary message transmitted from a commander terminal is displayed, according to a fourth modification of the second embodiment.

FIG. 27 illustrates an example of the screen 70a on which a message display 741 by an arbitrary message transmitted from the commander terminal 30B is displayed, according to the fourth modification of the second embodiment. A commander operates a keyboard 3008, for example, to input the arbitrary message to the commander terminal 30B. The commander terminal 30B transmits the input message to the terminal device 10a, the terminal device 10b, and the like through a management server 40B. The terminal device 10a, the terminal device 10b, and the like display the message display 741 including the received message on the screen 70a, the screen 70b, and the like, upon receiving the message transmitted from the commander terminal 30B.

Communication between the user A, the user B, and the like of the terminal device 10a, the terminal device 10b, and the like and the commander can be quickest by use of audio communication. However, noise may be large and the audio may not be able to be heard depending on an environment where the user A, the user B, and the like exist. In this case, communication details are favorably transferred by texts instead of the audio. The communication details from the commander are displayed by text information on displays of spectacle units 1A included in the terminal device 10a, the terminal device 10b, and the like. Therefore, the communication details can be more reliably transmitted.

Third Embodiment

Next, a third embodiment will be described. In the third embodiment, a dimmer that adjusts a light amount to be transmitted through a front 11A is provided in the spectacle unit 1A in the first embodiment, the second embodiment, or the modifications of the first embodiment and the second embodiment.

Figure 28:
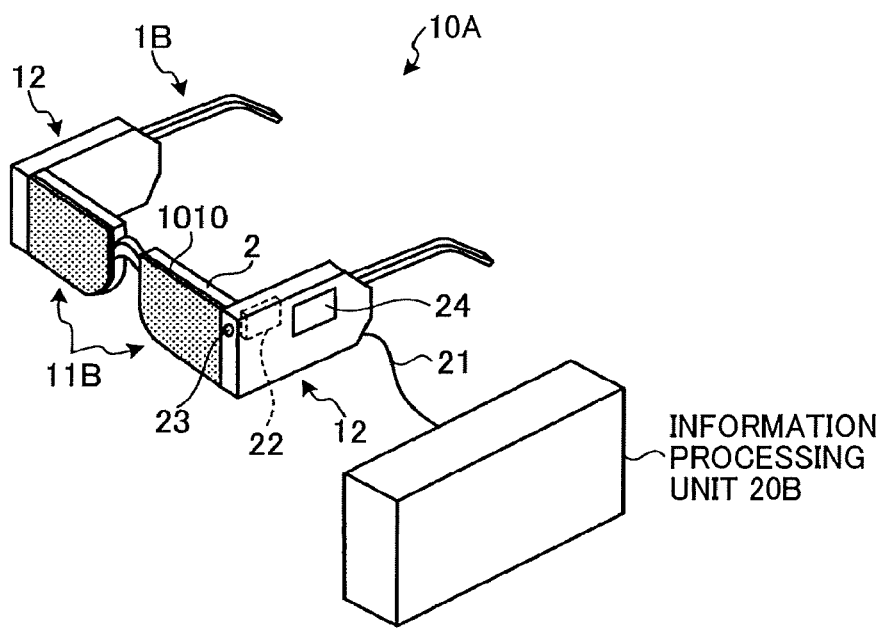
FIG. 28 is a perspective view illustrating an appearance of an example of a terminal device according to a third embodiment.
Figure 29:
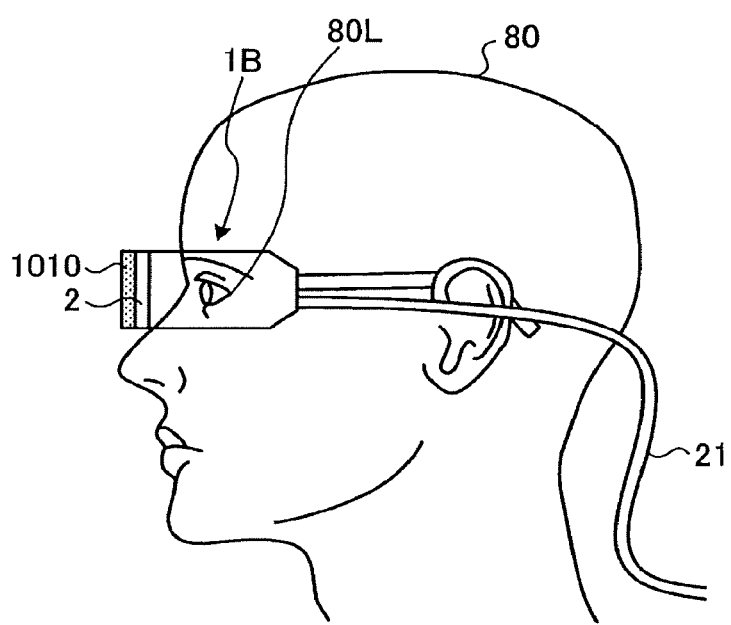
FIG. 29 is a diagram illustrating a mount example of a spectacle unit in the terminal device according to the third embodiment to a head.
Figure 30:
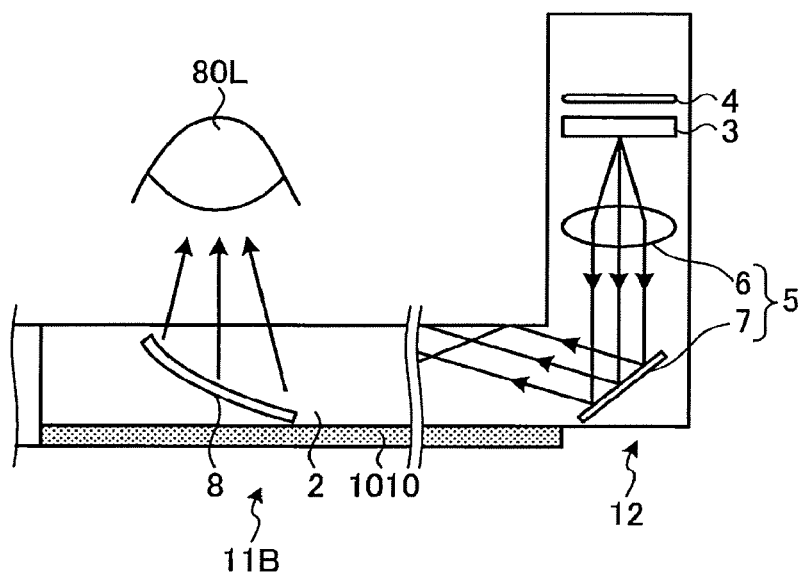
FIG. 30 is a diagram illustrating an example of a configuration of a display system built in the spectacle unit according to the third embodiment.

An example of a configuration of a terminal device including a spectacle-type device according to the third embodiment will be described in FIG. 28 to FIG. 30. FIG. 28 is a perspective view illustrating an appearance of an example of a terminal device 10A according to the third embodiment. FIG. 29 illustrates a mount example of a spectacle unit 1B in the terminal device 10A according to the third embodiment to a head 80. Further, FIG. 30 illustrates an example of a configuration of a display system built in a front 11B and a temple 12 of the spectacle unit 1B according to the third embodiment. In FIG. 28 to FIG. 30, a portion common to the portion in FIG. 2 to FIG. 4 is denoted with the same reference sign, and detailed description is omitted.

In FIG. 28 to FIG. 30, the spectacle unit 1B is provided with a dimming filter 1010 to the front 11B on an incident side of a light-guiding plate 2, the dimming filter 1010 being capable of controlling transmittance. That is, in the third embodiment, light from outside enters an eyeball through the dimming filter 1010 and the light-guiding plate 2.

Figure 31:
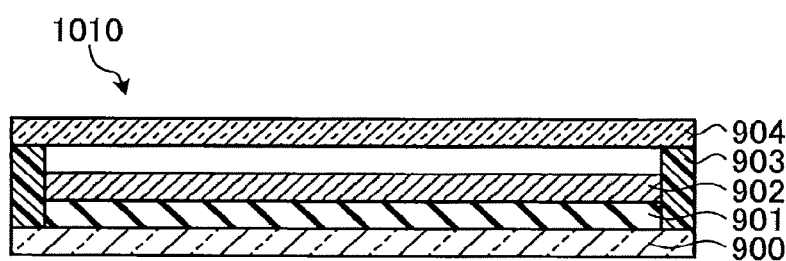
FIG. 31 is a diagram illustrating a configuration of an example of a dimming filter applicable to the third embodiment.

FIG. 31 illustrates a configuration of an example of the dimming filter 1010 applicable to the third embodiment. In FIG. 31, the dimming filter 1010 can have a cell structure obtained such that a titanium oxide particle film 901 and a display layer 902 are formed on a display substrate 900, and a counter substrate 904 is bonded with the display substrate 900 through a spacer 903 of about 10 μm. For example, 1-ethyl-3-methylimidazolium tetracyanoborate is filled in the cell structure, as an electrolytic solution.

As the display substrate 900, a film substrate with an indium tin oxide (ITO) conductive film of about 150 mm×80 mm can be used, for example. The titanium oxide particle film 901 can be formed by applying a titanium oxide nanoparticle dispersion liquid to the display substrate 900 by a spin coating method or the like, and performing annealing at a temperature of about 120° C. for about 15 minutes.

The display layer 902 can be formed by applying 1 wt % 2, 2, 3, 3-tetrafluoro propanol solution of a compound expressed by the structural formula of the chemical formula (1) below as a coating liquid onto the titanium oxide particle film 901 by the spin coating method or the like, and then performing annealing at a temperature of about 120° C. for about 10 minutes to allow an electrochromic compound to be absorbed by a titanium oxide particle surface that configures the titanium oxide particle film 901.

[Chemical Formula 1]

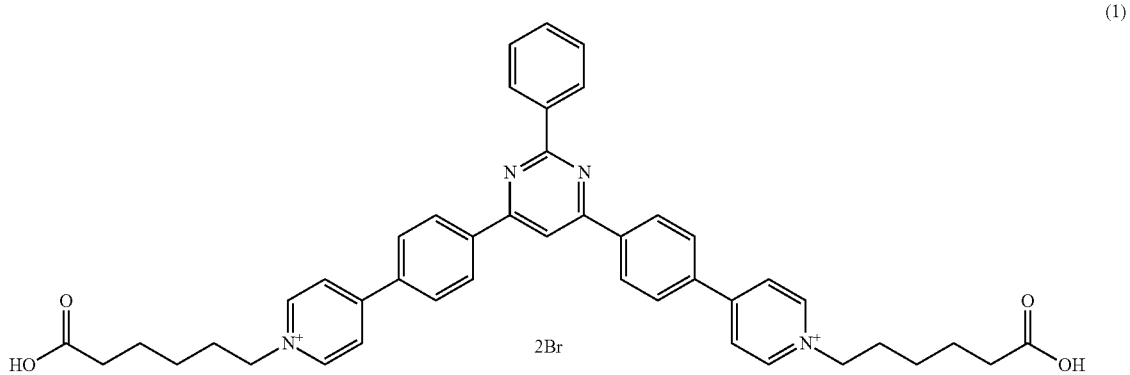

(1)

Figure 32:
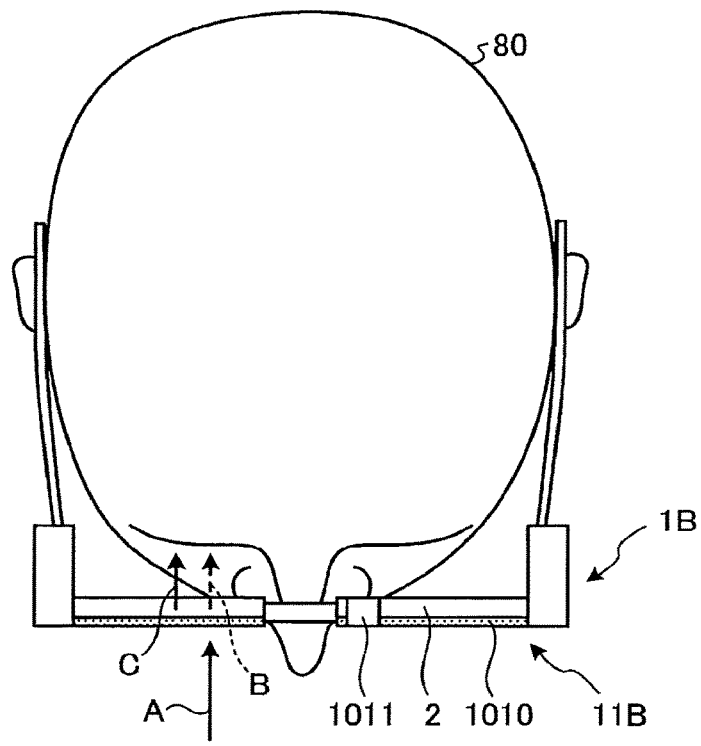
FIG. 32 is a diagram illustrating a configuration example of the spectacle unit including an illumination sensor according to the third embodiment.

The spectacle unit 1B according to the third embodiment can further include an illuminance sensor that detects illuminance of light emitted to the front 11B. FIG. 32 illustrates a configuration example of the spectacle unit including the illuminance sensor according to the third embodiment. In FIG. 32, the front 11B of the spectacle unit 1B is provided with an illuminance sensor 1011 near the center in a right and left direction. In FIG. 32, the illuminance sensor 1011 is provided on a left eye side. However, the illuminance sensor 1011 may be provided on a right eye side. The embodiment is not limited to the example, and the position where the illuminance sensor 1011 is provided is not limited as long as the illuminance sensor 1011 can accurately detect the illuminance of the light that enters both eyes through the fronts 11B in a state where the spectacle unit 1B is mounted on a head 80.

FIG. 32 illustrates a relationship among an outside light amount A, a transmission light amount B that is a reduced outside light amount A by the dimming filter 1010, and a picture light amount C of light (picture) emitted from a half mirror 8 (display) included in the front 11B. The picture displayed on a display is more easily viewed as the picture light amount C is larger than the transmission light amount B. Meanwhile, if the transmission light amount B becomes too small, an actual image of surroundings by the light from outside transmitted through the front 11B becomes less easily viewed.

Therefore, in the third embodiment, the outside light amount A is monitored by the illuminance sensor 1011, and the transmittance of the dimming filter 1010 and the amount of the picture light emitted from the half mirror 8 are controlled according to a monitoring result. Accordingly, the amounts of the light from outside emitted to the eyeballs and the picture light are appropriately emitted, and a user can easily recognize a scene by the light from outside and a picture by the picture light under different outside light environments.

Figure 33:
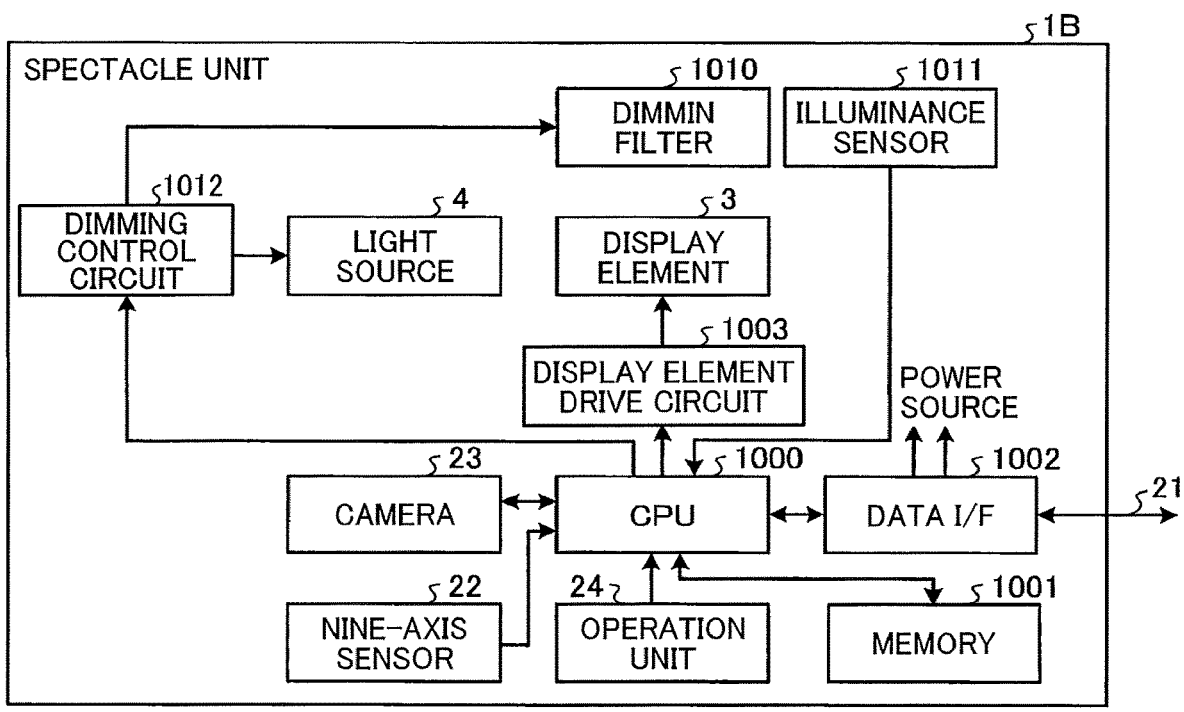
FIG. 33 is a block diagram illustrating an example of a hardware configuration of the spectacle unit according to the third embodiment.

FIG. 33 illustrates an example of a hardware configuration of the spectacle unit 1B according to the third embodiment. In FIG. 33, a portion corresponding to FIG. 5 and FIG. 32 described above is denoted with the same reference sign, and detailed description is omitted. The spectacle unit 1B illustrated in FIG. 33 has a configuration in which the dimming filter 1010, the illuminance sensor 1011, and a dimming control circuit 1012 are added to the spectacle unit 1A illustrated in FIG. 5. The dimming control circuit 1012 controls the transmittance of the dimming filter 1010 and the mount of light emitted by the light source 4 according to control of a CPU 1000.

Figure 34:
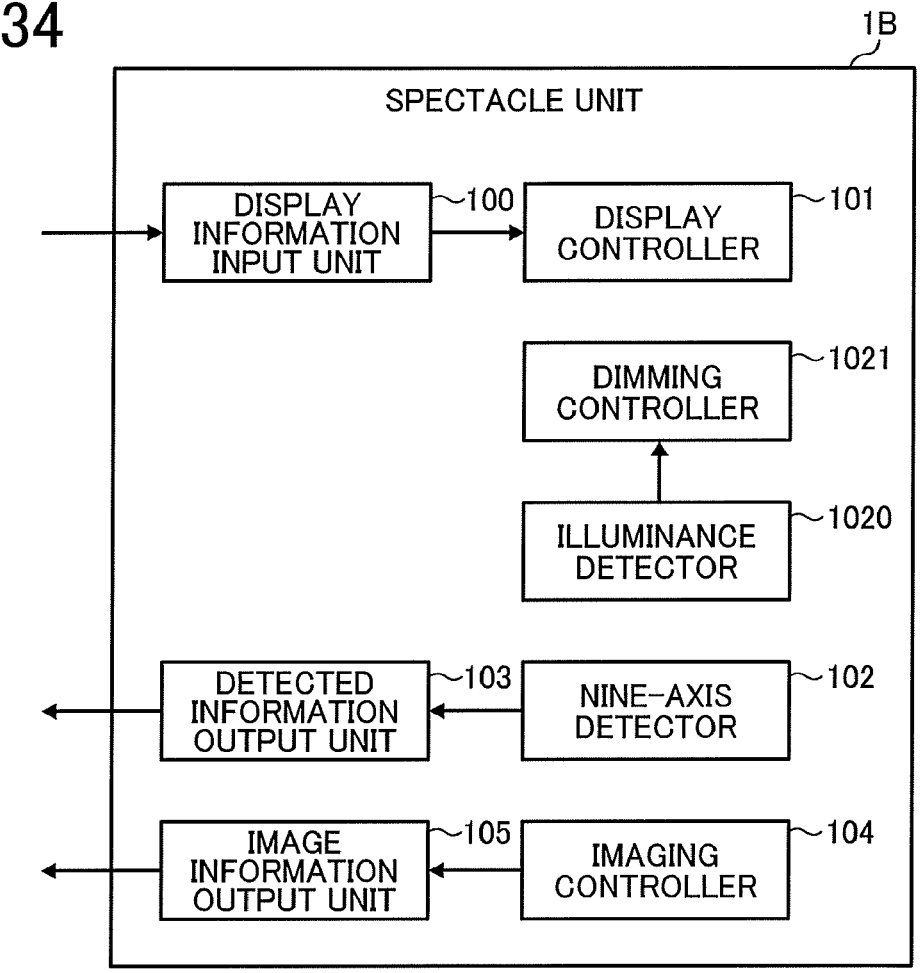
FIG. 34 is a functional block diagram illustrating functions of the spectacle unit according to the third embodiment.

FIG. 34 is a functional block diagram of an example for describing functions of the spectacle unit 1B according to the third embodiment. In FIG. 34, a portion common to FIG. 7 described above is denoted with the same reference sign, and detailed description is omitted. Further, to an information processing unit 20A in the terminal device 10A according to the third embodiment, the configuration and functions described in FIG. 6 and FIG. 7 are applicable, and thus description here is omitted.

In FIG. 34, the spectacle unit 1B has a configuration in which the illuminance detector 1020 and the dimming controller 1021 are added to the functions described in FIG. 7. The illuminance detector 1020 receives an illuminance detection result output from the illuminance sensor 1011, and passes the result to the dimming controller 1021. The dimming controller 1021 controls the transmittance of the dimming filter 1010 and the light amount of the light source 4 on the basis of the illuminance detection result passed by the illuminance detector 1020.

The dimming controller 1021 includes a dimming table in which the illuminance detection result by the illuminance sensor 1011, the transmittance in the dimming filter 1010, and the light amount of the light source 4 are associated with one another. The dimming table can be stored in a ROM area of a memory 1001 included in the spectacle unit 1B in advance, for example. The dimming controller 1021 refers to the dimming table on the basis of the illuminance detection result passed by the illuminance detector 1020 to acquire the corresponding transmittance and light amount. The dimming controller 1021 controls the dimming filter 1010 and the light source 4 according to the acquired transmittance and light amount.

Figure 35:
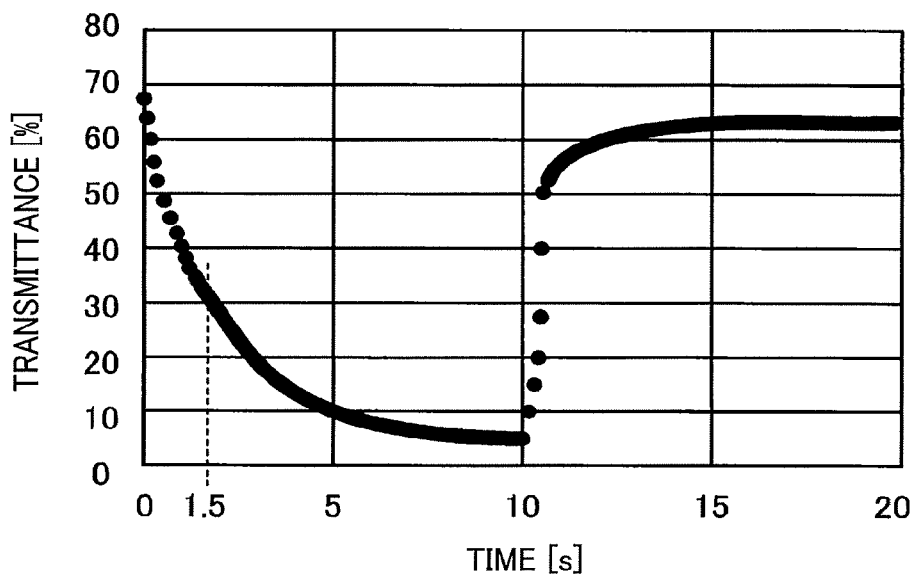
FIG. 35 is a diagram illustrating an example of change of transmittance of the dimming filter applicable to the third embodiment.

FIG. 35 illustrates an example of change of the transmittance of the dimming filter 1010 applicable to the third embodiment. In the example of FIG. 35, 2 V of constant voltage is applied to develop colors of the display layer 902 of the dimming filter 1010. From FIG. 35, to obtain 30% transmittance of the dimming filter 1010, the dimming controller 1021 applies 2 V of constant voltage to the dimming filter 1010 for 1.5 seconds. To obtain 10% transmittance of the dimming filter 1010, the dimming controller 1021 applies 2 V of constant voltage to the dimming filter 1010 for 5 seconds. In this way, the dimming controller 1021 controls the transmittance of the dimming filter 1010 to adjust the transmission light amount B.

Meanwhile, the picture light amount C on the display of the spectacle unit 1B can be adjusted by control of the dimming controller 1021 of the amount (intensity) of light emitted by the light source 4. For example, consider a case of using a light emitting diode (LED) as the light source 4, and driving the light source 4 by power supply by pulse width modulation (PWM). In this case, the dimming controller 1021 changes a pulse width (duty ratio) to turn on and off the LED as the light source 4 to control the light amount of the light source 4.

An example of sites to which the information sharing system according to any of the embodiments is applied includes an outdoor large space. A spectacle-type device according to a related art often has a difficulty in clearly recognizing a picture on a display because brightness of the light from outside (sunlight) is overwhelmingly strong against the luminance of the display outdoors. Therefore, the spectacle-type device according to a related art requires measures to put a light shielding sheet on a display surface. In this case, the density of the light shielding sheet is constant, and control according to the brightness of outside is difficult. Further, when a user wants to move without viewing the picture displayed on the display, the view is disturbed. Therefore, the light shielding sheet needs to be removed.

The spectacle unit 1B according to the third embodiment controls the transmittance of the dimming filter 1010 and the light amount of the light source 4 according to the intensity of the light from outside. Therefore, by use of the terminal device 10A including the spectacle unit 1B according to the third embodiment, the user can use the spectacle unit 1B in an appropriate state indoors and outdoors without separately using light shielding means.

Fourth Embodiment

Next, a fourth embodiment will be described. In the first embodiment, the second embodiment, the third embodiment, and the modifications of the embodiments described above, the map information is displayed on the display of the terminal device 10 or the display of the terminal device 10A, as the spectacle-type device, and the position information that indicates the position of the terminal devices 10 or the position of the terminal device 10A is superimposed and displayed on the map information.

In contrast, in the fourth embodiment, a display of a terminal device as a spectacle-type device is used in a transmissive state, and information that indicates a position of another terminal device is superimposed and displayed on a position on the display, the position corresponding to an appropriate position of an image in an actual world (hereinafter, the image is called actual image) that can be visually recognized in a transmissive manner. Accordingly, a user (hereinafter, a wearer) who mounts the terminal device according to the fourth embodiment can recognize information such as the position about another terminal device while securing visibility to the actual image.

Figure 36:
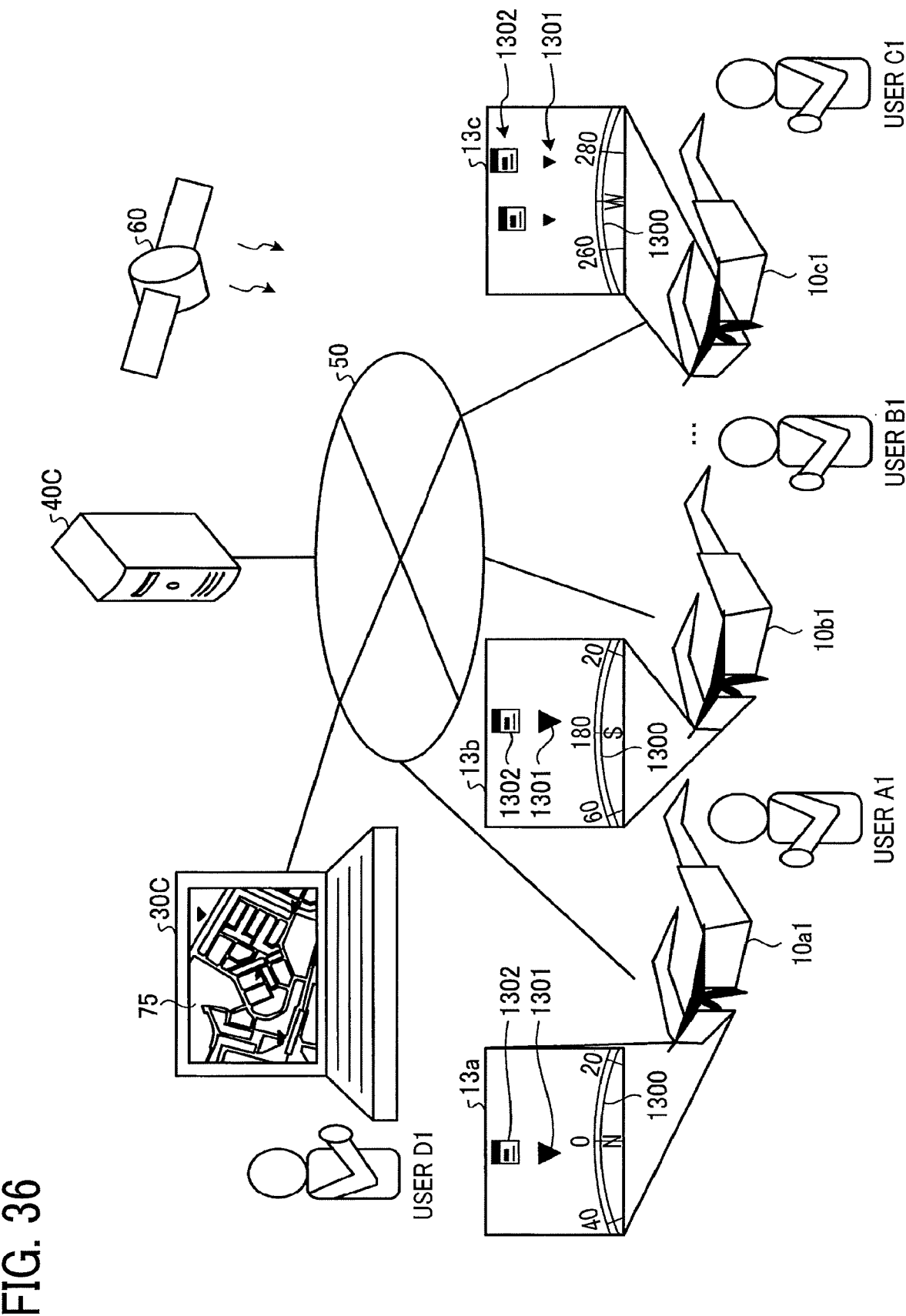
FIG. 36 is a diagram illustrating a configuration of an example of an information sharing system according to a fourth embodiment.

FIG. 36 illustrates a configuration of an example of an information sharing system according to the fourth embodiment. In FIG. 36, a portion common to FIG. 1 described above is denoted with the same reference sign, and detailed description is omitted. The information sharing system according to the fourth embodiment includes a plurality of terminal devices 10a1, 10b1, 10c1, and 30C respectively used by users A1, B1, C1, and D1, and a management server 40C. The terminal devices 10a1, 10b1, 10c1, and 30C and the management server 40C are communicatively connected to one another through a network 50.

The terminal device 10a1, the terminal device 10b1, and the terminal device 10c1 illustrated in FIG. 36 include a spectacle-type device corresponding to the terminal device 10A including the front portion 11B provided with a dimmer according to the third embodiment, and can communicate with the network 50 by wireless communication. Further, in the fourth embodiment, the terminal device 10A responds to a GNSS, and can acquire position information that indicates a position of an own device on the basis of a signal transmitted from a satellite 60 by the GNSS.

In FIG. 36, the terminal device 30C is a commander terminal used by the user D1 who provides a command to the user A1, the user B1, and the user C1, for example. Hereinafter, the terminal device 30C is called commander terminal 30C. The management server 40C corresponds to the management server 40A in FIG. 1, and the terminal device 10a1, the terminal device 10b1, and the terminal device 10c1 are connected to the commander terminal 30C through the management server 40C. The commander terminal 30C can display, on a screen 75, a map image including positions where the terminal device 10a1, the terminal device 10b1, and the terminal device 10c1 exist.

The terminal device 10a1, the terminal device 10b1, and the terminal device 10c1 include a display including the same optical structure as the display system described in FIG. 30. On a screen 13a, a screen 13b, and a screen 13c displayed on the displays of the terminal device 10a1, the terminal device 10b1, and the terminal device 10c1, an azimuth display 1300 that indicates an azimuth that the own device faces, and a position marker 1301 and a label 1302 that indicate information regarding the terminal device as a spectacle-type device, other than the own device, are superimposed and displayed on a scene (actual image) in the actual world, which has been transmitted through the half mirror 8. Hereinafter, description will be given, assuming that the actual image seen by the eye of the user in a transmissive manner through the half mirror 8 is also displayed on the display for convenience.

(Configuration Applicable to Fourth Embodiment)

Next, an example of a configuration of the terminal device 10a1, the terminal device 10b1, and the terminal device 10c1 applicable to the fourth embodiment will be described in FIG. 37 to FIG. 40. Hereinafter, description will be given using the terminal device 10a1 that represents the terminal device 10a1, the terminal device 10b1, and the terminal device 10c1 unless otherwise particularly stated. Further, in FIG. 38 to FIG. 40, a portion common to FIG. 6, FIG. 33, and FIG. 34 described above is denoted with the same reference sign, and detailed description is omitted.

Figure 37:
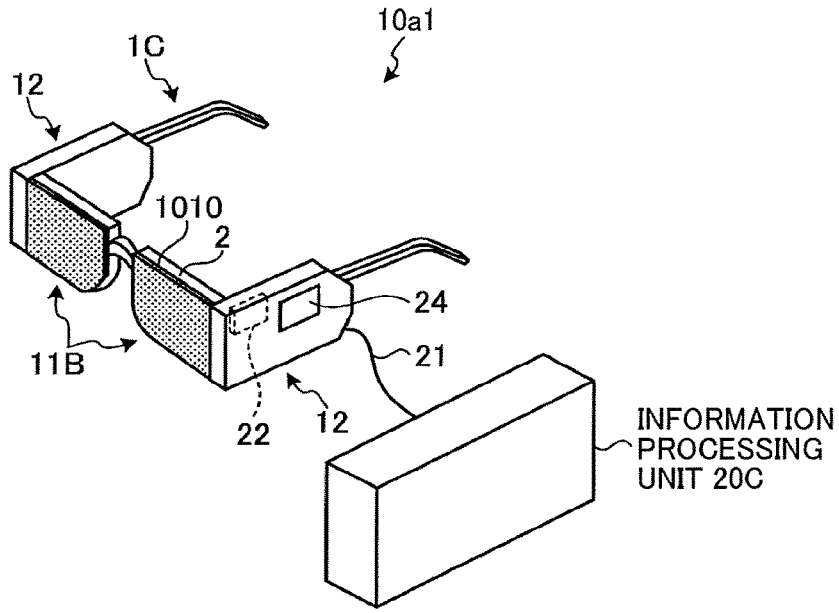
FIG. 37 is a perspective view illustrating an appearance of an example of a terminal device according to the fourth embodiment.
Figure 38:
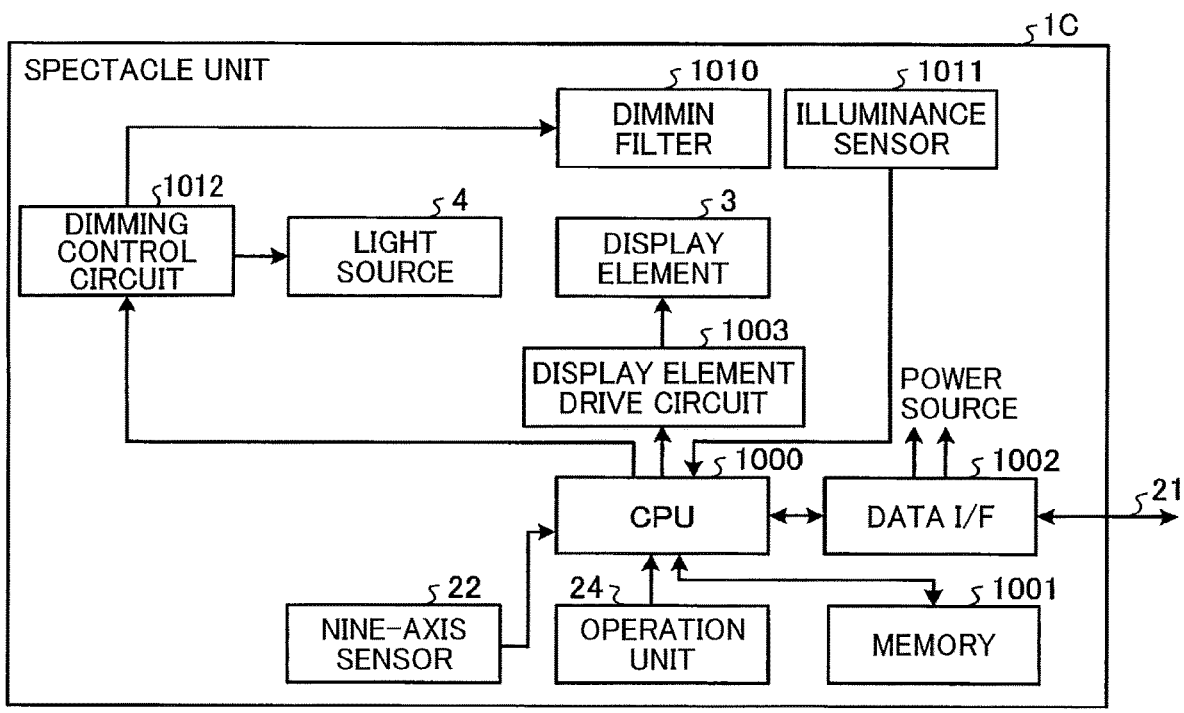
FIG. 38 is a block diagram illustrating an example of a hardware configuration of a spectacle unit in which a camera is omitted.

FIG. 37 is a perspective view illustrating an appearance of an example of the terminal device 10a1 according to the fourth embodiment. As exemplarily illustrated in FIG. 37, the terminal device 10a1 includes a spectacle unit 1C and an information processing unit 20C coupled to the spectacle unit 1C through the cable 21. The spectacle unit 1C has a configuration in which the camera 23 is omitted from the spectacle unit 1B illustrated in FIG. 28. FIG. 38 illustrates an example of a hardware configuration of the spectacle unit 1C having the configuration in which the camera 23 is omitted from the spectacle unit 1B of FIG. 33.

Figure 39:
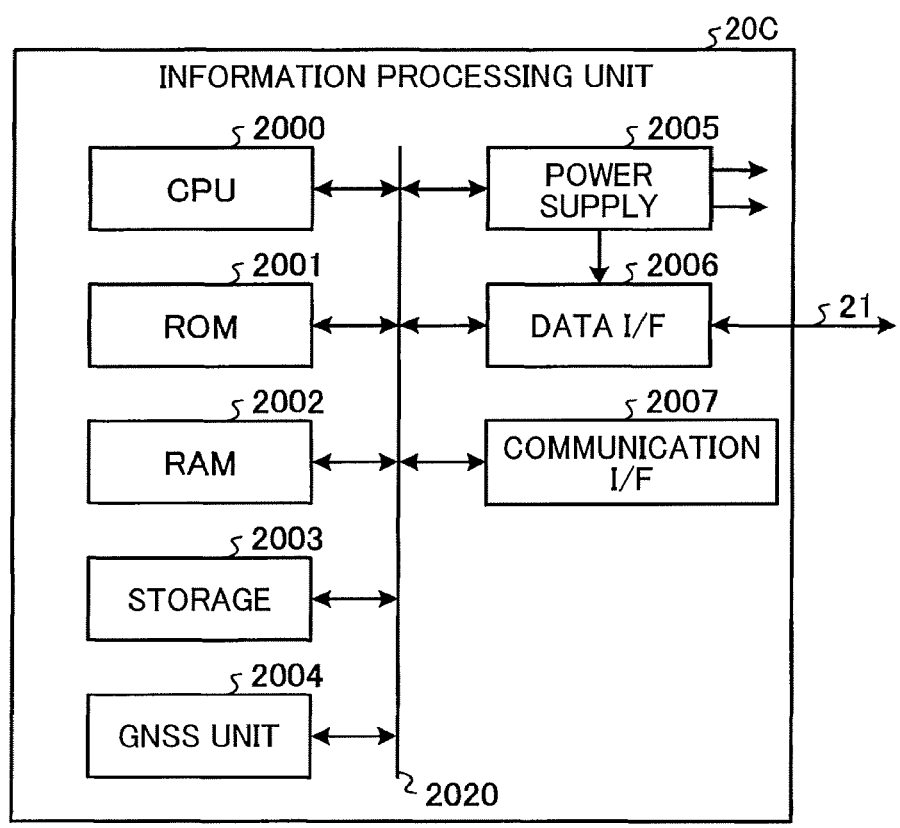
FIG. 39 is a block diagram illustrating an example of a hardware configuration of an information processing unit applicable to the fourth embodiment.

FIG. 39 illustrates an example of a hardware configuration of the information processing unit 20C applicable to the fourth embodiment. As illustrated in FIG. 39, the information processing unit 20C has a configuration in which the audio I/F 2008 to which the MIC 2030 is connected is omitted from an information processing unit 20A illustrated in FIG. 6. Further, the audio-and-image analyzer 2009 is also omitted with the omission of the audio I/F 2008 and the camera 23 in the spectacle unit 1C.

FIG. 40 is a functional block diagram illustrating functions of the terminal device 10a1 according to the fourth embodiment. In FIG. 40, the spectacle unit 1C has a configuration in which the imaging controller 104 and the image information output unit 105 are omitted from the spectacle unit 1B illustrated in FIG. 34 with the omission of the camera 23 and the audio I/F 2008. Similarly, the information processing unit 20B has a configuration in which the input processor 205 is omitted from the information processing unit 20A illustrated in FIG. 7.

Meanwhile, a display information generator 204a includes a function as a display controller to generate the position marker 1301 and the label 1302 according to the fourth embodiment and to display the position marker 1301 and the label 1302 on the screen 13a. The functions of the display information generator 204a will be described below. Further, a head movement detector 207a calculates the azimuth that the terminal device 10a1 faces, using outputs of a magnetic field sensor of a nine-axis sensor 22. The head movement detector 207a outputs correction values to correct inclinations with respect to directions, using a roll angle, a yaw angle, and a pitch angle acquired from outputs of a gyro sensor of the nine-axis sensor 22.

In the information sharing system according to the fourth embodiment, the commander terminal 30C can be achieved by a hardware configuration and functions equivalent to the commander terminal 30B described in FIG. 18 and FIG. 19. Therefore, description here is omitted. Note that the commander terminal 30C can have a configuration in which the audio I/F 3010, the microphone 3030, and the speaker 3031 are omitted from the configuration of FIG. 18. Further, the management server 40C applicable to the fourth embodiment can be achieved by a hardware configuration and functions equivalent to the management server 40A described in FIG. 8 and FIG. 9. Therefore, description here is omitted.

Figure 41A:
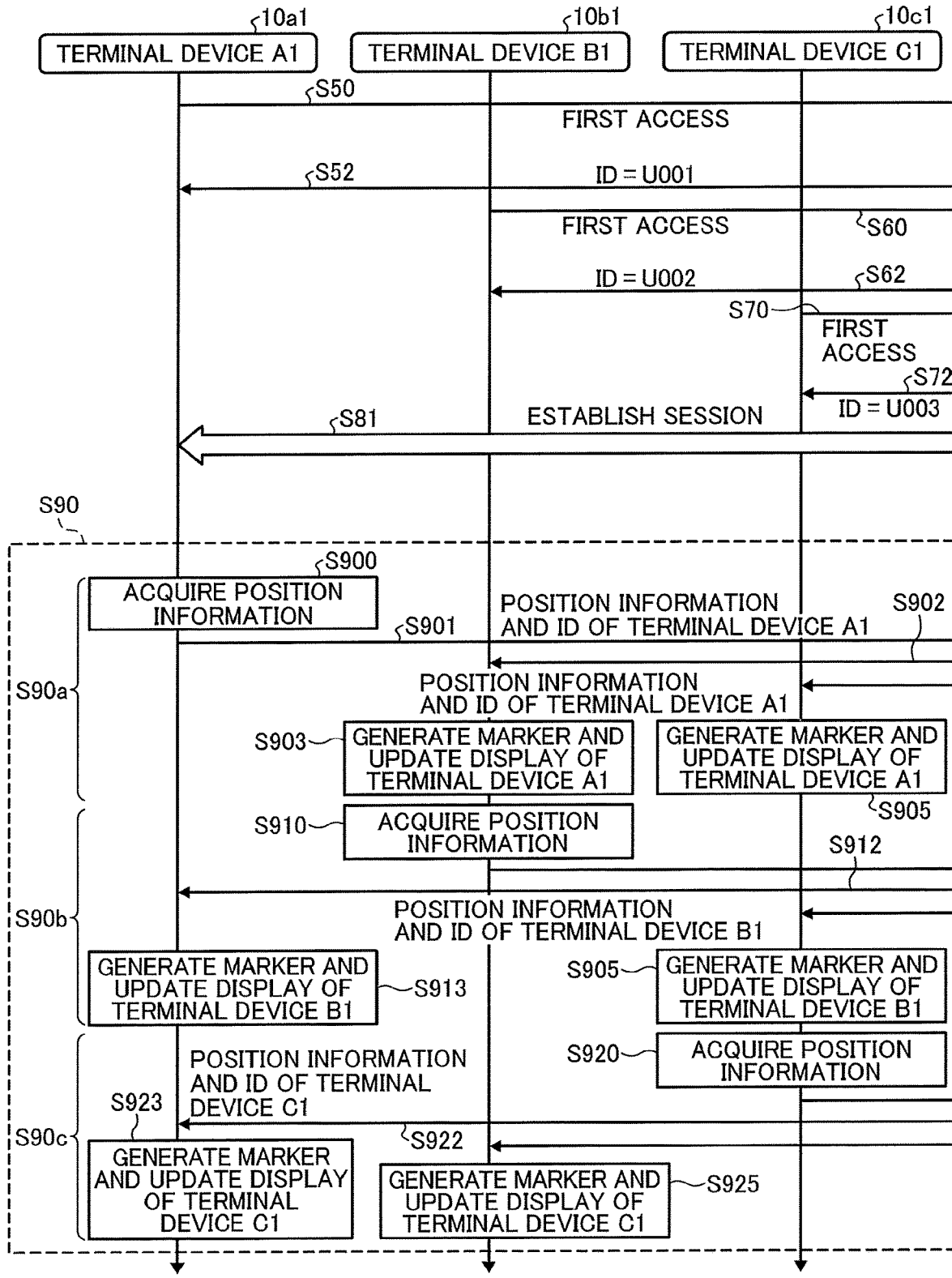
FIGS. 41A and 41B are a sequence diagram illustrating an example of processing in the information sharing system according to the fourth embodiment.
Figure 41B:
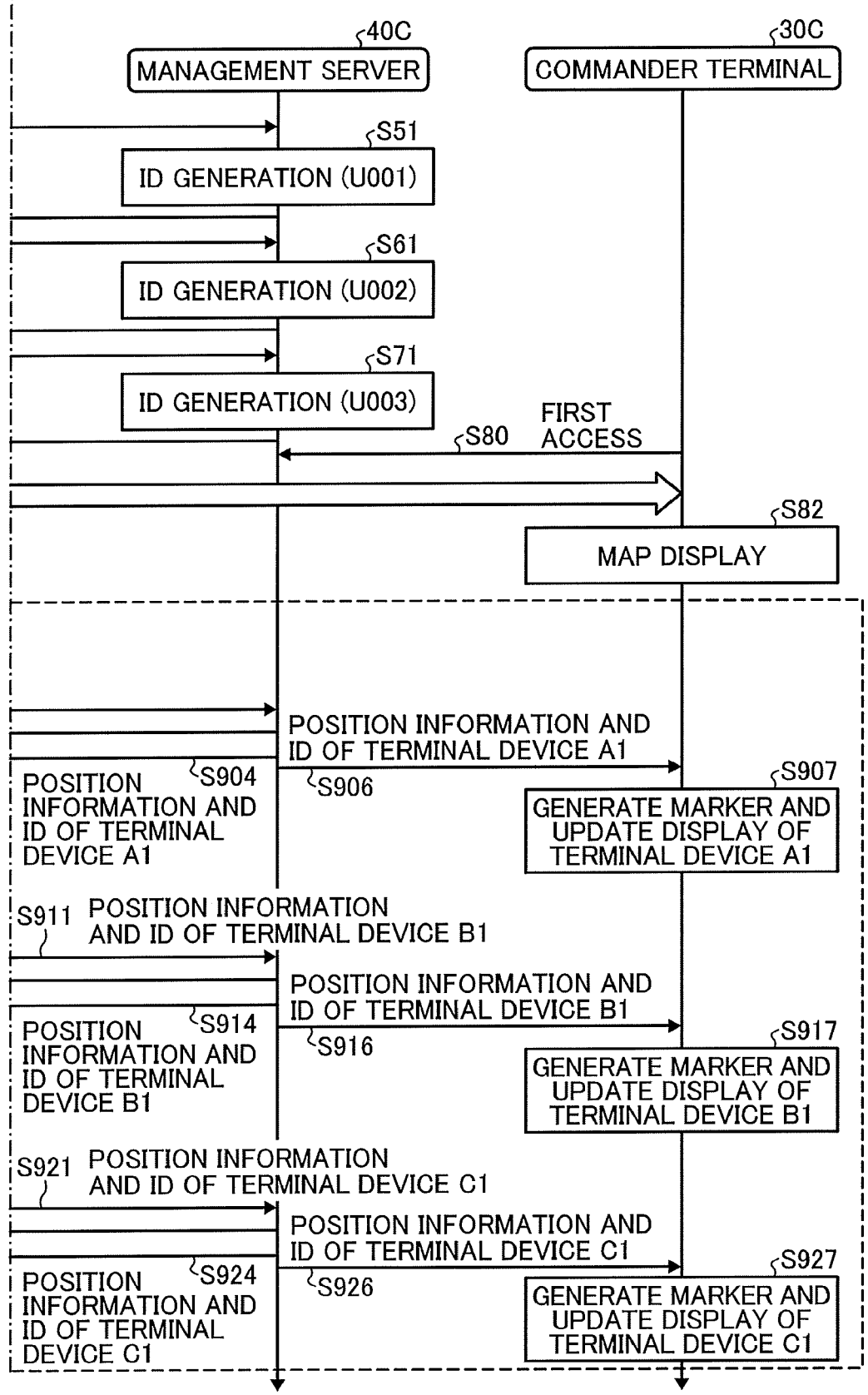

FIGS. 41A and 41B (FIG. 41) are a sequence diagram illustrating an example of processing in the information sharing system according to the fourth embodiment. In FIG. 41, a portion common to FIG. 36 described above is denoted with the same reference sign, and detailed description is omitted. Further, in FIG. 41, the terminal device 10a1, the terminal device 10b1, and the terminal device 10c1 are also described as "terminal device A1", "terminal device B1", and "terminal device C1", respectively.

Hereinafter, description will be given, in which position information is shared among the terminal device 10a1 mounted by the user A1, the terminal device 10b1 mounted by the user B1, and the terminal device 10c1 mounted by the user C1. Further, the user D1 is browsing positions of the user A1, the user B1, and the user C1 at the same time, using the commander terminal 30C, as the commander of the user A1, the user B1, and the user C1.

When the terminal device 10a1 performs a first access to the management server 40C (step S50), the management server 40C generates identification information (ID) for identifying the terminal device 10a1 (step S51). The management server 40C stores the generated ID and returns the ID to the terminal device 10a1 (step S52). The management server 40C similarly generates IDs for respectively identifying the terminal device 10b1 and the terminal device 10c1 in response to first accesses (step S60 and step S70) from the terminal device 10b1 and the terminal device 10c1 (step S61 and step S71), stores the generated IDs, and returns the IDs to the terminal device 10b1 and the terminal device 10c1, respectively (step S62 and step S72). Here, the management server 40C generates "U001", "U002", and "U003" as the IDs of the terminal device 10a1, the terminal device 10b1, and the terminal device 10c1, respectively.

Further, the commander terminal 30C also performs a first access to the management server 40C (step S80). FIG. 41 illustrates that the management server 40C does not generate an ID for the commander terminal 30C. However, the embodiment is not limited to this example, and the management server 40C may generate an ID for the commander terminal 30C.

Further, in FIG. 41, the first accesses to the management server 40C are executed in the order of the terminal device 10a1, the terminal device 10b1, the terminal device 10c1, and the commander terminal 30C. However, this order is an example for description. The order of the first accesses to the management server 40C from the terminal device 10a1, the terminal device 10b1, the terminal device 10c1, and the commander terminal 30C is not limited to the example illustrated in FIG. 41.

The management server 40C establishes sessions with the terminal device 10a1, the terminal device 10b1, the terminal device 10c1, and the commander terminal 30C, upon receiving the first accesses from the terminal device 10a1, the terminal device 10b1, the terminal device 10c1, and the commander terminal 30C (step S81). When the sessions are established, the terminal device 10a1, the terminal device 10b1, the terminal device 10c1, and the commander terminal 30C become able to communicate with the management server 40C through the network 50. Accordingly, for example, the terminal device 10a1, the terminal device 10b1, and the terminal device 10c1 become able to share the position information of other terminal devices through the network 50 and the management server 40C.

In FIG. 41, the sessions are established after the first accesses are received from the terminal device 10a1, the terminal device 10b1, the terminal device 10c1, and the commander terminal 30C. However, the embodiment is not limited to this example. For example, the management server 40C can establish the sessions upon receiving the first accesses from at least two or more terminal devices, of the terminal device 10a1, the terminal device 10b1, and the terminal device 10c1.

The commander terminal 30C acquires map information when the session with the management server 40C is established (step S82). The commander terminal 30C displays a map image based on the acquired map information on the screen 75.

Next step S90 illustrates position information acquisition processing and position marker updating processing in the terminal device 10a1, the terminal device 10b1, and the terminal device 10c1. In step S90, step S90a, step S90b, and step S90c illustrate examples of processing according to the position information acquisition processing in the terminal device 10a1, the terminal device 10b1, and the terminal device 10c1, respectively.

The processing of step S90a will be described. In step S90a, the terminal device 10a1 acquires the position information that indicates the position of the own device, using the GNSS (step S900). The position information is acquired as latitude and longitude information. The terminal device 10a1 transmits the acquired position information and the ID (=U001) of the own device to the management server 40C (step S901).

The management server 40C transmits the received position information and ID to the other terminal devices 10b1 and 10c1, respectively, upon receiving the position information and the ID from the terminal device 10a1 (step S902 and step S904). Although details will be described below, the management server 40C can store attribute information of the terminal device 10a1, the terminal device 10b1, and the terminal device 10c1 in association with the IDs of the terminal device 10a1, the terminal device 10b1, and the terminal device 10c1. In this case, the management server 40C can transmit the attribute information together with the position information and the ID of the terminal device 10a1 to the other terminal devices 10b1 and 10c1.

The terminal device 10b1 generates the position marker that represents the terminal device 10a1 and displays the position marker on a position on the screen 13b, the position corresponding to the position information of the terminal device 10a1, when first receiving the position information and the ID of the terminal device 10a1 from the management server 40C (step S903). Further, the terminal device 10b1 displays a label including the information (for example, the ID) that indicates the terminal device 10a1 on a position on the screen 13b, the position according to the position marker. In a case where the attribute information of the terminal device 10a1 has been transmitted together with the position information and the ID from the management server 40C, the terminal device 10b1 includes the information included in the attribute information to the label and displays the label.

Note that the terminal device 10b1 updates, when receiving the position information and the ID of the terminal device 10a1 from the management server 40C after the first receipt, the display position of the position marker that indicates the position of the terminal device 10a1 and the display position of the label including the information that indicates the terminal device 10a1, which have already been displayed on the screen 13b, according to the received position information. Further, the terminal device 10b1 updates the display position of the information that indicates the terminal device 10a1, according to the display position of the position marker of the terminal device 10a1.

The terminal device 10*c*1 executes equivalent processing to the terminal device 10*b*1. That is, the terminal device 10*c*1 generates the position marker and the label corresponding to the terminal device 10*a*1, and displays the position marker and the label on positions on the screen 13*c*, the positions corresponding to the position information of the terminal device 10*a*1, when first receiving the position information and the ID of the terminal device 10*a*1 from the management server 40C (step S905). The terminal device 10*b*1 similarly updates, when receiving the position information and the ID of the terminal device 10*a*1 from the management server 40C after the first receipt, the display positions of the position marker and the label corresponding to the terminal device 10*a*1, which have already been displayed on the screen 13*c*, according to the received position information.

The management server 40C further transmits the position information and the ID of the terminal device 10*a*1 received from the terminal device 10*a*1 in step S901 to the commander terminal 30C (step S906). The commander terminal 30C displays the marker that represents the terminal device 10*a*1 on a position on the map image displayed on the screen 75, the position corresponding to the position information, on the basis of the position information and the ID of the terminal device 10*a*1 first received from the management server 40C (step S907).

Further, the commander terminal 30C updates, when receiving the position information and the ID of the terminal device 10*a*1 from the management server 40C after the first receipt, the display position of the marker that indicates the position of the terminal device 10*a*1, which has already been displayed on the screen 75, according to the received position information.

In step S90*b* and step S90*c*, processing similar to step S90*a* described above is executed in response to the acquisition of the position information by the terminal device 10*b*1 and the terminal device 10*c*1. That is, in step S90*b*, the terminal device 10*b*1 acquires the position information that indicates the position of the own device, using the GNSS (step S910), and transmits the acquired position information together with the ID (=U002) of the own device to the management server 40C (step S911). The management server 40C transmits the position information and the ID received from the terminal device 10*b*1 to the terminal device 10*a*1 and the terminal device 10*c*1 (step S912 and step S914).

Note that the terminal device 10*b*1 can calculate a distance between the own device and another terminal device on the basis of the position information that indicates the position of the own device acquired in step S910, and the position information that indicates the position of another terminal device, for example, the position information that indicates the position of the terminal device 10*a*1 received from the management server 40C in step S902. The terminal device 10*b*1 can display the calculated distance on the label corresponding to the appropriate another terminal device.

The terminal device 10*a*1 and the terminal device 10*c*1 generate the position marker that represents the terminal device 10*b*1 on the basis of the position information and the ID of the terminal device 10*b*1 acquired from the management server 40C in the first receipt. The terminal device 10*a*1 and the terminal device 10*c*1 display the generated position marker on positions on the screen 13*a* and the screen 13*c*, the positions corresponding to the position information of the terminal device 10*a*1 (step S913 and step S915). Further, the terminal device 10*a*1 and the terminal device 10*c*1 display the label including the information that indicates the terminal device 10*b*1 on positions on the screen 13*a* and the screen 13*c*, the positions according to the position marker.

The terminal device 10*a*1 and the terminal device 10*c*1 update, when receiving the position information and the ID of the terminal device 10*b*1 from the management server 40C after the first receipt, the display position of the position marker that indicates the position of the terminal device 10*b*1 and the display position of the label including the information that indicates the terminal device 10*b*1, which have already been displayed on the screen 13*a* and the screen 13*c*, according to the received position information.

The management server 40C further transmits the position information and the ID of the terminal device 10*b*1 received from the terminal device 10*b*1 in step S911 to the commander terminal 30C (step S916). The commander terminal 30C displays or updates the marker that indicates the terminal device 10*b*1, on the map image information displayed on the screen 75, on the basis of the position information and the ID of the terminal device 10*b*1 received from the management server 40C (step S917).

Similarly, in the processing in step S90*c*, the position information that indicates the position of the own device acquired by the terminal device 10*c*1 in step S920 is transmitted together with the ID of the terminal device 10*c*1 to the terminal device 10*a*1 and the terminal device 10*b*1 through the management server 40C (step S921) (step S922 and step S924). The terminal device 10*a*1 and the terminal device 10*b*1 generate the position marker that indicates the position of the terminal device 10*c*1 and displays the position marker on the screen 13*a* and the screen 13*b*, in the case of the first receipt from the management server 40C, and update the display of the position marker that indicates the position of the terminal device 10*c*1, which has already been displayed on the screen 13*a* and the screen 13*b*, in the case of receipt after the first receipt, on the basis of the position information and the ID of the terminal device 10*c*1 received from the management server 40C (step S923 and step S925).

Further, the management server 40C also transmits the position information and the ID received from the terminal device 10*c*1 to the commander terminal 30C (step S926). The commander terminal 30C updates the position of the marker corresponding to the terminal device 10*c*1, on the map image displayed on the screen 75, according to the information transmitted from the management server 40C (step S927).

In the above description, the processing is executed in the order of step S90*a*, step S90*b*, and step S90*c* for description. However, the embodiment is not limited to this example. That is, the processing of step S90*a*, step S90*b*, and step S90*c* is executed when the position information is updated in the terminal device 10*a*1, the terminal device 10*b*1, or the terminal device 10*c*1. Therefore, the order of the processing of step S90*a*, step S90*b*, and step S90*c* is changed according to an acquisition state of the position information from the satellite 60 by the GNSS, a communication environment between the terminal device 10*a*1, the terminal device 10*b*1, or the terminal device 10*c*1, and the management server 40C, or the like. Further, the processing of step S90*a*, step S90*b*, and step S90*c* can be executed in a parallel manner without waiting for termination of each processing.

With the above processing, the terminal device 10*a*1, the terminal device 10*b*1, and the terminal device 10*c*1 can acquire the position information that indicates the positions of other terminal devices according to change of the positions of the other terminal devices. Accordingly, the terminal device 10*a*1, the terminal device 10*b*1, and the terminal device 10c1 can update the display position of the position markers that indicate the positions of the other terminal devices, which are displayed on the screen 13a, the screen 13b, and the screen 13c, according to movement of the terminal device 10a1, the terminal device 10b1, and the terminal device 10c1.

FIGS. 42A and 42B specifically illustrate an example of the screen 13a, the screen 13b, and the screen 13c of the terminal device 10a1, the terminal device 10b1, and the terminal device 10c1 according to the fourth embodiment. In FIGS. 42A and 42B, description is given using the screen 13a that represents the screen 13a, the screen 13b, and the screen 13c. FIG. 42B illustrates an example of a state of the user A1 who mounts the terminal device 10a1 that displays the screen 13a, and FIG. 42A illustrates an example of display of the screen 13a in the state of FIG. 42B.

In FIG. 42B, the diagonally right upward direction points to a north direction. Further, an object 14 as a structure exists in the north direction with respect to the user A1, for example. The user B1 who mounts the terminal device 10b1 exists behind the object 14 as viewed from the user A1, and the user C1 who mounts the terminal device 10c1 exists in the distance on a slightly west of the user B1. The terminal device 10a1, the terminal device 10b1, and the terminal device 10c1 detect the positions of the own devices, using the GNSS, and transmits the position information that indicates the detected positions together with the IDs of the own devices to the management server 40C, according to the processing of step S900 and step S901, step S910 and step S911, and step S920 and step S921 in FIG. 41.

In the fourth embodiment, in the state of FIG. 42B, an image of the object 14 is displayed in a transmissive manner on the screen 13a of the terminal device 10a1 as an actual image. Further, as for the other terminal devices 10b1 and 10c1, a position marker 1301a and a position marker 1301b that indicate the positions, and a label 1302a and a label 1302b including the attribute information are superimposed and displayed on the actual image.

The position marker 1301a and the position marker 1301b are respectively displayed on positions on the screen 13a, the positions corresponding to directions of the terminal device 10b1 and the terminal device 10c1, using the position of the terminal device 10a1 as a reference. Further, the position marker 1301a and the position marker 1301b are displayed to have sizes according to the distance between the terminal device 10a1 and the terminal device 10b1, and the distance between the terminal device 10a1 and the terminal device 10c1. In the example of FIG. 42A and FIG. 42B, the user B1 exists closer to the user A1 than the user C1 does. Therefore, the position marker 1301a corresponding to the user B1 is displayed larger than the position marker 1301b corresponding to the user C1.

The label 1302a and the label 1302b are displayed on positions on the screen 13a, the positions according to the corresponding position marker 1301a and position marker 1301b of the user B1 and the user C1. At this time, the label 1302a and the label 1302b are displayed on positions of heights according to the distance between the user A1 (terminal device 10a1) and the user B1 (terminal device 10b1) and the distance between user A1 (terminal device 10a1) and the user C1 (terminal device 10c1), with respect to the position marker 1301a and the position marker 1301b. In this example, the label 1301a corresponding to the user B1 is displayed on the position lower than the label 1302b corresponding to the user C1.

An azimuth display 1300 that indicates an azimuth that the terminal device 10a1 faces is displayed in a lower portion on the screen 13a. When the direction that the terminal device 10a1 faces is changed, display of the azimuth display 1300 is changed according to the direction of the terminal device 10a1. In the example of FIG. 42A, the azimuth display 1300 is displayed such that 0° (N) is displayed in a central portion on the screen 13a in a lateral direction, and which indicates the terminal device 10a1 faces the north (N).

The azimuth display 1300 has information displayed in an appropriate range according to an angle of view of the screen 13a. In the example of FIG. 42A, the angle of view of the screen 13a is 46° (23° to the right and left with respect to the center of the screen 13a), and the azimuth display 1300 is displayed in the range of 46°. The embodiment is not limited to this example, and the azimuth display 1300 can be displayed at a larger angle of view than the angle of view of the screen 13a. In this case, while existence of the users (terminal devices) can be confirmed in a wider range, the position marker 1301a and the position marker 1301b are displayed in directions different from the directions of the terminal device 10b1 and the terminal device 10c1 on the actual image displayed in a transmissive manner through the screen 13a.

In this way, whether the position marker is displayed to be matched with the azimuth although the information displayable on the screen 13a is small, and whether a larger volume of information is displayed on the screen 13a although the display of the position marker is not matched with the azimuth can be appropriately selected.

Further, for example, the display of the position marker 1301a and the position marker 1301b of the other terminal devices 10b1 and 10c1 is updated according to the positions of the terminal device 10b1 and the terminal device 10c1, on the screen 13a of the terminal device 10a1, as described in FIG. 41. Consider a case in which at least one of the user A1, the user B1, and the user C1 moves by foot, for example. In this case, relative positional relationship between the user A1, and the user B1 and the user C1 is changed, and the display of the position marker 1301a and the position marker 1301b corresponding to the user B1 and the user C1 on the screen 13a is dynamically changed according to the change of the positional relationship.

Further, the label 1302a and the label 1302b including the information of the user B1 and the user C1 are displayed on the positions corresponding to the corresponding position marker 1301a and position marker 1301b, on the screen 13a. The display positions of the label 1302a and the label 1302b are changed following change of the positions of the position marker 1301a and the position marker 1301b.

As described above, in the information sharing system according to the fourth embodiment, the position marker 1301a and the position marker 1301b that indicate the positions of the other users B1 and C1 are superimposed on the actual image and displayed on the screen 13a of the terminal device 10a1 of the user A1. Therefore, for example, even when the user B1 and the user C1 exist behind the object 14 as viewed from the user A1, the user A1 can recognize existence and rough positions of the user B1 and the user C1.

For example, in a system that needs image recognition, a target that cannot be visually recognized by a user who mounts a spectacle-type device cannot be displayed with a position marker. In contrast, in the information sharing system according to the fourth embodiment, the position markers that indicate the positions of other terminal devices are displayed on the basis of the position information of the terminal devices detected using the GNSS. Therefore, as illustrated in FIG. 42B, even in the case where the object 14 such as a structure exists as a shield between the user A1, and the user B1 and the user C1, the position marker 1301a and the position marker 1301b that indicate the positions of the user B1 and the user C1, and the corresponding label 1302a and label 1302b are displayed on the screen 13a of the terminal device 10a1 mounted by the user A1. Therefore, the user A1 can grasp which direction and how far the user B1 and the user C1 exist as viewed from the user A1, the user B1 and the user C1 being hidden behind the structure and being unable to be visually recognized.

Further, the terminal device 10a1 displays, on the screen 13a, the marker 1301a and the marker 1301b respectively corresponding to the user B1 and the user C1 with the sizes according to the distances between the user A1 and the user B1, and between the user A1 and the user C1. Therefore, the user A1 can intuitively grasp which of the user B1 and the user C1 exists closer to the user A1.

Further, the terminal device 10a1 according to the fourth embodiment uses the display in a transmissive state, and superimposes the position marker 1301a and the position marker 1301b that indicate the other terminal devices 10b1 and 10c1 on the actual image displayed in a transmissive manner. Therefore, the user A1 who mounts the terminal device 10a1 can easily visually recognize the outside world including the object 14.

(Details of Display Processing According to Fourth Embodiment)

Figure 43:
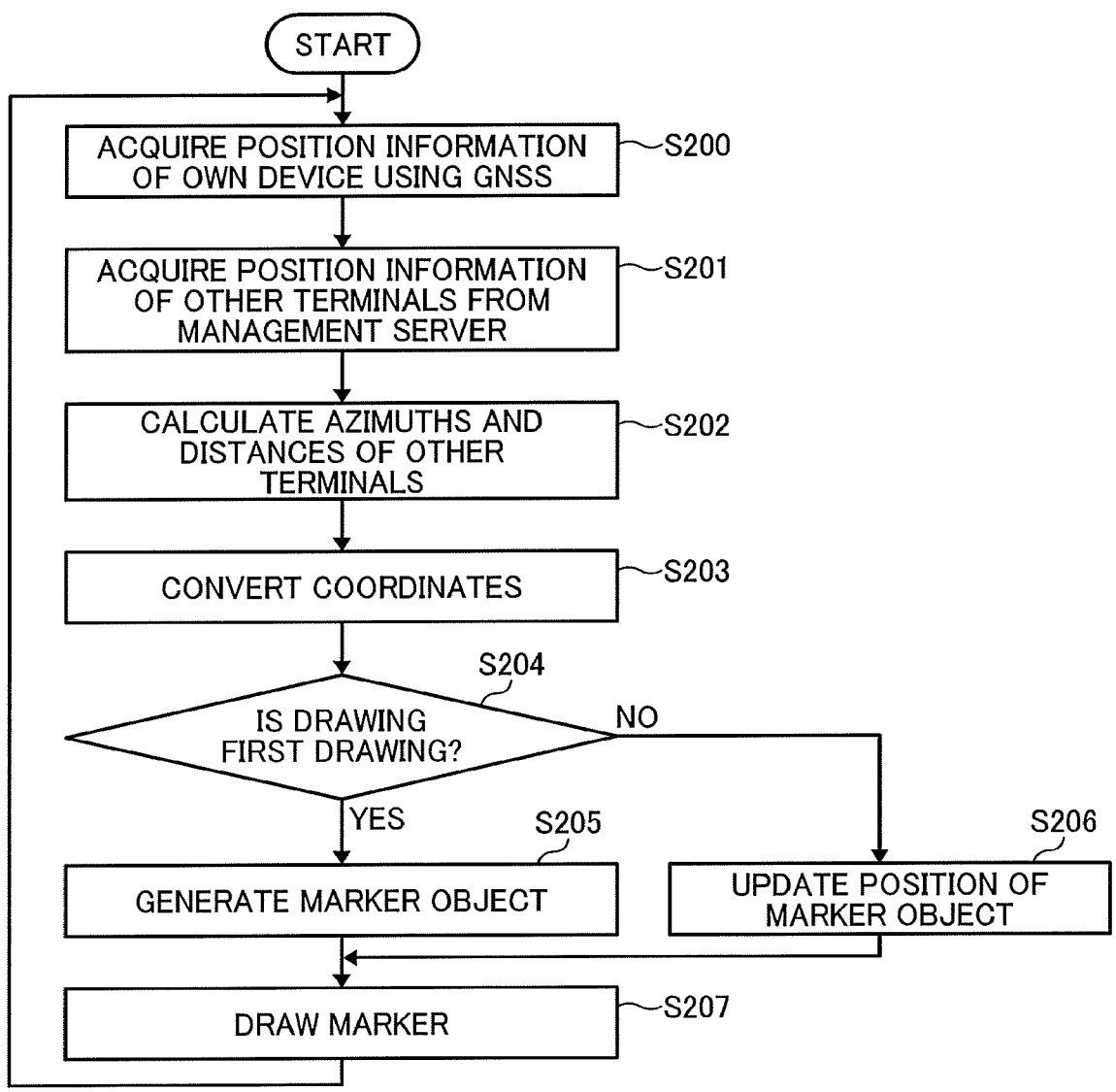
FIG. 43 is a flowchart of an example more specifically illustrating processing for displaying position markers by terminal devices according to the fourth embodiment.

Next, the display processing according to the fourth embodiment will be described in more detail. FIG. 43 is a flowchart of an example more specifically illustrating the position marker display processing by the terminal device 10a1, the terminal device 10b1, and the terminal device 10c1 according to the fourth embodiment, in step S90a, step S90b, and step S90c of the sequence diagram of FIG. 41 described above. Here, description will be given, using the terminal device 10a1 that represents the terminal device 10a1, the terminal device 10b1, and the terminal device 10c1. Note that the terminal device 10a1, the terminal device 10b1, and the terminal device 10c1 have already established the sessions with the management server 40C and have acquired the IDs from the management server 40C, by the processing of step S50 to step S52, step S60 to step S62, and step S70 to step S72 of FIG. 41.

In step S200, the terminal device 10a1 acquires, by the position information acquisition unit 202, the position information that indicates the position of the own device, using the GNSS (step S900 of FIG. 41). The position information is acquired in the latitude and the longitude. The terminal device 10a1 transmits the acquired position information and the ID of the own device to the management server 40C. In next step S201, the terminal device 10a1 acquires, by the receiver 200, the position information and the IDs of the other terminal devices (the terminal device 10b1 and the terminal device 10c1) from the management server 40C.

In next step S202, the terminal device 10a1 calculates, by the display information generator 204a, the azimuths and the distances of the other terminal devices 10b1 and 10c1 with respect to the own device, on the basis of the position information that indicates the position of the own device acquired in step S200, and the position information of the other terminal devices 10b1 and 10c1 acquired in step S201.

As an example, the azimuth and the distance of the terminal device (for example, the terminal device 10b1) as a target of which the position marker is to be displayed, of the other terminal devices 10b1 and 10c1, with respect to the own device, can be calculated by the following formula (1).

That is, a distance d between the own device, that is, the terminal device 10a1 and the terminal device 10b1 can be calculated by the following formula (1):

[Formula 1]

$$d = r\cos^{-1}(\sin y_1 \sin y_2 + \cos y_2 \cos \Delta x) \quad (1)$$

where the position of the own device is coordinates ($x_1$, $y_1$), and the position of the terminal device 10b1 is coordinates ($x_2$, $y_2$), and a constant r is an earth radius and r 6378.137 km in the formula (1).

Further, an azimuth θ of the terminal device as a target, as viewed from the terminal device 10a1, can be calculated by the following formula (2):

[Formula 2]

$$\theta = 90 - \tan^{-1} 2(\sin \Delta x, \cos y_1 \tan y_2 - \sin y_1 \cos \Delta x) \quad (2)$$

where $\Delta x = x_2 - x_1$ in the formula (2).

In next step S203, the terminal device 10a1 performs, by the display information generator 204a, coordinate conversion on the basis of the distance d and the azimuth θ calculated in step S202 to obtain three-dimensional coordinates (x, y, z) on a three-dimensional space, of the position marker that indicates the position of the terminal device as a target. Here, the position of the terminal device 10b1 in a y-axis direction is made the same height as the position of the own device, where an axis in the vertical direction is a y axis, and a y value is a fixed value ($c_{const}$). Three-dimensional coordinates of the position marker of the terminal device as a target, of when the position of the own device is coordinates (0, $c_{const}$, 0), can be calculated as target (x, y, z) by the following formula (3):

[Formula 3]

$$\text{target}(x, y, z) = (r\cos\theta, y, r\sin\theta) \quad (3)$$

In next step S204, the terminal device 10a1 determines, by the display information generator 204a, whether drawing of the position marker of the terminal device as a target is the first drawing. When the drawing is determined to be the first drawing ("Yes" in step S204), the display information generator 204a moves the processing onto step S205. In step S205, the display information generator 204a generates a marker object for displaying the position marker corresponding to the terminal device as a target, and provides target (x, y, z) obtained in step S203 to the generated marker object as coordinate information for drawing.

Meanwhile, when the display information generator 204a in the terminal device 10a1 determines that the drawing of the position marker of the terminal device as a target is not the first drawing, that is, the position marker of the terminal device as a target has already been displayed on the screen 13a of the terminal device 10a1, the display information generator 204a moves the processing onto step S206. In step S206, the display information generator 204a updates the coordinate information that indicates the position of the position marker of the terminal device as a target, which has already been displayed, to the values of the target (x, y, z) obtained in step S203.

When the processing of step S205 or step S206 is terminated, the processing is moved onto step S207. In step S207, the display information generator 204a draws the marker image by the marker object of the position marker that indicates the position of the terminal device as a target, on the position of the target (x, y, z) provided in step S205 or step S206. Accordingly, the position marker that indicates the position of the terminal device (the terminal device 10b1 in this example) as a target is displayed on the position corresponding to the azimuth where the terminal device exists, on the screen 13a of the terminal device 10a1, with the size according to the distance from the terminal device 10a1.

Further, in step S207, the display information generator 204a displays the label including the information regarding the terminal device as a target, in the azimuth corresponding to the marker object of the position marker of the terminal device as a target. On the label, for example, the ID of the terminal device as a target, and the distance d from the own device to the terminal device as a target can be displayed. Further, the management server 40C transmits, to the terminal device 10a1, the attribute information of the terminal device as a target in association with the ID of the terminal device as a target, so that the attribute information can be further displayed on the label.

When an image of the marker object of the position marker is drawn in step S207, the processing is returned to step S200, and the processing from step S200 described above is executed. Accordingly, the positions of the position marker and the label of the terminal device as a target, on the screen 13a, can be dynamically changed and drawn, even if the own device and the terminal device as a target are moved. The user A1 who mounts the terminal device 10a1 can confirm which direction and how far from the user A1 the user B1 and the user C1 exist, who mount the other terminal devices 10b1 and 10c1, in approximately real time.

(Display Control According to Movement of Head According to Fourth Embodiment)

Next, display control of the screen 13a according to movement of the head 80 of the user A1 who mounts the terminal device 10a1 according to the fourth embodiment will be described. Note that, hereinafter, the user A1 correctly mounts the spectacle unit 1C on the head 80, and the direction of the head 80 and the direction of the front 11B in the spectacle unit 1C are synonymous. Further, in FIG. 44A to FIG. 44C, to FIG. 46A to FIG. 46C below, a portion corresponding to FIG. 42A described above is denoted with the same reference sign, and detailed description is omitted. Further, the user A1, the user B1, and the user C1 are in the positional relationship illustrated in FIG. 42B.

The terminal device 10a1 generates, by the display information generator 204a, display information for displaying, on the screen 13a, the position marker 1301a and the position marker 1301b respectively corresponding to the user B1 and the user C1, and the label 1302a and the label 1302b corresponding to the position marker 1301a and the position marker 1301b, on the basis of an output of the head movement detector 207a according to a detection output of the nine-axis sensor 22. Further, the display information generator 204a generates display information for displaying, on the screen 13a, the azimuth display 1300 that indicates the azimuth that the head 80 faces, on the basis of an output of the head movement detector 207a according to a detection output of the nine-axis sensor 22.

Figure 44:
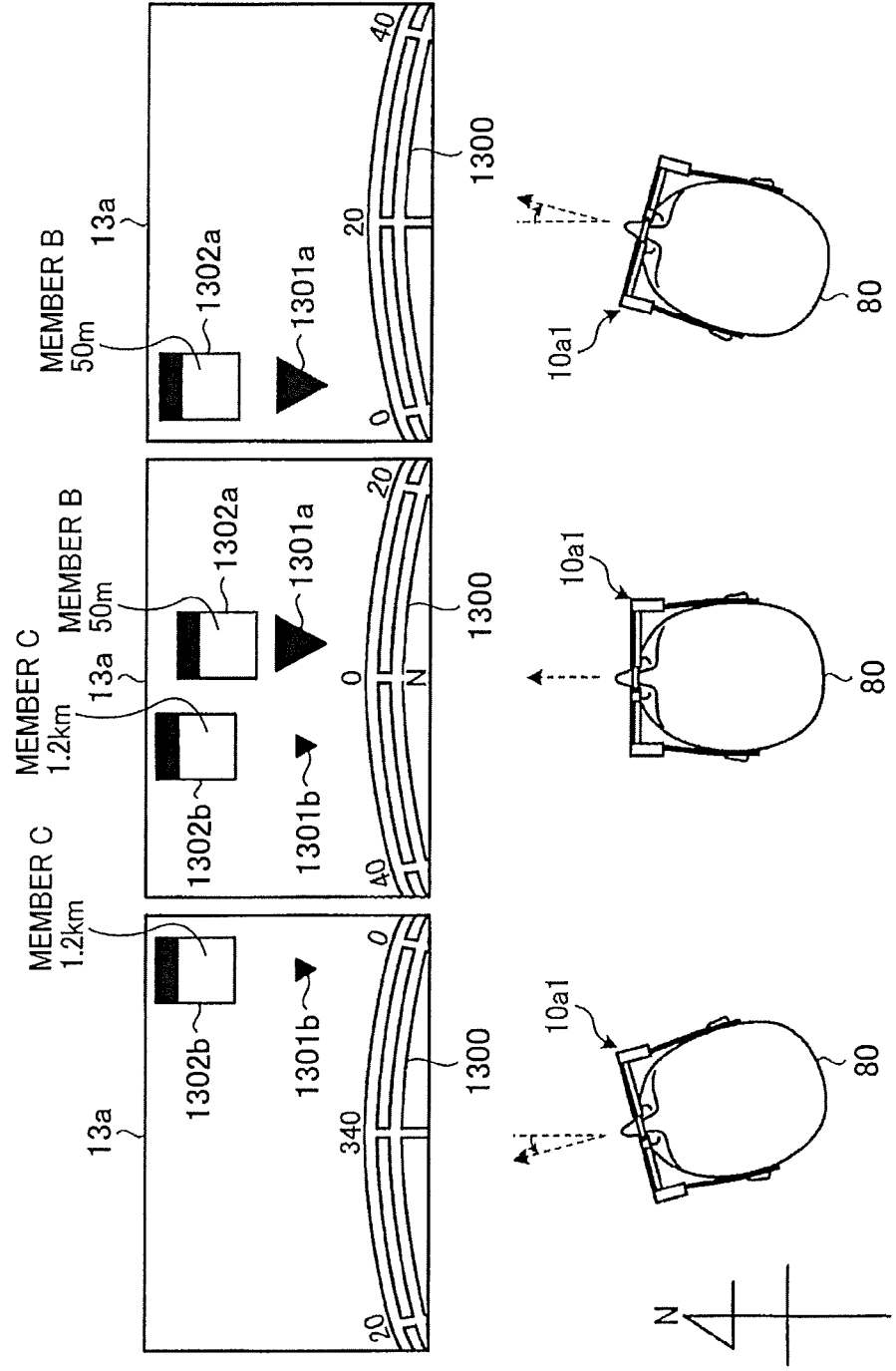
FIG. 44A to FIG. 44C are diagrams for describing display control according to movement around a vertical axis of a head, according to the fourth embodiment.

First, display control according to the movement of the head 80 around a vertical axis, according to the fourth embodiment, will be described in FIG. 44A to FIG. 44C. The movement of the head 80 around the vertical axis corresponds to an operation to turn the head 80 to the right and left. In the movement of the head 80 around the vertical axis, the pitch angle and the roll angle are unchanged, and only the yaw angle is changed, in the spectacle unit 1C. FIG. 44A to FIG. 44C illustrate a display example of the screen 13a of when the pitch angle and the roll angle are secured, and only the yaw angle is changed.

The terminal device 10a1 can estimate whether the head 80, that is, the front 11B of the spectacle unit 1C is moved in the right and left direction, on the basis of a detection output of the gyro sensor included in the nine-axis sensor 22. Further, the terminal device 10a1 can estimate the azimuth that the head 80 faces, on the basis of a detection output of the magnetic field sensor included in the nine-axis sensor 22. Therefore, the terminal device 10a1 can estimate the movement of the head 80 around the vertical axis on the basis of the detection outputs of the gyro sensor and the magnetic field sensor included in the nine-axis sensor 22.

FIG. 44B corresponds to the state of FIG. 42B described above. In this case, the head 80 (gaze direction) faces the north (N), and the yaw angle=0° in the detection output of the gyro sensor of the nine-axis sensor 22. Note that the azimuth display 1300 has the north (N) be the azimuth 0°, and an angle is increased in a clockwise direction.

FIG. 44C illustrates an example of the display of the screen 13a of when the head 80 is turned in an east direction around the vertical axis by an angle 20°, with respect to the state of FIG. 44B. For example, the user A1 turns the head 80 around the vertical axis, and see the right by the angle 20° from the state of FIG. 44B. The terminal device 10a1 estimates that the head 80 has been turned in the east direction around the vertical axis, on the basis of the detection outputs of the gyro sensor and the magnetic field sensor included in the nine-axis sensor 22, and updates the display of the screen 13a according to an estimation result.

In the example of FIG. 44C, the center of the azimuth display 1300 indicates the azimuth 20°. The position marker 1301a and the label 1302a corresponding to the user B1 who exists in an approximately north direction with respect to the user A1 are moved in a left direction on the screen 13a, corresponding to the position of the north (N) of the azimuth display 1300, and are displayed. Further, on the screen 13a, the position marker 1301b and the label 1302b are moved output the screen 13a and are not displayed. This means that the user C1 corresponding to the position marker 1301b and the label 1302b does not exist in the direction the user A1 faces.

FIG. 44A illustrates an example of display of the screen 13a of when the head 80 is turned in a west direction around the vertical axis by the angle 20°, with respect to the state of FIG. 44B. For example, the user A1 turns the head 80 around the vertical axis, and sees the left by the angle 20° from the state of FIG. 44B. The terminal device 10a1 estimates that the head 80 has been turned in the west direction around the vertical axis, on the basis of the detection outputs of the gyro sensor and the magnetic field sensor included in the nine-axis sensor 22, and updates the display of the screen 13a according to an estimation result.

In this case, similarly to the example of FIG. 44C, the center of the azimuth display 1300 indicates the azimuth 340° (−20°), and the position marker 1301b and the label 1302b corresponding to the user C1 who exists in the west direction with respect to the user A1 are moved in the right direction on the screen 13a, and are displayed. Further, on the screen 13a, the position marker 1301a and the label 1302a are moved outside the screen 13a and are not displayed. This means that the user B1 corresponding to the position marker 1301a and the label 1302a does not exist in the direction the user A1 faces.

As described above, the terminal device 10a1 according to the fourth embodiment controls the display positions on the screen 13a, of the position marker 1301a and the position marker 1301b, and the label 1302a and the label 1302b corresponding to the other users B1 and C1 to be matched with the directions around the vertical axis, of the user B1 and the user C1, as viewed from the user A1, on the basis of the detection results of the movement of the head 80 around the vertical axis by the head movement detector 207*a*. Therefore, even if the user A1 turns the head 80 to the right and left, the positional relationship between the directions of the position marker 1301*a* and the position marker 1301*b*, and the like corresponding to the other users B1 and C1, and the actual image transmitted through the front 11B and displayed becomes secured, and the user A1 can intuitively grasp the positions of the user B1 and the user C1.

Figure 45:
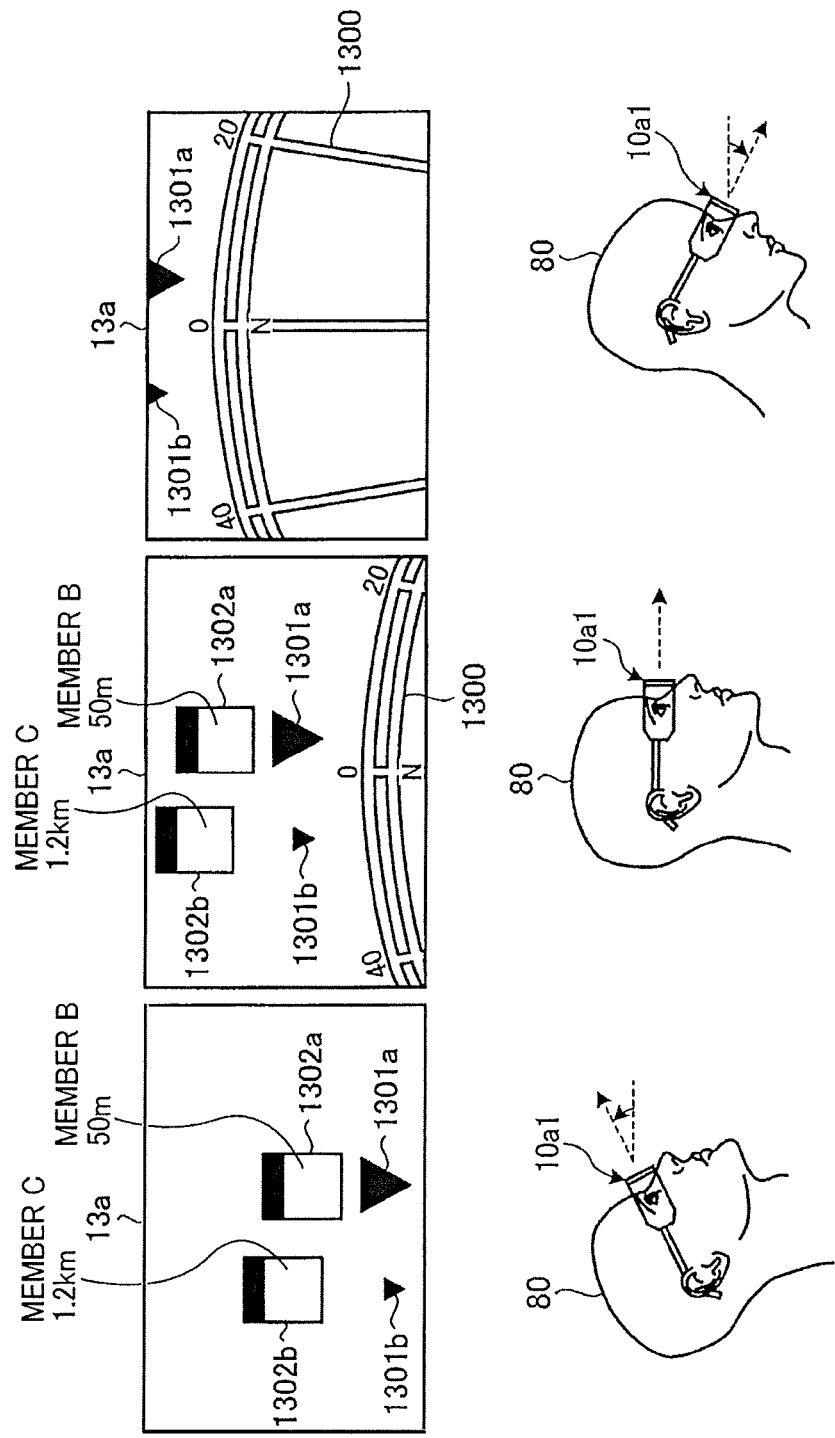
FIG. 45A to FIG. 45C are diagrams for describing display control according to movement around a horizontal axis of the head, according to the fourth embodiment.

Next, display control according to the movement of the head 80 around a horizontal axis, according to the fourth embodiment, will be described in FIG. 45A to FIG. 45(*c*). The movement of the head 80 around the horizontal axis corresponds to an operation to turn the head 80 up and down. In the movement of the head 80 around the horizontal axis, the yaw angle and the roll angle are unchanged, and only the pitch angle is changed, in the spectacle unit 1C. FIG. 45A to FIG. 45(*c*) illustrate a display example of the screen 13*a* of when the yaw angle and the roll angle are secured, and the pitch angle is changed.

The terminal device 10*a*1 can estimate whether the head 80 is moved in an up and down direction on the basis of a detection output of the gyro sensor included in the nine-axis sensor 22. Further, the terminal device 10*a*1 can estimate the direction the head 80 faces, on the basis of the detection result of the magnetic field sensor included in the nine-axis sensor 22. Therefore, the terminal device 10*a*1 can estimate the movement of the head 80 around the horizontal axis, on the basis of the detection outputs of the gyro sensor and the magnetic field sensor included in the nine-axis sensor 22.

FIG. 45B corresponds to the state of FIG. 42B described above. In this case, the head 80 (gaze direction) faces the horizontal direction, and the pitch angle=0° in the detection output of the gyro sensor of the nine-axis sensor 22.

FIG. 45(*c*) illustrates an example of display of the screen 13*a* of when the head 80 is turned downward around the horizontal axis with respect to the state of FIG. 45B. The terminal device 10*a*1 estimates that the head 80 has been turned downward around the horizontal axis, on the basis of the detection outputs of the gyro sensor and the magnetic field sensor included in the nine-axis sensor 22, and updates the display of the screen 13*a* according to an estimation result.

In the example of FIG. 45(*c*), the label 1302*a* and the label 1302*b* corresponding to the user B1 and the user C1, which are displayed in an upper side on the screen 13*a* of FIG. 45B, are moved outside the screen 13*a* and are not displayed. Further, the position marker 1301*a* and the position marker 1301*b* corresponding to the user B1 and the user C1 are moved to the upper side on the screen 13*a*, and are displayed on looking-up positions. Further, a display area of the azimuth display 1300 becomes larger than the display area of the example of FIG. 45B.

FIG. 45A illustrates a display example of the screen 13*a* of when the head 80 is turned upward around the horizontal axis with respect to the state of FIG. 45B. In this case, the position marker 1301*a* and the position marker 1301*b*, and the label 1302*a* and the label 1302*b* corresponding to the user B1 and the user C1 are moved downward on the screen 13*a* and are displayed. Further, the azimuth display 1300 is not displayed.

As described above, the terminal device 10*a*1 according to the fourth embodiment controls the display positions on the screen 13*a*, of the position marker 1301*a* and the position marker 1301*b*, and the label 1302*a* and the label 1302*b* corresponding to the other users B1 and C1 to be matched with the directions around the horizontal axis, of the user B1 and the user C1, as viewed from the user A1, on the basis of the detection results of the movement of the head 80 around the horizontal axis by the head movement detector 207*a*. Therefore, even if the user A1 turns the head 80 up and down, the positional relationship between the directions of the position marker 1301*a* and the position marker 1301*b*, and the like corresponding to the other users B1 and C1, and the actual image transmitted through the front 11B and displayed becomes secured, and the user A1 can intuitively grasp the positions of the user B1 and the user C1.

Figure 46:
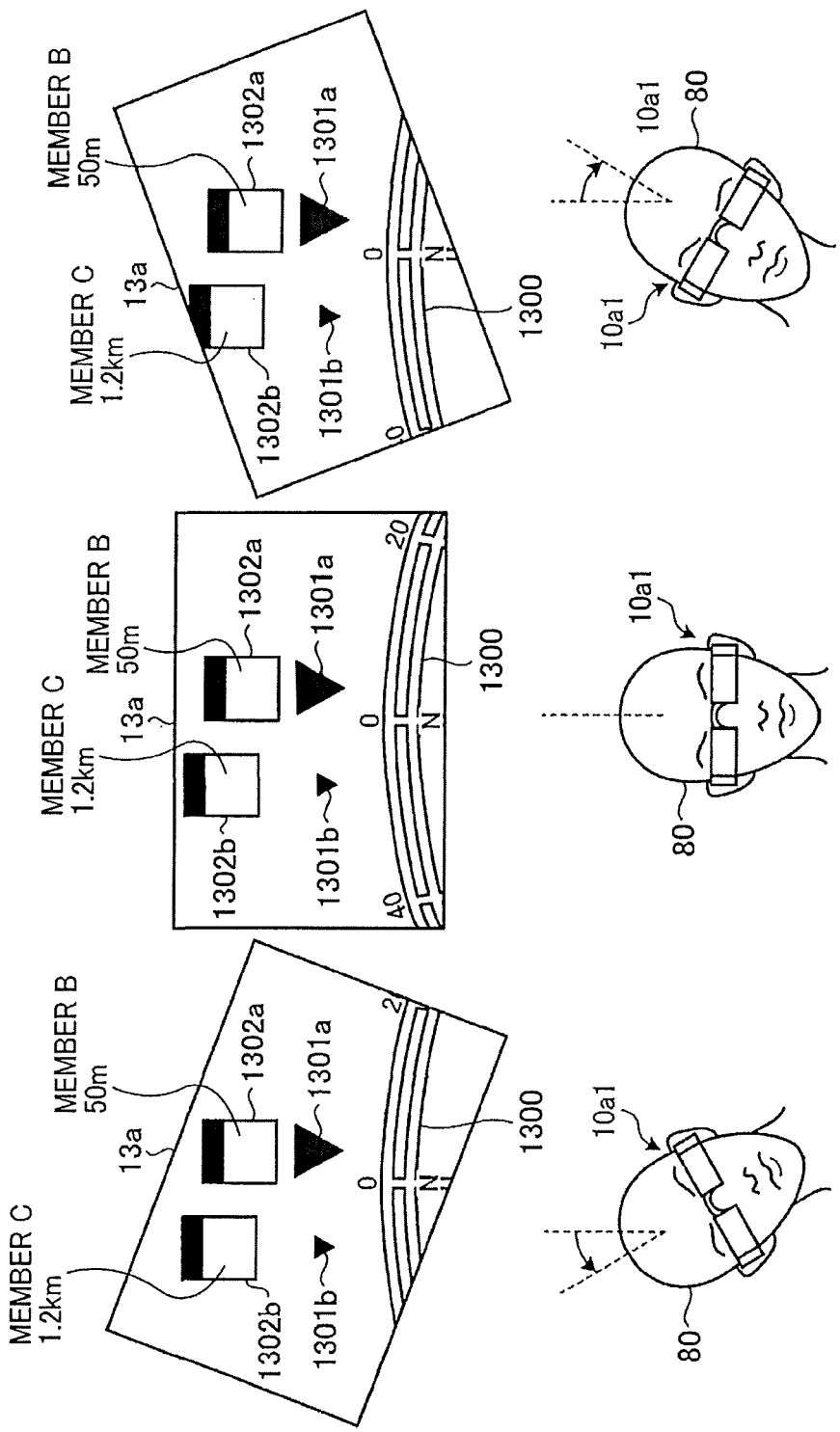
FIG. 46A to FIG. 46C are diagrams for describing display control according to movement around an antero-posterior axis of the head, according to the fourth embodiment.

Next, display control according to the movement of the head 80 around an antero-posterior axis, according to the fourth embodiment, will be described in FIG. 46A to FIG. 46C. The movement of the head 80 around the antero-posterior axis corresponds to an operation to incline the head 80 while facing frontward, for example. In the movement of the head 80 around the antero-posterior axis, the yaw angle and the pitch angle are unchanged, and only the roll angle is changed, in the spectacle unit 1C. FIG. 46A to FIG. 46C illustrate a display example of the screen 13*a* of when the yaw angle and the pitch angle are secured, and the roll angle is changed.

The terminal device 10*a*1 can estimate an inclination of the head 80, on the basis of a detection output of the gyro sensor included in the nine-axis sensor 22. Further, the terminal device 10*a*1 can estimate the direction the head 80 faces, on the basis of a detection result of the magnetic field sensor included in the nine-axis sensor 22. Therefore, the terminal device 10*a*1 can estimate the movement of the head 80 around the antero-posterior axis, on the basis of the detection outputs of the gyro sensor and the magnetic field sensor included in the nine-axis sensor 22.

FIG. 46B corresponds to the state of FIG. 42B described above. In this case, the head 80 stands erect, and the roll angle=0° in the detection output of the gyro sensor of the nine-axis sensor 22.

FIG. 46C illustrates an example of display of the screen 13*a* of when the head 80 is inclined in the left direction with respect to the state of FIG. 46B. The terminal device 10*a*1 estimates that the head 80 is turned in the left direction around the antero-posterior axis, on the basis of the detection outputs of the gyro sensor and the magnetic field sensor included in the nine-axis sensor 22, and updates the display of the screen 13*a* according to an estimation result.

In the example of FIG. 46C, the position marker 1301*a* and the label 1302*a* corresponding to the user B1, and the position marker 1301*b* and the label 1302*b* corresponding to the user C1 are rotated in a clockwise direction while maintaining the mutual positional relationship on the screen 13*a*. With this control, the position marker 1301*a* and the label 1302*a*, and the position marker 1301*b* and the label 1302*b* on the screen 13*a* are horizontally held with respect to the actual image. Further, in the example of FIG. 46C, a right end side of the azimuth display 1300 deviates outside the screen 13*a*, and are not displayed.

FIG. 46A illustrates an example of the screen 13*a* on which the head 80 is inclined in a right direction with respect to the state of FIG. 46B. In this case, the position marker 1301*a* and the label 1302*a*, and the position marker 1301*b* and the label 1302*b* are rotated in a counterclockwise direction while maintaining the mutual positional relationship on the screen 13*a*. With this control, the position marker 1301*a* and the label 1302*a*, and the position marker 1301*b* and the label 1302*b* on the screen 13*a* are horizontally held with respect to the actual image. Further, in the example of FIG. 46A, a left end side of the azimuth display 1300 deviates outside the screen 13a, and are not displayed.

An eyeball of a human has a mechanism to move to compensate the movement of the head 80 so that the brain does not perceive the horizontal direction or the inclination of a visual object (actual image). The control described in FIG. 46A to FIG. 46C uses this characteristic.

As described above, the terminal device 10a1 according to the fourth embodiment controls the display positions on the screen 13a, of the position marker 1301a and the position marker 1301b, and the label 1302a and the label 1302b corresponding to the other users B1 and C1 to be horizontally held with respect to the actual image while maintaining the mutual positional relationship, on the basis of the detection results of the movement of the head 80 around the antero-posterior axis by the head movement detector 207a. Therefore, even if the user A1 inclines the head 80, the positional relationship between the directions of the position marker 1301a and the position marker 1301b, and the like corresponding to the other users B1 and C1, and the actual image transmitted through the front 11B and displayed becomes secured, and the user A1 can intuitively grasp the positions of the user B1 and the user C1.

The display control described in FIG. 44A to FIG. 44C, to FIG. 46A to FIG. 46C becomes possible by setting an area to which the image information is output from a video memory included in the display information generator 204a on the basis of the detection result by the head movement detector 207a, of the movement of the head 80, for example.

As an example, the video memory included in the display information generator 204a includes a capacity that enables drawing of an image in a larger angle of view than the angle of view of the screen 13a. The display information generator 204a generates the position markers corresponding to all the terminal devices according to the position information of all the terminal devices received from the management server 40C, writes the image information for displaying all the generated position markers to the video memory, and draws the image information. The display information generator 204a cuts out and outputs the image information corresponding to the display area of the screen 13a from the image information drawn in the video memory, on the basis of the detection result by the head movement detector 207a, of the movement of the head 80.

Next, display control of the label including the information regarding other users, according to the fourth embodiment, will be described in FIG. 47. On the screen 13a of the terminal device 10a1 exemplarily illustrated in FIG. 47, the origin is the upper left corner, the lateral direction is an x axis in which a coordinate value is increased in the right direction, and the vertical direction is a y axis in which a coordinate value is increased in the down direction. Further, here, the user A1, the user B1, the user C1, and the user E respectively mount the terminal devices according to the fourth embodiment.

In a case where a difference in the azimuth between the user B1 and the user C1 is small, as viewed from the user A1, the display positions of the position marker 1301a and the position marker 1301b respectively corresponding to the user B1 and the user C1 approach each other on the screen 13a of the terminal device 10a1 mounted by the user A1. Further, the label 1302a and the label 1302b corresponding to the position marker 1301a and the position marker 1301b may be displayed in a partially superimposed manner with the approach of the display positions of the position marker 1301a and the position marker 1301b. In this case, the content of the label displayed behind, of the label 1302a and the label 1302b, is hidden behind the label displayed in front of the hidden label, and recognition of the content may become difficult.

Therefore, in the fourth embodiment, backgrounds of the label 1302a and the label 1302b are made semitransparent (for example, the transmittance is 40% to 60%). In addition, in the fourth embodiment, y coordinates of the label 1302a and the label 1302b on the screen 13a are changed according to the distances between the user A1, and the user B1 and the user C1 corresponding to the label 1302a and the label 1302b. Accordingly, confirmation of the content of the labels corresponding to a plurality of users having a small difference in the azimuth, as viewed from a certain user, can be made easy.

Further, consider the user E who mounts the terminal device according to the fourth embodiment, has a close azimuth to the user B1 and is more distant from the user A1. For example, assume that the distance between the user A1 and the user B1 is 50 m, the distance between the user A1 and the user C1 is 250 m, and the distance between the user A1 and the user E is 1.2 km. In this case, as exemplarily illustrated in FIG. 47, the position marker corresponding to the user E is behind the position marker 1301a of the user B1 and is not displayed on the screen 13a. Meanwhile, the label 1302c corresponding to the user E is displayed above the label 1302a with the semitransparent background corresponding to the user B1 on the screen 13a. Therefore, the user A1 can intuitively grasp that the user E exists in a close azimuth to the user B1 and more distant than the user B1.

Here, the backgrounds of the label 1302a to the label 1302c are made semitransparent. However, the embodiment is not limited to this example. For example, the position marker 1301a and the position marker 1301b may be made semitransparent. In this case, the user A1 can confirm the position marker corresponding to the user E, which is transmitted through the position marker 1301a.

Figure 47:
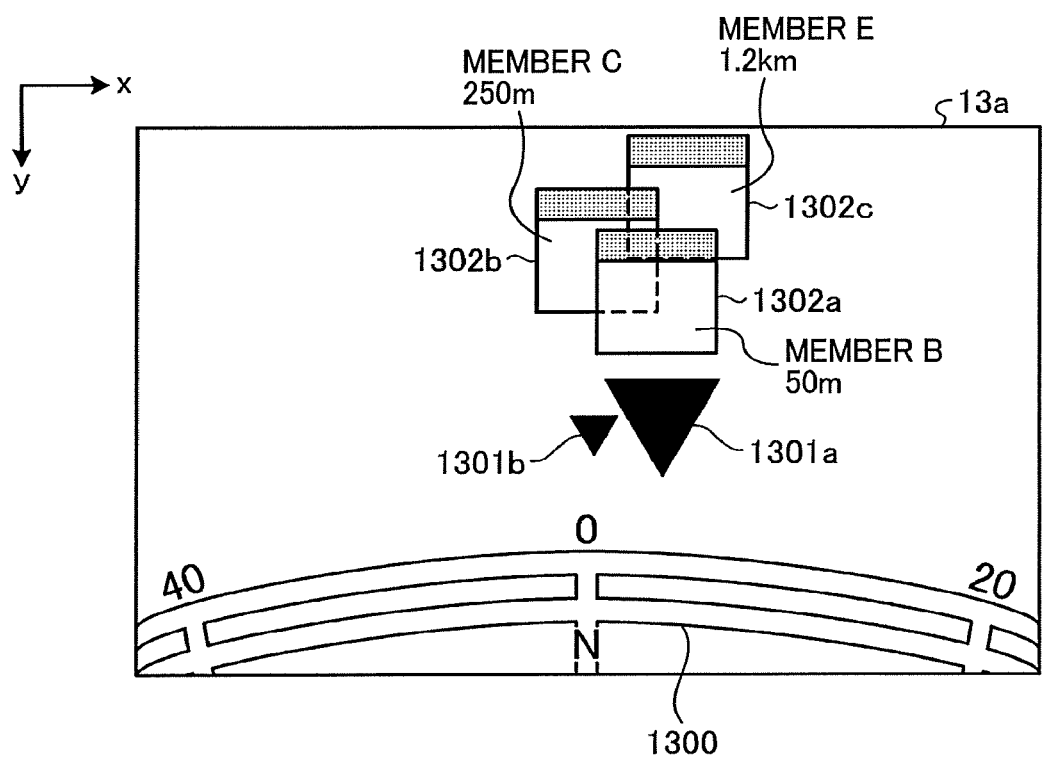
FIG. 47 is a diagram for describing display control of a label according to the fourth embodiment.
Figure 48:
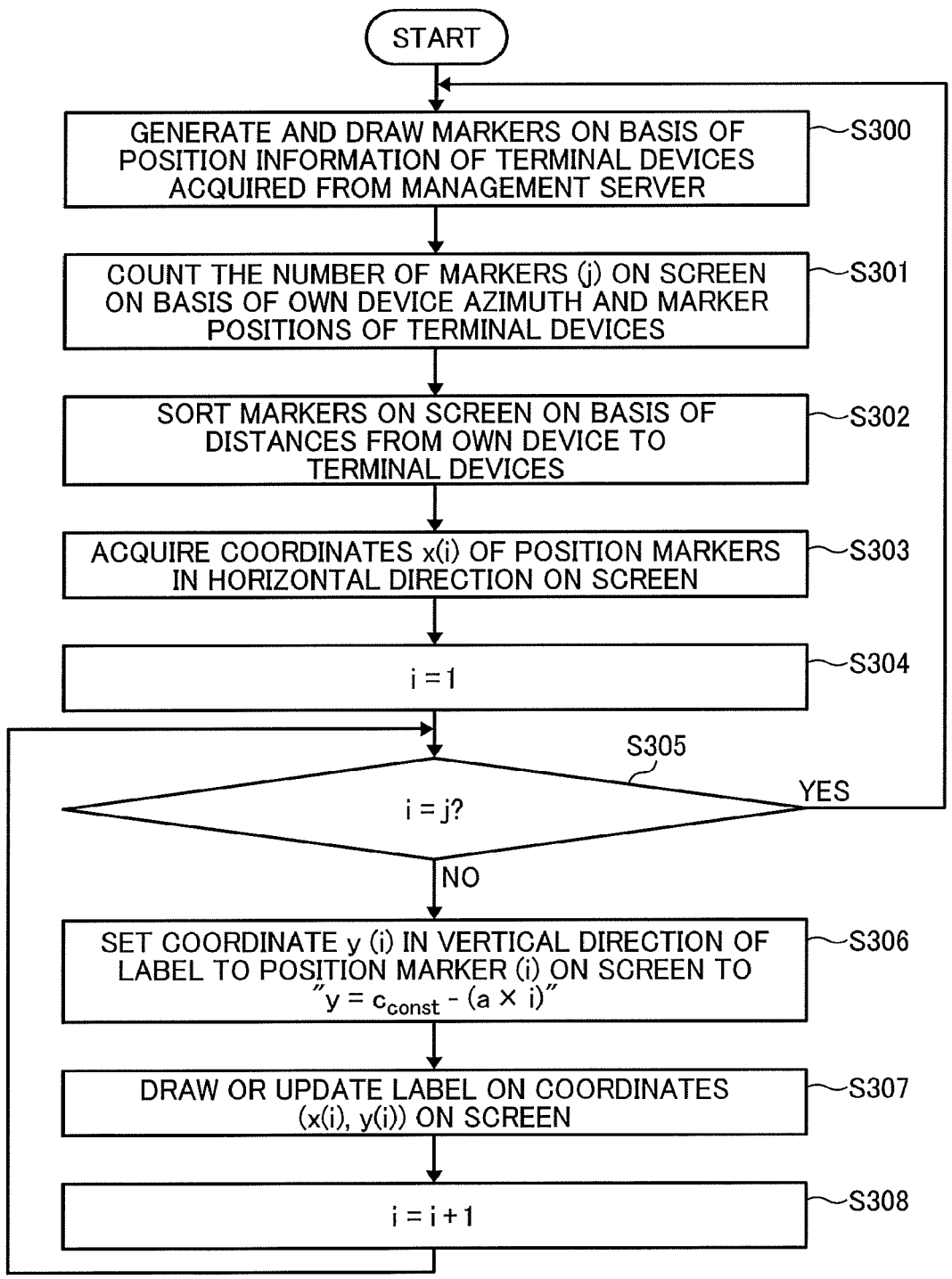
FIG. 48 is a flowchart of an example illustrating processing for displaying the label according to the fourth embodiment.

FIG. 48 is a flowchart of an example illustrating label display processing according to the fourth embodiment. Here, description will be given with the state of FIG. 47. That is, the user A1, the user B1, the user C1, and the use E who respectively mount the terminal devices according to the fourth embodiment are in the positional relationship described in FIG. 47. Hereinafter, the label display processing will be described using the terminal device 10a1 mounted by the user A1 as an example. Hereinafter, the terminal device mounted by the user E is called terminal device E and the position marker corresponding to the terminal device E is called position marker E, for convenience.

Prior to the processing by the flowchart of FIG. 48, the processing using step S50 to step S72 of FIG. 41 is executed, and the terminal device 10a1, the terminal device 10b1, the terminal device 10c1, and the terminal device E of the user A1, the user B1, the user C1, and the user E perform a first access to the management server 40C and are provided with the IDs. Further, the terminal device 10a1, the terminal device 10b1, the terminal device 10c1, and the terminal device E transmit the attribute information of the user A1, the user B1, the user C1, and the user E to the management server 40C in the first accesses to the management server 40C.

In FIG. 48, in step S300, the display information generator 204a in the terminal device 10a1 calculates the distances between the user A1, and the user B1, the user C1, and the user E, on the basis of the position information of the terminal device 10a1, the terminal device 10b1, the terminal device 10c1, and the terminal device E of the other users B1, C1, and E acquired from the management server 40C, to generate the position marker 1301a, the position marker 1301b, and the position marker E that respectively indicate the positions of the terminal device 10b1, the terminal device 10c1, and the terminal device E. The display information generator 204a writes the generated position marker 1301a, position marker 1301b, and position marker E to the video memory included in the display information generator 204a, and draws the position marker 1301a, the position marker 1301b, and the position marker E.

In next step S301, the display information generator 204a acquires the direction the own device (terminal device 10a1) faces from the head movement detector 207a. In this case, the directions the own device faces includes the direction around the vertical axis, the direction around the horizontal axis, and the direction around the antero-posterior axis. The terminal device 10a1 counts, by the display information generator 204a, the number of position markers (j) to be displayed on the screen 13a, on the basis of the direction of the own device, and the position information of the terminal device 10b1, the terminal device 10c1, and the terminal device E acquired from the management server 40C.

That is, in step S301, the terminal device 10a1 does not count the position marker positioned outside the screen 13a, of the position marker 1301a, the position marker 1301b, and the position marker E, on the basis of the direction of the own device, and the positions of the position marker 1301a, the position marker 1301b, and the position marker E. In the example of FIG. 47, the position marker 1301a and the position marker 1301b are displayed on the screen 13a, and the position marker E exists at the position hidden behind the position marker 1301a. Therefore, the number of position markers (j)=3. At this time, the display information generator 204a executes display of the position marker 1301a and the position marker 1301b on the screen 13a.

In next step S302, the display information generator 204a sorts the information that indicates the position marker 1301a, the position marker 1301b, and the position marker E included on the screen 13a, on the basis of the distances between the own device, and the terminal device 10b1, the terminal device 10c1, and the terminal device E. Here, the sorting is performed in descending order. Variables (i), which are increased by increments of 1 from 1, are associated with the position markers, as information that indicates the position markers, in the order from the position marker corresponding to the terminal device with the distance closest to the own device, of the terminal device 10b1, the terminal device 10c1, and the terminal device E.

Here, referring to FIG. 47, the variable (i)=1 is associated with the position marker 1301a that represents the terminal device 10b1 closest to the terminal device 10a1. Hereafter, the variable (i)=2 is associated with the position marker 1301b, and the variable (i)=3 is associated with the position marker E corresponding to the terminal device E most distant from the terminal device 10a1. Hereinafter, description will be given, where the position marker 1301a is referred to as position marker (1), the position marker 1301b is referred to as position marker (2), the position marker E is referred to as position marker (3), and the position marker (1) to the position marker (3) are collectively referred to as position marker (i), unless otherwise particularly stated.

In next step S303, the display information generator 204a acquires coordinates x(i) in the horizontal direction (x-axis direction) on the screen 13a, of the position markers (i) included on the screen 13a, respectively.

In next step S304, the display information generator 204a initializes the variable (i) to 1. In next step S305, the display information generator 204a determines whether the variable (i) and the number of position markers (j) are equal. When the display information generator 204a determines that the variable (i) and the number of position markers (j) are equal ("Yes" in step S305), the display information generator 204a returns the processing to step S300.

When the display information generator 204a determines in step S305 that the variable (i) and the number of position markers (j) are different ("No" in step S305), the display information generator 204a moves the processing onto step S306. In step S306, the display information generator 204a sets a coordinate y(i) in the vertical direction of the label to the position marker (i) included on the screen 13a, to $y=c_{const}-(a \times i)$. Here, the constant a is a value of 1 or more determined in advance. The constant a can be determined according to the number of pixels (the number of lines) in the vertical direction on the screen 13a, for example, and the constant a=20, for example. Further, the value $c_{const}$ is a y coordinate of the position marker.

In next step S307, the display information generator 204a draws the label (i) corresponding to the position marker (i) on coordinates (x(i), y(i)) on the screen 13a. At this time, in a case where the label (i) corresponding to the position marker (i) has already been drawn on the screen 13a, the display information generator 204a updates the display of the label (i) according to the coordinate x(i) of the position marker (i).

In the example of FIG. 47, the label (i), that is, the label (1) to the label (3) respectively correspond to the label 1302a, the label 1302b, and the label 1302c.

In next step S308, the display information generator 204a adds 1 to the variable (i), and returns the processing to step S305.

Description will be more specifically given with reference to FIG. 47. As an example, the resolution of the screen 13a is 1280 pixels×720 lines. The x coordinate of the position marker 1301a of the user B1 is x=400 (pixels), the x coordinate of the position marker 1301b of the user C1 is x=360, and the x coordinate of the position marker E corresponding to the user E, which is behind the position marker 1301a of the user B1, is x=410.

In step S302, the information of the position marker 1301a, the position marker 1301b, and the position marker E on the screen 13a is sorted in descending order, using the distances between the terminal device 10a1, and the terminal device 10b1, the terminal device 10c1, and the terminal device E. In this example, the position marker 1301a, the position marker 1301b, and the position marker E are sorted in the order of the position marker 1301b and the position marker 1301a with the position marker E in the lead. The variables (i), which are increased by increments of 1 from 1, are provided to the position marker E, the position marker 1301b, and the position marker 1301a, in descending sorting order, to obtain the position marker (1), the position marker (2), and the position marker (3).

The variable (i) as a loop variable is initialized to 1 in step S304, and loop processing of step S305 to step S308, where the variable (i) is increased by increments of 1 in each time, is performed, so that the labels (i) corresponding to the position markers (i) are drawn on the coordinates (x(i), y(i)). More specifically, referring to FIG. 47, the label 1302c corresponding to the position marker E is drawn on the coordinates (410, 20) on the screen 13a when the variable (i)=1. The label 1302b corresponding to the position marker 1301b is drawn on the coordinates (360, 40) on the screen 13a when the variable (i)=2. Further, the label 1302a corresponding to the position marker 1301*a* is drawn on the coordinates (400, 60) on the screen 13*a* when the variable (i)=3.

By such display control, the label for the position marker that indicates the position of certain another device in a distance close to the own device is displayed in a lower portion on the screen 13*a*, and is displayed in front in the overlapping of the labels. As a result, the user A1 of the own device (terminal device 10*a*1) can intuitively confirm the label corresponding to the terminal device at a position close to the own device, of a plurality of other terminal devices.

Next, display control of the screen 13*a* in the terminal device 10*a*1, with an action such as movement of the user A1 who mounts the terminal device 10*a*1 according to the fourth embodiment, will be described. A human typically takes an action such as walk while always moving the head or the eyeballs to visually search for ambient information. Therefore, even if the screen 13*a* of the terminal device 10*a*1 is made transmissive, and the information such as the position marker is superimposed on the actual image on the screen 13*a*, so that the visibility to the outside world is secured, the human is distracted from attention to the environment, as compared with a case where no information to be superimposed on the screen 13*a* is displayed.

In consideration of the above point, it is favorable if the terminal device 10*a*1 detects whether the user A1 who mounts the terminal device 10*a*1 is standing still or walking, and switches the information display on the screen 13*a* according to a detected state.

Figure 49:
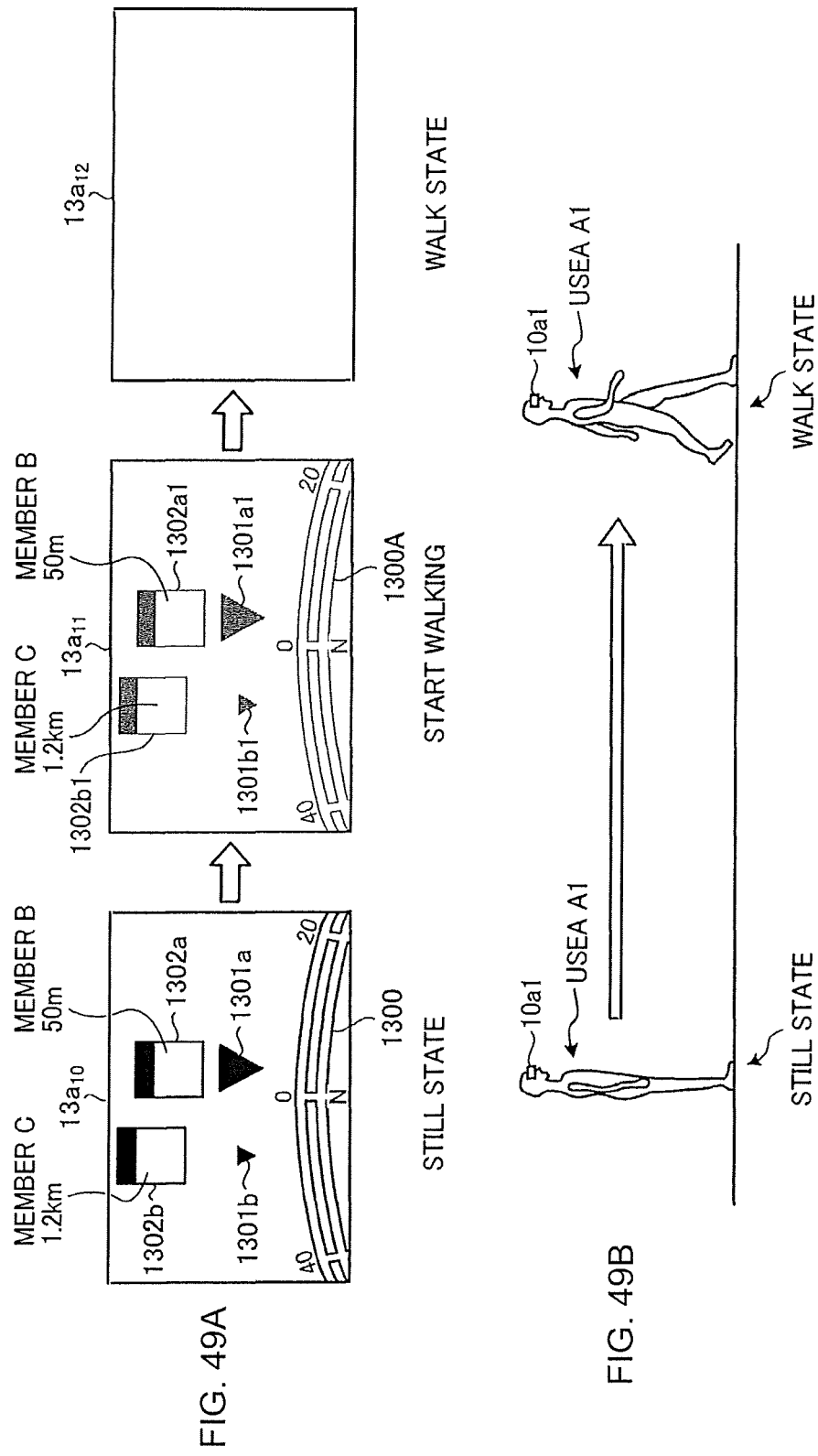
FIG. 49A and FIG. 49B are diagrams for describing switching of an information display on a screen according to a state of a user who mounts the terminal device applicable to the fourth embodiment.

Switching of the information display on the screen 13*a* according to a state of the user A1 who mounts the terminal device 10*a*1 applicable to the fourth embodiment will be described in FIG. 49A and FIG. 49B. FIG. 49B schematically illustrates a transition of the state of the user A1 from a still state (left side) to a walk state (right side). Further, FIG. 49A illustrates an example of screens 13*a*$_{10}$, 13*a*$_{11}$, and 13*a*$_{12}$ of the terminal device 10*a*1 in the still state, during the transition from the still state to the walk state, and in the walk state of the user A1.

For example, when the user A1 is in the still state, the user A1 can pay attention to the ambient information, as compared with the case of the walk state, and the user A1 may need the ambient information. Therefore, as exemplarily illustrated on the screen 13*a*$_{10}$, the position marker 1301*a* and the position marker 1301*b*, the label 1302*a* and the label 1302*b*, and the azimuth display 1300 are displayed in a normal manner.

When the user A1 starts to walk, the user A1 determines which direction to proceed, and needs to pay attention to the ambient information. Therefore, when the transition of the state of the user A1 from the still state to the walk state is detected, the display of the position marker 1301*a* and the position marker 1301*b*, the label 1302*a* and the label 1302*b*, and the azimuth display 1300, which are displayed in the still state, are gradually made transmissive. The screen 13*a*$_{11}$ illustrates an example of the position marker 1301*a*1 and the position marker 1301*b*1, the label 1302*a*1 and the label 1302*b*1, and the azimuth display 1300A, which are made semitransparent from the display of the screen 13*a*$_{10}$.

When the state of the user A1 is transitioned to the walk state, the user A1 needs to further pay attention to the ambient information. Therefore, as exemplarily illustrated in screen 13*a*$_{12}$, display of the position marker 1301*a* and the position marker 1301*b*, the label 1302*a* and the label 1302*b*, and the azimuth display 1300 is made totally transparent and is not displayed. Accordingly, the visibility of the user A1 to the outside world is increased, and the user A1 can safely walk.

When the state of the user A1 becomes in the still state again, the display of the screen 13*a* is returned to the state of the screen 13*a*$_{10}$, and the position marker 1301*a* and the position marker 1301*b*, the label 1302*a* and the label 1302*b*, and the azimuth display 1300 are displayed again. Accordingly, the user A1 can again confirm what exists in which direction. It is favorable to set availability of such control by the user A1.

Walking state detection by the terminal device 10*a*1 according to the fourth embodiment will be described in FIG. 50. The terminal device 10*a*1 detects, by the head movement detector 207*a*, the still state and the walk state of the user A1 who mounts the terminal device 10*a*1, using outputs of an acceleration sensor included in the nine-axis sensor 22.

Figure 50:
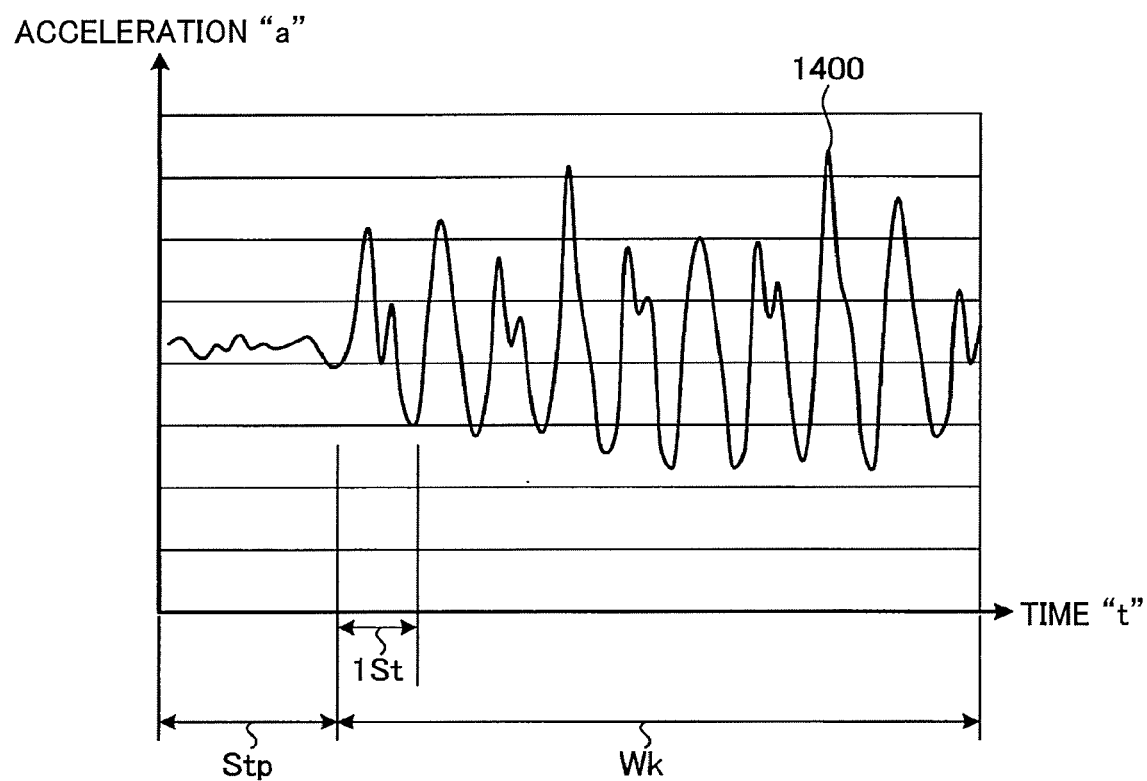
FIG. 50 is a diagram for describing detection of a walking state by the terminal device according to the fourth embodiment.

In FIG. 50, the vertical axis represents acceleration a in the vertical direction and the horizontal axis represents time t. A characteristic line 1400 plots a value of acceleration (for example, the y-axis direction) in the vertical direction, of triaxial acceleration that can be acquired from the outputs of the nine-axis sensor 22, to the time t. Change of the acceleration a in the vertical direction to the time t in the still state Stp and in the walk state Wk of the user A1 is much large in the walk state Wk than in the still state Stp. Further, increase and decrease change of the acceleration a in the walk state Wk is periodically repeated to the time t. At this time, one step of walk corresponds to one cycle of the change of the acceleration a.

For example, the terminal device 10*a*1 acquires, by the head movement detector 207*a*, the acceleration a in the vertical direction in chronological order on a steady basis, on the basis of the outputs of the nine-axis sensor 22. The terminal device 10*a*1 divides the acquired acceleration a by a predetermined time Δt, and can estimate whether the current state is either the walk state or the still state by a method for calculating an average value of the acceleration a within the division time Δt. The terminal device 10*a*1 can execute the display control of the screen 13*a*$_{10}$ to the screen 13*a*$_{12}$ described in FIG. 49A and FIG. 49B, on the basis of an estimation result of the state.

(Display Example of Commander Terminal According to Fourth Embodiment)

Next, a display example of the screen 75 in the commander terminal 30C according to the fourth embodiment will be described. First, information transmitted and received between the terminal device 10*a*1, the terminal device 10*b*1, and the terminal device 10*c*1, and the management server 40C will be described using Table 1 and Table 2.

Table 1 illustrates examples of information transmitted from the terminal device 10*a*1 to the management server 40C. As illustrated in Table 1, the information transmitted from the terminal device 10*a*1 to the management server 40C includes information of items of "ID", "latitude", and "longitude".

TABLE 1

| Item | Value |
|------|-------|
| ID | U001 |
| Latitude | 35.537433 |
| Longitude | 139.593969 |

The item "ID" is the ID (=U001) that identifies the terminal device 10a1, and is provided from the management server 40C in the first access (step S50 to step S52 of FIG. 41) to the management server 40C, for example. Further, the information of the item "latitude" and the item "longitude" is the position information that indicates the position of the terminal device 10a1, and is acquired by the position information acquisition unit 202, using the GNSS, in step S900 of FIG. 41.

The information in Table 1 is transmitted from the terminal device 10a1 to the management server 40C in step S901 of FIG. 41. The information transmitted from the terminal device 10b1 and the terminal device 10c1 to the management server 40C in step S911 and step S921 in FIG. 41 also includes similar items to Table 1. Therefore, description here is omitted. The management server 40C manages the position information of the terminal device 10a1, the terminal device 10b1, and the terminal device 10c1, on the basis of the information of Table 1 transmitted from the terminal device 10a1, the terminal device 10b1, and the terminal device 10c1 with which the sessions are established.

Table 2 illustrates examples of information transmitted from the management server 40C to the terminal device 10a1. As illustrated in Table 2, the information transmitted from the management server 40C to the terminal device 10a1 includes information of items "ID", "name", "latitude", and "longitude".

TABLE 2

| ID | Name | Latitude | Longitude |
|---|---|---|---|
| U002 | Member B | 35.538214 | 139.592558 |
| U003 | Member C | 35.535298 | 139.591781 |
| L001 | Disaster site | 35.540484 | 139.597156 |
| L002 | D elementary school | 35.533958 | 139.594039 |

The item "ID" is an ID for identifying a target other than the own device, and includes the IDs (U002 and U003) of the other terminal devices 10b1 and 10c1 that establish the sessions with the management server 40C in a case where the own device is the terminal device 10a1. The management server 40C generates the IDs of the other terminal devices 10b1 and 10c1 in response to the first accesses from the other terminal devices 10b1 and 10c1 (step S61 and step S71 of FIG. 41).

Further, the item "ID" in Table 2 includes IDs (ID=L001 and L002 in the example of Table 2) for identifying targets other than the terminal device 10a1, the terminal device 10b1, and the terminal device 10c1 that establish the sessions with the management server 40C.

In Table 2, the item "name" indicates names associated with the IDs. Further, the item "latitude" and the item "longitude" indicate the position information of the targets corresponding to the IDs.

The names associated with the IDs that identify the terminal device 10a1, the terminal device 10b1, and the terminal device 10c1, of the names indicated by the item "name", are set in the commander terminal 30C, as described below, for example, and are transmitted from the commander terminal 30C to the management server 40C. The embodiment is not limited to the example. The names associated with the IDs that identify the terminal device 10a1, the terminal device 10b1, and the terminal device 10c1 can be respectively input in the terminal device 10a1, the terminal device 10b1, and the terminal device 10c1, and transmitted to the management server 40C in the first accesses in step S50, step S60, and step S70 of FIG. 41, for example.

The information of the item "latitude" and the item "longitude" associated with the IDs that identify the terminal device 10a1, the terminal device 10b1, and the terminal device 10c1 in Table 2 is updated through the communication with the terminal device 10a1, the terminal device 10b1, and the terminal device 10c1 in step S901, step S911, and step S921 of FIG. 41, for example.

The IDs for identifying targets other than the terminal device 10a1, the terminal device 10b1, and the terminal device 10c1, and the information of the item "name", the item "latitude", and the item "longitude" associated with the IDs, in Table 2 are input in the commander terminal 30C, for example, and transmitted to the management server 40C. The targets other than the terminal device 10a1, the terminal device 10b1, and the terminal device 10c1 are a destination, a sign, and the like, and the values of the item "latitude" and the item "longitude" are not typically automatically updated.

The information in Table 2 is transmitted from the management server 40C to the terminal device 10b1 and the terminal device 10c1 in step S902 and step S904 of FIG. 41. Note that the information transmitted from the management server 40C to the terminal device 10b1 and the terminal device 10c1 in step S912 and step S914, and in step S922 and step S924 of FIG. 41 includes similar items to Table 2. Therefore, description here is omitted.

The information of the targets other than the terminal device 10a1, the terminal device 10b1, and the terminal device 10c1 is transmitted from the management server 40C to the terminal device 10a1, the terminal device 10b1, and the terminal device 10c1. Therefore, the terminal device 10a1, the terminal device 10b1, and the terminal device 10c1 can display the position markers that indicate the positions of the targets, that is, the destination and the sign, on the screen 13a, the screen 13b, and the screen 13c. Accordingly, even if the destination and the sign are at positions that cannot be visually recognized from the user A1, the user B1, and the user C1 who mount the terminal device 10a1, the terminal device 10b1, and the terminal device 10c1, the user A1, the user B1, and the user C1 can intuitively confirm which direction and at which distance the destination and the sign exist.

Figure 51:
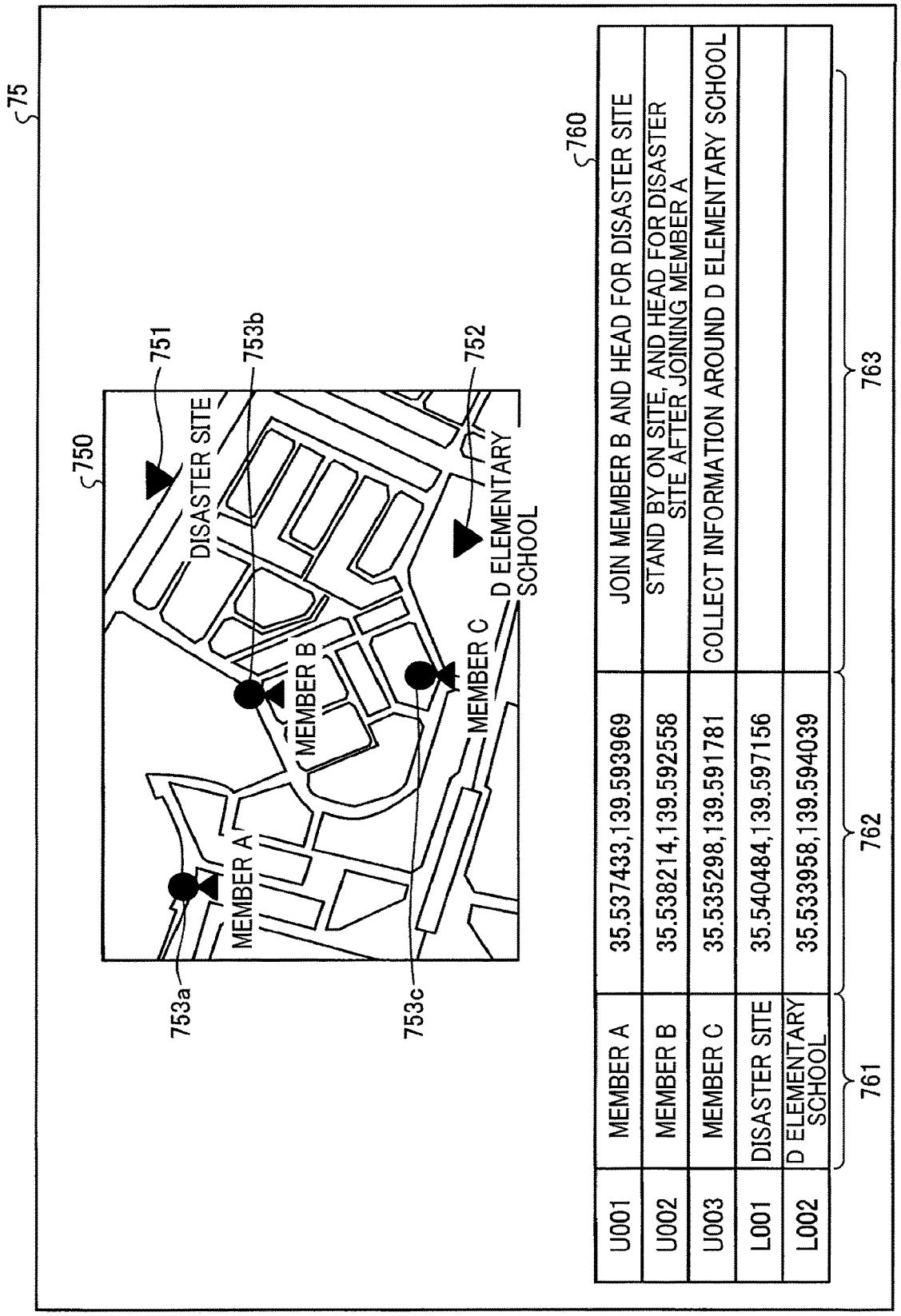
FIG. 51 is a diagram illustrating an example of display on a screen of a commander terminal applicable to the fourth embodiment.

FIG. 51 illustrates an example of display on the screen 75 of the commander terminal 30C applicable to the fourth embodiment. Here, the commander terminal 30C is used by the user D1.

The commander terminal 30C displays a map image 750 on the screen 75 in step S82 of FIG. 41, for example. The commander terminal 30C acquires the map image 750 including a predetermined range in advance, and stores the map image 750 in a storage device included in the commander terminal 30C, for example. The embodiment is not limited to the example. The commander terminal 30C may acquire the map image 750 from the management server 40C in step S82 of FIG. 41, for example, or may acquire the map image 750 from another server device connected to the network 50. The commander terminal 30C can execute scroll, zoom-in, and zoom-out of the map image 750 in response to a user operation to the commander terminal 30C.

The commander terminal 30C superimposes and displays, on the map image 750, markers 753a, 753b, and 753c that indicate the positions of the terminal device 10a1, the terminal device 10b1, and the terminal device 10c1 on the map image 750, according to the IDs and the position information of the terminal device 10a1, the terminal device 10*b*1, and the terminal device 10*c*1 acquired from the management server 40C in step S906, step S916, and step S926 of FIG. 41. Further, the labels including corresponding names are respectively displayed near the marker 753*a*, the marker 753*b*, and the marker 753*c*.

For example, the management server 40C transmits the IDs, and the position information and the names associated with the IDs, to the commander terminal 30C, by reference to the information of Table 2 in step S906, step S916, and step S926 of FIG. 41. The commander terminal 30C superimposes and displays, on the map image 750, the marker 753*a*, the marker 753*b*, the marker 753*c*, and the labels, according to the IDs, the position information, and the names transmitted from the management server 40C.

The commander terminal 30C updates the positions of the marker 753*a*, the marker 753*b*, the marker 753*c*, and the labels on the map image 750 in response to the transmission of the position information from the terminal device 10*a*1, the terminal device 10*b*1, and the terminal device 10*c*1.

For example, the IDs and the position information are transmitted from the terminal device 10*a*1, the terminal device 10*b*1, and the terminal device 10*c*1 to the management server 40C in step S901, step S911, and step S921 of FIG. 41. The IDs and the position information are transmitted from the management server 40C to the commander terminal 30C in step S906, step S916, and step S926 of FIG. 41. The commander terminal 30C updates the positions of the marker 753*a*, the marker 753*b*, the marker 753*c*, and the labels on the map image 750, on the basis of the IDs and the position information received from the management server 40C.

Further, the commander terminal 30C acquires the IDs, the position information, and the names of the targets other than the terminal device 10*a*1, the terminal device 10*b*1, and the terminal device 10*c*1 from the management server 40C in step S906, step S916, and step S926 of FIG. 41. The commander terminal 30C superimposes and displays, on the map image 750, a marker 751 and a marker 752 that indicate the positions of the targets on the map image 750, and labels corresponding to the marker 751 and marker 752, according to the acquired IDs, position information, and names of the targets.

In this way, the commander terminal 30C superimposes and displays the marker 753*a*, the marker 753*b*, the marker 753*c*, and the labels of the terminal device 10*a*1, the terminal device 10*b*1, and the terminal device 10*c*1, on the map image 750 displayed on the screen 75 of the commander terminal 30C. Further, the commander terminal 30C superimposes and displays, on the map image 750, the marker 751, the marker 752, and the labels of the targets other than the terminal device 10*a*1, the terminal device 10*b*1, and the terminal device 10*c*1. Accordingly, the user D1 who uses the commander terminal 30C can confirm the positions where the user A1, the user B1, and the user C1 who mount the terminal device 10*a*1, the terminal device 10*b*1, and the terminal device 10*c*1 exist and the positional relationship in a panoramic manner.

In FIG. 51, in an area 760, the IDs, the names, the position information, and text information are displayed. The IDs of the terminal device 10*a*1, the terminal device 10*b*1, and the terminal device 10*c*1, of the DIs, can be acquired from the management server 40C. Further, the IDs (ID=L001 and L002 in FIG. 51) that indicate the targets other than the terminal device 10*a*1, the terminal device 10*b*1, and the terminal device 10*c*1, of the IDs, may be input on the commander terminal 30C or may be acquired from the management server 40C.

The area 760 includes input areas 761, 762, and 763 to which information can be input by an operation to the commander terminal 30C. The names corresponding to the IDs are input to the input area 761. The position information (the latitude and the longitude) corresponding to the IDs are input to the input area 762. The position information input to the input area 762 can be acquired from the management server 40C.

The text information is input to the area 763. For example, the user D1 operates the commander terminal 30C to input the text information to each field in the input area 763, for each ID. The text information is commands to the user A1, the user B1, and the user C1 who mount the terminal device 10*a*1, the terminal device 10*b*1, and the terminal device 10*c*1, in a case where the corresponding IDs correspond to the terminal device 10*a*1, the terminal device 10*b*1, and the terminal device 10*c*1. For example, the commander terminal 30C can transmit the text information input to the input area 763, to the terminal devices corresponding to the IDs associated with the text information.

In a case where the corresponding ID identifies the target other than the terminal device 10*a*1, the terminal device 10*b*1, and the terminal device 10*c*1, the text information is information of the target, for example.

The commander terminal 30C can transmit the information input to the input areas 761 to 763, to the management server 40C, in response to a predetermined operation to the commander terminal 30C.

Next, a method for notifying command information to the terminal device 10*a*1, the terminal device 10*b*1, and the terminal device 10*c*1, in a case where the command information is transmitted from the commander terminal 30C to the terminal device 10*a*1, the terminal device 10*b*1, and the terminal device 10*c*1, according to the fourth embodiment, will be described. The command information from the commander terminal 30C is transmitted to the specified terminal device, of the terminal device 10*a*1, the terminal device 10*b*1, and the terminal device 10*c*1, through the management server 40C.

Here, description will be given, using the terminal device 10*a*1 that represent the terminal device 10*a*1, the terminal device 10*b*1, and the terminal device 10*c*1. Further, when the text information is input to a field corresponding to the terminal device 10*a*1 in the input area 763 illustrated in FIG. 51, for example, the commander terminal 30C specifies the terminal device 10*a*1 as a destination of the command information, and transmits the text information to the specified destination as the command information.

FIG. 52A to FIG. 52F illustrate examples of a command information display method in the terminal device 10*a*1 according to the fourth embodiment. If long text information like the command information is suddenly displayed on the screen 13*a* of the terminal device 10*a*1, the display may hinder the visual search to the outside world. Therefore, control to allow the user A1 to acquire the command information when the user A1 who mounts the terminal device 10*a*1 is in the still state and when the user A1 who has confirmed safety of the environment takes an action to acquire the command information is desirable.

In the examples of FIG. 52A to FIG. 52F, the user A1 who mounts the terminal device 10*a*1 moves the head 80 up and down in the still state to control display of the command information to the screen 13*a*.

More specifically, the display information generator 204*a* in the terminal device 10*a*1 determines whether the user A1 is in the still state, on the basis of the detection output of the head movement detector 207*a*, using the detection result of the acceleration sensor included in the nine-axis sensor 22. When the display information generator 204a determines that the user A1 is in the still state, the display information generator 204a controls the display of the command information to the screen 13a, according to the detection result of up and down movement of the head 80 by the head movement detector 207a, based on the detection output of the gyro sensor included in the nine-axis sensor 22.

For example, the head 80 (gaze direction) of the user A1 faces the horizontal direction, and the position marker 1301 that indicates the position of another terminal device, the label 1302 corresponding to the position marker 1301, and the azimuth display 1300 are displayed on the screen 13a of the terminal device 10a1, as exemplarily illustrated in FIG. 52A. In this state, when the terminal device 10a1 has received the command information, a notification icon 1310 that indicates receipt of the command information is displayed on the screen 13a. The notification icon 1310 is displayed at a position out of the way of the position marker 1301, the label 1302, and the azimuth display 1300 on the screen 13a, for example, an upper right corner on the screen 13a.

When the notification icon 1310 is displayed on the screen 13a, the user A1 inclines the head 80 upward. As exemplarily illustrated in FIG. 52B, when the direction (gaze direction) of the head 80 exceeds a predetermined angle α with respect to the horizontal direction, the terminal device 10a1 causes, by the display information generator 204a, the position marker 1301, the label 1302, and the azimuth display 1300 to be non-display on the screen 13a. Then, the display information generator 204a displays an aiming marker 1311 in a central portion on the screen 13a, and displays a screen switch selection panel 1312a in an upper end portion on the screen 13a. The notification icon 1310 is displayed on an upper right corner on the screen 13a in a secured manner.

Here, the aiming marker 1311 is secured to and displayed in the central portion on the screen 13a. That is, the aiming marker 1311 is displayed in the central portion on the screen 13a in a secured manner even if the user A1 inclines the head 80 further upward from the state of FIG. 52B. Meanwhile, the position of the screen switch selection panel 1312a is moved on the screen 13a according to the movement of the head 80.

When the user A1 further inclines the head 80 by a predetermined angle β from the state of FIG. 52B, the aiming marker 1311 overlaps with the screen switch selection panel 1312a, as exemplarily illustrated in FIG. 52C. The display information generator 204a determines whether the aiming marker 1311 and the screen switch selection panel 1312a overlap with each other, and the state has been maintained for a predetermined time (for example, 2 seconds), on the basis of coordinate information of the screen switch selection panel 1312a on the screen 13a.

When the display information generator 204a determines that the overlapping state of the aiming marker 1311 and the screen switch selection panel 1312a has been maintained for the predetermined time, the display information generator 204a deletes the aiming marker 1311 and the screen switch selection panel 1312a from the screen 13a, and displays, on the screen 13a, the command information transmitted from the commander terminal 30C through the management server 40C. FIG. 52D illustrates an example in which the command information 1320 is displayed on the screen 13a.

The display information generator 204a controls the display of the command information 1320 such that the command information 1320 is displayed at a predetermined position on the screen 13a in a secured manner even if the direction of the head 80 is returned to the horizontal direction. Further, the display information generator 204a deletes the notification icon 1310 from the screen 13a after displaying the command information 1320 on the screen 13a.

The display information generator 204a displays the aiming marker 1311 in the central portion on the screen 13a, similarly to FIG. 52B, and also displays a screen switch selection panel 1312b (see FIG. 52E) in an upper end side on the screen 13a, when the direction of the head 80 exceeds a predetermined angle with respect to the horizontal direction on the basis of an output of the head movement detector 207a, in a state where the command information 1320 is displayed on the screen 13a.

When the user A1 further inclines the head 80 upward by a predetermined angle, the aiming marker 1311 overlaps with the screen switch selection panel 1312b, as exemplarily illustrated in FIG. 52E. The display information generator 204a determines whether the aiming marker 1311 and the screen switch selection panel 1312b overlap with each other, and the state has been maintained for a predetermined time (for example, 2 seconds), on the basis of the coordinate information of the screen switch selection panel 1312b on the screen 13a.

When the display information generator 204a determines that the overlapping state of the aiming marker 1311 and the screen switch selection panel 1312b has been maintained for the predetermined time, the display information generator 204a deletes the aiming marker 1311 and the screen switch selection panel 1312b from the screen 13a. Further, the display information generator 204a displays, on the screen 13a, the position marker 1301 that indicates the position of another terminal device, the label 1302 corresponding to the position marker 1301, and the azimuth display 1300 again.

At this time, the display information generator 204a displays, in a case where the command information includes the ID, the name, and the position information of the target other than the another terminal device, a position marker 1304 that indicates the position of the target, and a label 1303 including information of the target, corresponding to the position marker 1304, on the screen 13a, as exemplarily illustrated in FIG. 52F.

When the head 80 is inclined upward in the states of FIG. 52B, FIG. 52C, and FIG. 52E, the value of the acceleration in the vertical direction may be changed, and the estimation of the still state and the walk state described in FIG. 50 may be affected. Therefore, the display information generator 204a estimates whether the head 80 is inclined upward, using the output of the gyro sensor included in the nine-axis sensor 22, on the basis of the detection result of the head movement detector 207a. When the display information generator 204a estimates that the head 80 is inclined upward, the display information generator 204a performs control as exception of the estimation processing of the still state and the walk state.

The terminal device 10a1, the terminal device 10b1, and the terminal device 10c1 according to the fourth embodiment have an advantage of being used by mounting the spectacle unit 1C on the head 80 and being used in a hands-free manner. With the above control, the user A1, the user B1, and the user C1 can acquire information with simple movement of the head 80.

The above description has been given such that the terminal device 10a1, the terminal device 10b1, and the terminal device 10c1 according to the fourth embodiment include the spectacle-type device corresponding to the terminal device 10A including the front portion 11B provided with the dimmer according to the third embodiment. However, the embodiment is not limited to this example. That is, the terminal device 10a1, the terminal device 10b1, and the terminal device 10c1 according to the fourth embodiment may include the spectacle-type device corresponding to the terminal device 10 including the front portion 11A without a dimmer according to the first embodiment.

The information sharing system according to the fourth embodiment includes the management server 40C, allows the terminal device 10a1, the terminal device 10b1, and the terminal device 10c1, and the management server 40C to perform communication, and allows transmission and reception of the IDs and the position information of the terminal device 10a1, the terminal device 10b1, and the terminal device 10c1. The embodiment is not limited to this example, and the information sharing system can have a configuration without the management server 40C.

In this case, establishment of the sessions in step S81 of FIG. 41 is performed among the terminal device 10a1, the terminal device 10b1, and the terminal device 10c1, and between the terminal device 10a1, the terminal device 10b1, and the terminal device 10c1, and the commander terminal 30C. The respective IDs of the terminal device 10a1, the terminal device 10b1, and the terminal device 10c1 are stored in the terminal device 10a1, the terminal device 10b1, and the terminal device 10c1 in advance.

Further, the terminal device 10a1 directly transmits the position information acquired in step S900 to the terminal device 10b1, the terminal device 10c1, and the commander terminal 30C in step S90a of FIG. 41, for example. The same applies to step S90b and step S90c.

According to at least one of the above embodiments, the accurate position information of the target can be identified and the environment can be confirmed by a plurality of users, even in the absence of information by a plurality of mobile terminals.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A management server communicable with a plurality of terminal devices, the plurality of terminal devices including a first terminal device, the management server comprising:
a receiver configured to receive, from the first terminal device, shared information to be shared between the plurality of terminal devices, the shared information including first location information indicating a current location of the first terminal device, direction information indicating a direction that the first terminal device faces, and distance information indicating a distance from the first terminal device to a target destination;
circuitry configured to generate target destination information including second location information indicating a location of the target destination based on the shared information received from the first terminal device; and
a transmitter configured to transmit the target destination information to the plurality of terminal devices for display at the plurality of terminal devices, wherein
a marker image of the target destination in a size is displayed at each of the plurality of terminal devices, the size of the marker image displayed being adjusted according to a distance between the first terminal device and a corresponding terminal device of the plurality of terminal devices.

2. The management server of claim 1, wherein the shared information received from the first terminal device further includes attribute information indicating an attribute of the target destination, and
the circuitry generates the target destination information that further includes the attribute information.

3. The management server of claim 2, further comprising:
a memory to store, for each one of one or more types of target destination, attribute information and the marker image in association, and
the circuitry generates the target destination information that further includes the marker image associated with the attribute information that is received from the first terminal device.

4. The management server of claim 1, wherein the target destination information further includes time information indicating a time that the target destination information is generated.

5. The management server of claim 1, wherein the shared information received from the first terminal device further includes a captured image of an object, which has been captured at the first terminal device.

6. The management server of claim 1, wherein the shared information received from the first terminal device further includes information generated based on an audio input to the first terminal device.

7. An information sharing system, comprising:
a plurality of terminal devices including a first terminal device; and
a management server communicable with the plurality of terminal devices, the management server including:
a receiver configured to receive, from the first terminal device, shared information to be shared between the plurality of terminal devices, the shared information including first location information indicating a current location of the first terminal device, direction information indicating a direction that the first terminal device faces, and distance information indicating a distance from the first terminal device to a target destination;
circuitry configured to generate target destination information including second location information indicating a location of the target destination based on the shared information received from the first terminal device; and
a transmitter configured to transmit the target destination information to the plurality of terminal devices for display at the plurality of terminal devices, wherein a marker image of the target destination in a size is displayed at each of the plurality of terminal devices, the size of the marker image displayed being adjusted according to a distance between the first terminal device and a corresponding terminal device of the plurality of terminal devices.

8. The information sharing system of claim 7, wherein each one of the plurality of terminal devices includes:
- circuitry to obtain location information indicating a current location of the terminal device, direction information indicating a direction that the terminal device currently faces, and distance information indicating a distance to a target destination from the terminal device;
- a receiver to receive the second location information from the management server; and
- a display to display the second location information.

9. The information sharing system of claim 8, wherein at least one of the plurality of terminal devices includes, as the display, a light-transmissive display to display an image to at least one eye and its peripheral area of a user, when the terminal device is mounted on a head of the user.

10. The information sharing system of claim 9, wherein the light-transmissive display of the at least one of the plurality of terminal devices includes a dimmer configured to control a light amount to be transmitted, the dimmer including an electrochromic layer.

11. A terminal device comprising:
- a light-transmissive display configured to display an image to at least one eye and its peripheral area of a user, when the terminal device is mounted on a head of the user; and
- circuitry configured to:
- obtain first location information, the first location information indicating a current location of the terminal device,
- obtain target destination information including second location information, the second location information indicating a location of a target destination,
- calculate a distance between the location indicated by the first location information and the location indicated by the second location information, and
- control the display to display, based on the first location information and the second location information, a marker image of the target destination in a size, the size of the marker image being adjusted according to the calculated distance at a location corresponding to a direction of the target destination viewed from the location indicated by the first location information.

12. The terminal device of claim 11, wherein the target destination information further includes attribute information of the target destination, and
- the circuitry controls the display to further display a label including the attribute information at the location corresponding to a direction of the target destination.

13. The terminal device of claim 12, wherein the circuitry is further configured to
- control the display to display the label in a distance from the marker image that corresponds to the calculated distance between the first location and the second location.

14. The terminal device of claim 13, wherein a background of a display area displaying the attribute information of the label is made semitransparent.

15. The terminal device of claim 11, wherein the marker image is displayed with an angle corresponding to movement of the head of the user around an antero-posterior axis.

16. The terminal device of claim 11, wherein the circuitry controls the display to stop displaying the marker image based on a determination of whether a certain condition satisfies, the certain condition including at least one of:
- a first condition in which the user mounted with the terminal device has been moving; and
- a second condition in which the head of the user mounted with the terminal device exceeds a predetermined angle with respect to a horizontal direction.

17. The terminal device of claim 16, wherein, when the circuitry determines that the head of the user mounted with the terminal device exceeds a predetermined angle with respect to the horizontal direction, the circuitry controls the display to display a notification icon that indicates receipt of command information through a network.

18. The terminal device of claim 11, wherein the light-transmissive display includes a dimmer configured to control a light amount to be transmitted, the dimmer including an electrochromic layer.

* * * * *